(12) United States Patent
Vermerris et al.

(10) Patent No.: US 9,023,471 B2
(45) Date of Patent: May 5, 2015

(54) LIGNIN-BASED NANOSTRUCTURES

(71) Applicant: University of Florida Research Foundation, Inc., Gainesville, FL (US)

(72) Inventors: Willem Evert Vermerris, Gainesville, FL (US); Hector Mario Caicedo, Gainesville, FL (US); Luisa Amelia Dempere, Gainesville, FL (US)

(73) Assignee: University of Florida Research Foundation, Inc.

( * ) Notice: Subject to any disclaimer, the term of this patent is extended or adjusted under 35 U.S.C. 154(b) by 18 days.

(21) Appl. No.: 14/067,280

(22) Filed: Oct. 30, 2013

(65) Prior Publication Data
US 2014/0050924 A1 Feb. 20, 2014

Related U.S. Application Data

(63) Continuation-in-part of application No. PCT/US2012/036061, filed on May 2, 2012.

(60) Provisional application No. 61/481,385, filed on May 2, 2011.

(51) Int. Cl.
B29C 41/00 (2006.01)
C08H 7/00 (2011.01)
C08L 97/00 (2006.01)

(52) U.S. Cl.
CPC .......... B29C 41/00 (2013.01); *Y10T 428/2982* (2015.01); C08H 6/00 (2013.01); C08L 97/005 (2013.01); *Y10S 977/788* (2013.01)

(58) Field of Classification Search
USPC .......................................... 428/402; 977/788
IPC ............. B29C 41/00; C08L 97/005; C08H 6/00
See application file for complete search history.

(56) References Cited

PUBLICATIONS

H. M. Caicedo: "Biocatalyzed Synthesis of Polymeric Naturally Biodegradable Nanotubes form Plant Cell Wall Material" Pittcon conference & Expo., ACS Division of Analytical Chemistry Poster Session, Mar. 14, 2011.*
International Preliminary Report on Patentability dated Nov. 14, 2013.
Caicedo, "Biocatalyzed Synthesis of Polymeric Naturally Biodegradable Nanotubes from Plant Cell Wall Material," Pittcon Conference & Expo, ACS Divisional of Analytical Chemistry Poster Session, Mar. 14, 2011.

* cited by examiner

*Primary Examiner* — Leszek Kiliman
(74) *Attorney, Agent, or Firm* — Thomas Horstemeyer, LLP

(57) ABSTRACT

Embodiments of the present disclosure provide lignin-based nanostructures including nanotubes and nanowires, methods of making and using the nanostructures, probes and compositions including the nanostructures, and the like.

25 Claims, 29 Drawing Sheets

LIGNIN-BASED NANOSTRUCTURES

CROSS-REFERENCE TO RELATED APPLICATION

This application is a continuation-in-part of PCT patent application entitled "LIGNIN-BASED NANOSTRUCTURES," having serial number PCT/US2012/036061, filed on May 2, 2012, which claims priority to U.S. provisional application entitled "LIGNIN-BASED NANOTUBES," having Ser. No. 61/481,385, filed on May 2, 2011, both of which are entirely incorporated herein by reference.

SEQUENCE LISTING

The instant application contains a sequence listing which has been submitted with the instant application via EFS-Web. The sequence listing file is named 2221061705_ST25.txt and is incorporated herein by reference in its entirety.

BACKGROUND

Limitations of cylindrical carbon nanotubes based on the buckminsterfullerene structure as delivery vehicles for therapeutic agents include their chemical inertness, sharp edges, and toxicological concerns (Bianco et al. 2005; Kam and Dai 2005; Singh et al. 2005; Bhirde et al. 2009; Li, R. et al. 2010; Warheit et al. 2004; Shvedova et al. 2003; Kisin 2007; Murray et al. 2009; Smart et al. 2006; Belyanskaya et al. 2009; Magrez et al. 2006; Poland et al. 2008). Nanotubes can also be formed from polymeric materials such as polyelectrolytes (Ai et al. 2003), collagen (Landoulsi et al. 2009) and poly(3,4-ethylenedioxythiophene) (Xiao et al. 2007) via template synthesis using nanoporous membranes containing arrays of aligned cylindrical pores (Martin 1994; Huczko 2000). This approach produces either polymer-functionalized nanoporous membranes or polymer-based nanotubes from a sacrificial template (Martin 1996). The development of polymer nanotubes holds many promises for biomedical and biotechnological applications because of their greater biocompatibility (Duncan 2003; Martin and Kohli 2003). However, the inability of synthesized polymer-based nanotubes to maintain their shape limits commercial applications (Reiner et al. 2006, Mabrouk et al. 2009).

Lignin is a complex phenolic plant cell wall polymer formed by the oxidative coupling of hydroxycinnamyl alcohols and related compounds (Ralph et al. 2004). It can be synthesized in vitro (Nimz and Ludeman, 1976; Higuchi et al. 1994; Grabber et al. 1995; Terashima et al. 1996). Lignin is a waste product from paper mills and biorefineries that convert renewable resources, such as lignocellulosic biomass, into fuels and chemicals (Ragauskas et al. 2006). The desire to reduce both the dependency on imported fossil fuels and the net emission of greenhouse gasses attracts attention to the potential for bio-based fuels and chemicals. Since the presence of lignin in the biomass lowers the processing efficiency (Yang and Wyman, 2004; Chen and Dixon 2007), lignin is typically removed during a thermo-chemical pretreatment (Mosier et al. 2005) and burned to generate heat for the distillation of alcoholic fuels from the fermentation broth. Lignin's rich diversity in chemical bonds and functional groups may, however, be attractive for applications that require biodegradability, biocompatibility, and low cost.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 1A illustrates activation of alumina membrane with APTES (3-aminopropyl-triethoxysilane); although the image shows four vertically oriented pores, for the sake of clarity the reactive sites are only depicted on one of the pore walls. The dark-grey caps indicate the inactivated (sputter-coated) upper and lower surfaces of the membrane. As shown in FIG. 1B, a Schiff's base reaction between the amino groups on the APTES-activated membrane and aldehyde moieties in the thioglycolate lignin forms a base layer. FIG. 1C illustrates addition of hydroxycinnamic acids, hydroxycinnamaldehydes, or hydroxycinnamyl alcohols, which polymerize (FIG. 1D) onto the lignin base layer through a reaction catalyzed by horseradish peroxidase/$H_2O_2$ FIGS. 2 A-D are SEM images of embodiments of lignin nanotubes of the present disclosure illustrating various features of the nanotubes.

FIG. 3A shows partial dissolution of the alumina template. FIG. 3B depicts a free lignin nanotube after complete dissolution of the template.

FIG. 4A shows photographs of the membranes before dissolution showing variation in color (shown as varying shades of gray in the black and white copy of the image) resulting from lignin nanotubes synthesized with different types of monomers. FIG. 4B is a fluorescence image of bare alumina membrane (no fluorescence), and FIG. 4C is a fluorescence image of the alumina template after synthesis of lignin nanotubes (the red fluorescence appears as a shade of gray in the black and white copy of the image).

FIG. 7A illustrates direct immobilization of template synthesized lignin nanotubes (TSLNT) onto glass; 1000 ms exposure, RFP filter (570-625 nm) to detect signal from nanotubes; FIG. 7B illustrates immobilization of lignin nanotubes functionalized with avidin-FITC onto glass functionalized with desthiobiotin; 1000 ms exposure, GFP filter (495-540 nm) to detect signal from FITC; and FIG. 7C illustrates immobilization of lignin nanotubes functionalized with anti-concanavalin A-FITC onto glass functionalized with concanavalin A; 1000 ms exposure, RFP filter. The images labeled 'blank' are UV-fluorescence images obtained with lignin nanotubes that were not functionalized. The areas of fluorescence in the images of the fluorescent nanotubes (labeled "test") are outlined to highlight their location. Schematic diagrams representing the biomolecular recognition are displayed above and below the corresponding microscope images.

SUMMARY

Figure 1:
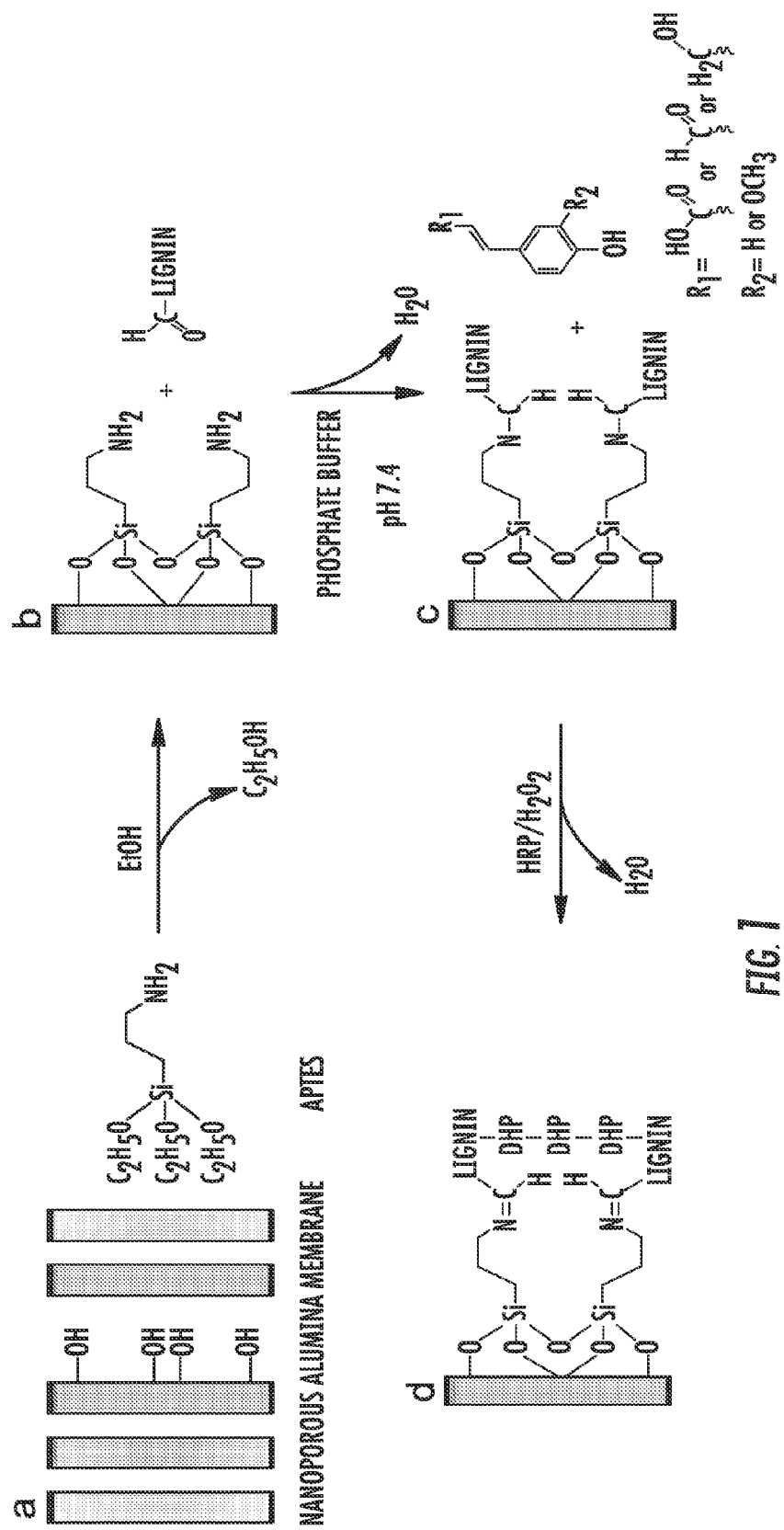
FIG. 1 represents a schematic illustration of an embodiment of the synthesis of lignin nanotubes of the present disclosure.
Figure 2A:
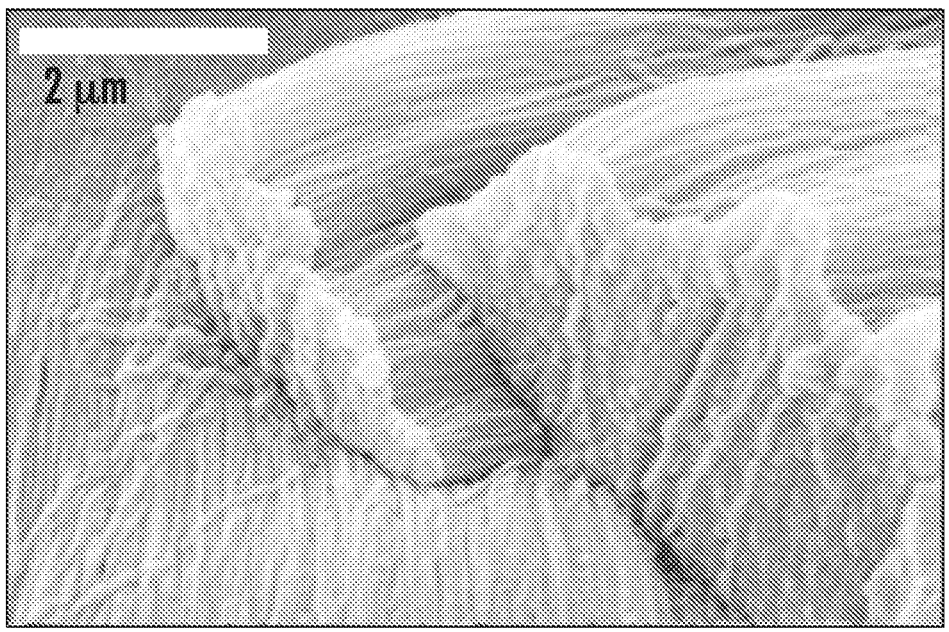
FIG. 2A shows polymer growth both in the pores and on the top and bottom surfaces of the template (bar=2 μm).
Figure 2B:
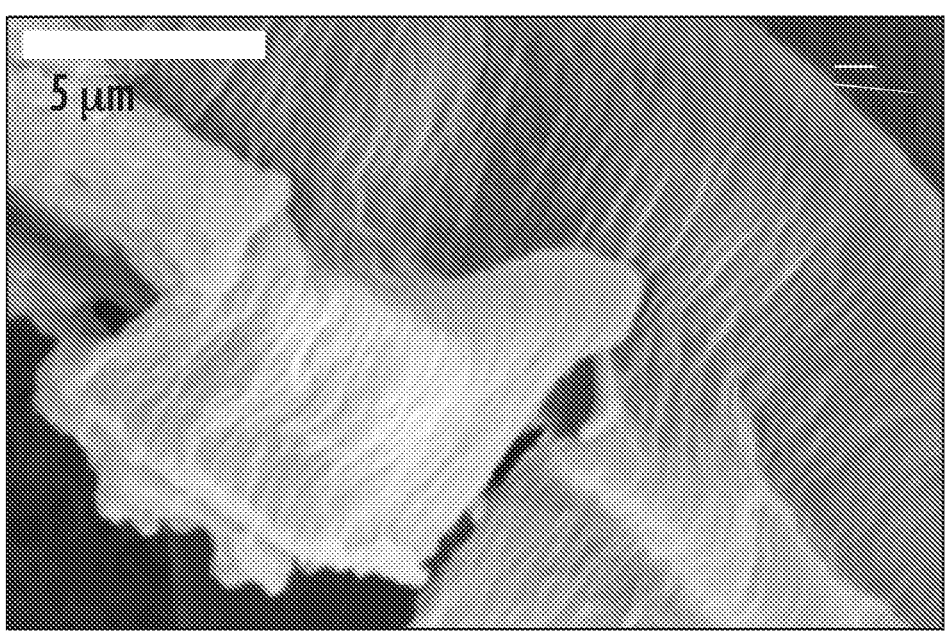
In FIG. 2B pliable bundles of lignin nanotubes reflect the material's flexibility (bar=5 μm).
Figure 2C:
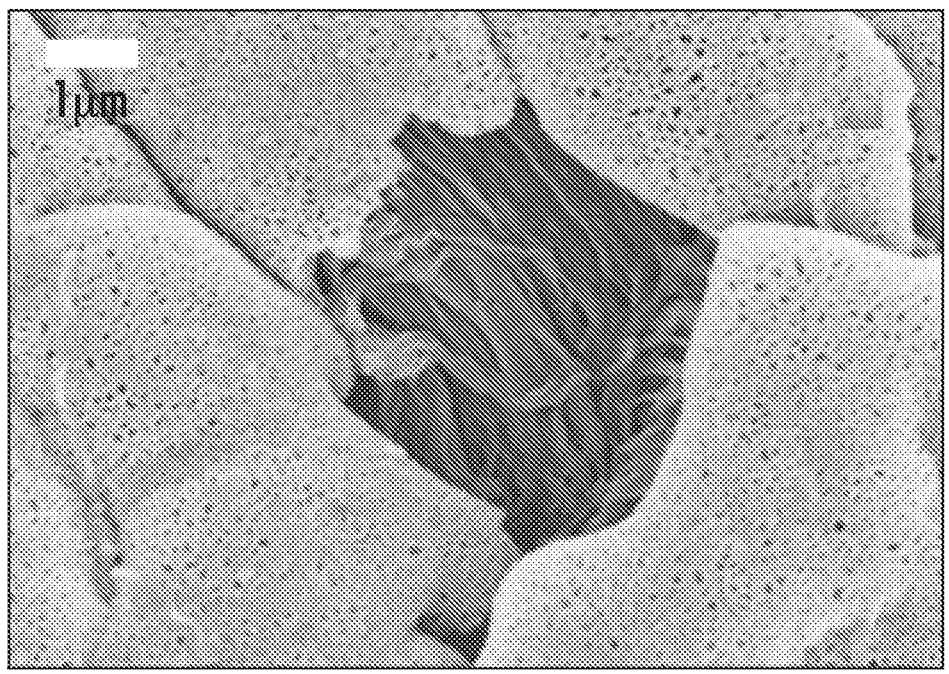
FIG. 2C illustrates Au/Pd sputter coating of the top and bottom of the membrane suppresses surface-synthesis, as evidenced by the clean membrane surface observed in a partially dissolved membrane fragment that enables visualization of the lignin nanotubes (bar=1 μm). The image in FIG. 2D shows free stabilized lignin nanotubes after membrane dissolution (bar=2 μm).
Figure 2D:
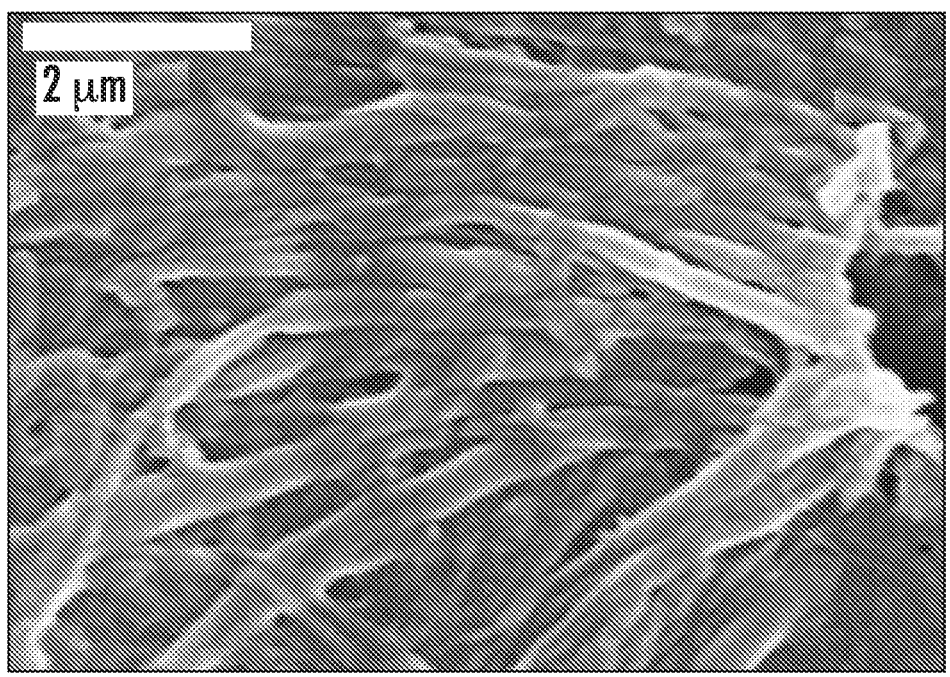

Embodiments of the present disclosure provide for nanostructures including nanotubes or nanowires comprised substantially of lignin. In embodiments of the nanostructures of the present disclosure, the lignin is chosen from natural lignin, synthetic lignin, and combinations thereof. In embodiments, the nanostructure is about 50% to about 100% lignin. The present disclosure also provides nanostructures consisting essentially of lignin. In embodiments, the present disclosure provides nanotubes consisting essentially of lignin.

Embodiments of the present disclosure also provide probes including a lignin nanotube capable of producing a detectable signal and a binding agent coupled to the lignin nanotube, where the binding agent is capable of binding to a specified target.

The present disclosure also includes compositions including a lignin nanotube, at least one biomolecule coupled to the nanotube, and a pharmaceutically acceptable carrier. In such embodiments, the biomolecules is chosen from a binding agent capable of binding to a specified target, a reporter molecule, a therapeutic agent, a biocompatibility molecule, and a combination thereof.

The present disclosure also provides methods of making a lignin nanostructure including providing a porous template comprising a sacrificial material; depositing at least one layer of lignin on an inside surface of the pores of the template to produce a lignin nanostructure chosen from a nanotube having a hollow interior and a nanowire; and releasing the lignin nanostructure from the template. Embodiments of the present disclosure also include nanotubes and nanowires made from the methods of the present disclosure.

Other methods of the present disclosure include methods for detecting a specified target in a sample. Embodiments of such methods include contacting the sample with a composition including a plurality of lignin nanotubes, where the nanotubes include a binding agent having an affinity for the specified target, where the nanotubes are capable of producing a detectable signal, and where, in the presence of the specified target, the binding agent on the nanotubes binds the specified target, and detecting the signal produced by the nanotubes (or a reporter molecule coupled to the nanotubes) to determine the presence or absence of the specified target, where detection of the detectable signal in the sample indicates the presence of the specified target.

In embodiments, the present disclosure also provides methods of delivering a bioactive agent to a host by administering to the host a composition including a lignin nanotube including the bioactive agent coupled to the lignin nanotube.

DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

Any publications and patents cited in this specification that are incorporated by reference are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure may employ, unless otherwise indicated, techniques of medicine, organic chemistry, biochemistry, molecular biology, nanotechnology, botany, pharmacology, and the like, which are within the skill of the art. Such techniques are explained fully in the literature.

It must be noted that, as used in the specification and the appended embodiments, the singular forms "a," "an," and "the" include plural referents unless the context clearly dictates otherwise. Thus, for example, reference to "a support" includes a plurality of supports. In this specification and in the embodiments that follow, reference will be made to a number of terms that shall be defined to have the following meanings unless a contrary intention is apparent.

As used herein, the following terms have the meanings ascribed to them unless specified otherwise. In this disclosure, "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. Patent law and the term is open-ended, allowing for the presence of more than that which is recited so long as basic or novel characteristics of that which is recited is not changed by the presence of more than that which is recited, but excludes prior art embodiments.

Prior to describing the various embodiments, the following definitions are provided and should be used unless otherwise indicated.

Definitions

In describing the disclosed subject matter, the following terminology will be used in accordance with the definitions set forth below.

As used herein, the term "nanotube" refers to a nanostructure having a hollow tubular shaped body including an outer surface, and inner surface, and a hollow interior defined by the inner surface of the nanotube. Thus, a nanotube is distinguishable from a "nanorod", "nanowire" or other similar elongated nanostructures, which are solid and do not have a hollow interior. A "nanowire" as used herein refers to an elongated nanostructure similar to the nanotube described above, but with a solid core.

In the present disclosure, and as further described below, "lignin" refers to a complex organic polymer, which is found naturally in plant cell walls. In the present disclosure the term "lignin" includes both "natural lignin" and "synthetic lignin". "Natural lignin" is defined herein as lignin isolated/extracted from a natural source (e.g., directly from a plant sources) as well as from byproducts of a process using a natural source of lignin, (e.g., a byproduct of an industrial process using plant materials, such as pulp and paper processing, biorefineries, and the like). In the context of the present disclosure, "synthetic lignin" includes lignin formed from the polymerization of one or more lignin monomers, as described in greater detail below. The chemical composition of both natural and synthetic lignin varies based on monomer composition and the rate of the polymerization reaction. However, this diversity of composition and bonds provides many of the advantages of the lignin nanotubes described in the present application, such as flexibility, biocompatibility, biodegradability, the ability to customize features such as size, diameter, and fluorescence, and the like.

The term "comprised substantially of lignin" as used herein in reference to a nanotube indicates that the nanotube is about 50% or more lignin by weight, including lignin derived from both natural sources as well as polymerized from lignin monomers. For example, a nanotube comprised substantially of lignin may be about 60% or more, about 70% or more, about 75% or more, about 80% or more, about 85% or more, about 95% or more, about 99% or more or about 100% lignin by dry weight. As such, lignin nanotubes of the present disclosure that are "comprised substantially of lignin" are distinguishable from lignin nanotubes made of carbon or other polymeric materials that have a coating of lignin. Composition of the nanotubes can be measured by any appropriate standard method known in the art, for example, by energy dispersive X-ray spectroscopy (EDS). As used herein, the term "consisting essentially of lignin" in reference to a nanotube of the present disclosure, indicates that the nanotube is made of lignin (natural or synthetic lignin) with only minor impurities that do not affect the structure or function of the nanotube. The nanotubes of the present disclosure may be functionalized by coupling with additional biomolecules (e.g., reporter molecules, binding agents, therapeutic agents, and other bioactive agents) which may be attached to the surface or located on the interior of the nanotube (e.g., within the hollow space of the nanotube), without affecting the designation as "comprised substantially of lignin" or "consisting essentially of lignin." Thus, as used in the present disclosure, the terms "comprised substantially of lignin" and "consisting essentially of lignin" refer to the naked nanotube structure itself and not to additional biomolecules that may be coupled to (e.g., attached to or loaded on the interior of) the nanotube.

Use of the phrase "biomolecule" is intended to encompass deoxyribonucleic acid (DNA), ribonucleic acid (RNA), nucleotides, oligonucleotides, nucleosides, proteins, peptides, polypeptides, selenoproteins, antibodies, protein complexes, peptide nucleic acids, combinations thereof, and the like. In particular, the biomolecule can include, but is not limited to, naturally occurring substances such as polypeptides, polynucleotides, lipids, fatty acids, glycoproteins, carbohydrates, fatty acids, fatty esters, macromolecular polypeptide complexes, vitamins, co-factors, whole cells, eukaryotic cells, prokaryotic cells, microorganisms (such as, but not limited to, eubacteria, protozoa, archaea, fungi, algae, spores, apicomplexan, trematodes, nematodes, and mycoplasma), viruses (including, but not limited to, enveloped and nonenveloped viruses, DNA and RNA viruses, bacteriophages, retroviruses, etc.), or combinations thereof.

The phrase "bioactive agent" includes a biomolecule or other biocompatible compound that has some activity, use, and/or effect in a biological system or in relation to another biomolecule.

The terms "binding agent," "therapeutic agent," "biocompatibility molecule," and "reporter molecule" would all be considered biomolecules and bioactive agents within the context of the present disclosure.

A "binding agent" as used herein indicates a biomolecule having an affinity for one or more targets (e.g., also referred to as a "specified target"). In an embodiment, the binding agent can include, but is not limited to, a biological agent (e.g., antibodies, peptides, proteins, aptamers, antigens, and the like) and combinations thereof, that has an affinity for a target or a related biological event corresponding to the target. It should be noted that lignin nanotubes modified with conjugation to other molecules (e.g., antibodies, proteins, peptides, aptamers, small molecules, and the like) in order to target the nanotube to a particular molecular target are intended to be covered by embodiments of the present disclosure. For example, a lignin nanotube can be modified with a peptide-binding agent so that it can target new blood vessels in tumors or a chemical associated with a specific cancer, tumor, or precancerous tissue. In an embodiment, the binding agent can have an affinity for a target such as, but not limited to, a cancer cell, tumor, precancerous cells or tissue, atherosclerosis, fibrosis, pathogen, enzyme, etc. In another embodiment, the binding agent can be used for trafficking (where the nanotube is incorporated into viruses or cells (e.g., stem cells, T-cells, red blood cells, white blood cells, and the like) to look at distribution in the body.

The term "target" as used herein refers to a biomolecule (e.g., peptide, cell, tissue, molecule, tumor, etc.) for which it is desired to detect and or contact with a bioactive agent, such as a therapeutic agent. A "specified target" is a target of particular interest and to which a binding agent has a specific affinity. The target biomolecule may be on a cell surface or in the interior of a cell, the cell being in a host, isolated from an animal host, a cultured cell or a cell or population of cells in a tissue of an animal.

The term "reporter molecule" for use in the present disclosure includes any substance capable of being coupled to the lignin nanotubes (e.g., attached/bound to the surface of the nanotube and/or otherwise physically associated with the nanotubes) and capable of producing a detectable signal, such as, but not limited to, molecules with particular optical, electrical, acoustic and magnetic properties that can generate a distinguishable signal different from the detecting target. Examples of report molecules include, but are not limited to, fluorescent dyes, fluorescent quantum dots, MRI agents, and the like.

In some exemplary embodiments, a fluorescent dye is used as the reporter molecule to label the host and reference samples. Suitable dye molecules include, but are not limited to, Alexa 350, Alexa 430, Alexa 488, Alexa 532, Alexa 546, Alexa 568, and Alexa 594 dyes, AMCA, Lucifer Yellow, fluorescein, luciferins, aequorins, rhodamine 6G, tetramethylrhodamine or Cy3, Cy5, lissamine rhodamine B, and Texas Red, respectively (the numbers in the Alexa names indicate the approximate excitation wavelength maximum in nm).

A "therapeutic agent" as used herein includes a bioactive agent that produces a therapeutic effect in a biological system and/or has a desired biological effect on a target. A "therapeutic agent" in the context of the present disclosure may include, but is not limited to, a drug, a radiological agent, a chemological agent, a small molecule drug, a gene therapy vector, a peptide, and the like.

A "biocompatibility molecule" refers to a molecule that is used to increase the acceptance and reduce the rejection of a foreign substance in a biological system, for instance, such that the foreign substance is capable of existing and/or functioning in contact with a biological fluid or tissue. In the context of the present disclosure, a biocompatibility molecule attached to the surface of the nanotubes of the present disclosure increases the biocompatibility of the nanotubes to a biological system such as a cell culture or a host organism and helps to reduce rejection of the nanotubes by the biological system.

The terms "treat", "treating", and "treatment" are an approach for obtaining beneficial or desired clinical results. Specifically, beneficial or desired clinical results include, but are not limited to, alleviation of symptoms, diminishment of extent of disease, stabilization (e.g., not worsening) of disease, delaying or slowing of disease progression, substantially preventing spread of disease, amelioration or palliation of the disease state, and remission (partial or total), whether detectable or undetectable. In addition, "treat", "treating", and "treatment" can also mean prolonging survival as compared to expected survival if not receiving treatment. "Treatment" can also be therapeutic in terms of a partial or complete cure for a disease and/or adverse effect attributable to the disease.

As used herein, the terms "prophylactically treat" or "prophylactically treating" refers to completely, substantially, or partially preventing a disease/condition or one or more symptoms of a disease/condition in a host. Similarly, "delaying the onset of a condition" can also be included in "prophylactically treating", and refers to the act of increasing the time before the actual onset of a condition in a patient that is predisposed to the condition.

The term "host" or "organism" as used herein includes humans, mammals (e.g., cats, dogs, horses, etc.), insects, living cells, and other living organisms. A living organism can be as simple as, for example, a single eukaryotic cell or as complex as a mammal. Typical hosts to which embodiments of the present disclosure relate will be insects (e.g., *Drosophila melanogaster*) mammals (e.g., primates, especially humans). For veterinary applications, a wide variety of subjects will be suitable, e.g., livestock such as cattle, sheep, goats, cows, swine, and the like; poultry such as chickens, ducks, geese, turkeys, and the like; and domesticated animals particularly pets such as dogs and cats. For some applications, hosts may also include plants. For diagnostic or research applications, a wide variety of mammals will be suitable subjects, including rodents (e.g., mice, rats, hamsters), rabbits, primates, and swine such as inbred pigs and the like. Additionally, for in vitro applications, such as in vitro diagnostic and research applications, body fluids and cell samples of the above subjects will be suitable for use, such as mammalian (particularly primate, such as human) blood, urine, or tissue samples, or blood, urine, or tissue samples of the animals mentioned for veterinary applications. Hosts that are "predisposed to" condition(s) can be defined as hosts that do not exhibit overt symptoms of one or more conditions of interest but that are genetically, physiologically, or otherwise at risk of developing one or more of these conditions.

The term "nucleic acid" as used herein refers to any natural and synthetic linear and sequential arrays of nucleotides and nucleosides, for example cDNA, genomic DNA, mRNA, tRNA, miRNA, siRNA oligonucleotides, oligonucleosides and derivatives thereof. For ease of discussion, such nucleic acids may be collectively referred to herein as "constructs," "plasmids," or "vectors." Representative examples of the nucleic acids of the present disclosure include bacterial plasmid vectors including expression, cloning, cosmid and transformation vectors such as, but not limited to, pBR322, animal viral vectors such as, but not limited to, modified adenovirus, influenza virus, polio virus, pox virus, retroviruses, insect viruses (e.g., baculovirus), and the like, vectors derived from bacteriophage nucleic acid, and synthetic oligonucleotides like chemically synthesized DNA or RNA. The term "nucleic acid" further includes modified or derivatized nucleotides and nucleosides such as, but not limited to, halogenated nucleotides such as, but not only, 5-bromouracil, and derivatized nucleotides such as biotin-labeled nucleotides.

The term "isolated nucleic acid" as used herein refers to a nucleic acid with a structure (a) not identical to that of any naturally occurring nucleic acid or (b) not identical to that of any fragment of a naturally occurring genomic nucleic acid spanning more than three separate genes, and includes DNA, RNA, or derivatives or variants thereof. The term covers, for example, (a) a DNA which has the sequence of part of a naturally occurring genomic molecule but is not flanked by at least one of the coding sequences that flank that part of the molecule in the genome of the species in which it naturally occurs; (b) a nucleic acid incorporated into a vector or into the genomic nucleic acid of a prokaryote or eukaryote in a manner such that the resulting molecule is not identical to any vector or naturally occurring genomic DNA; (c) a separate molecule such as a cDNA, a genomic fragment, a fragment produced by polymerase chain reaction (PCR), ligase chain reaction (LCR) or chemical synthesis, or a restriction fragment; (d) a recombinant nucleotide sequence that is part of a hybrid gene, i.e., a gene encoding a fusion protein, and (e) a recombinant nucleotide sequence that is part of a hybrid sequence that is not naturally occurring. Isolated nucleic acid molecules of the present disclosure can include, for example, natural allelic variants as well as nucleic acid molecules modified by nucleotide deletions, insertions, inversions, or substitutions.

It is advantageous for some purposes that a nucleotide sequence is in purified form. The term "purified" in reference to nucleic acid represents that the sequence has increased purity relative to the natural environment.

The terms "polynucleotide," "oligonucleotide," and "nucleic acid sequence" are used interchangeably herein and include, but are not limited to, coding sequences (polynucleotide(s) or nucleic acid sequence(s) which are transcribed and translated into polypeptide in vitro or in vivo when placed under the control of appropriate regulatory or control sequences); control sequences (e.g., translational start and stop codons, promoter sequences, ribosome binding sites, polyadenylation signals, transcription factor binding sites, transcription termination sequences, upstream and downstream regulatory domains, enhancers, silencers, and the like); and regulatory sequences (DNA sequences to which a transcription factor(s) binds and alters the activity of a gene's promoter either positively (induction) or negatively (repression)). No limitation as to length or to synthetic origin is suggested by the terms described herein.

The terms "polypeptide" and "protein" as used herein refer to a polymer of amino acids of three or more amino acids in a serial array, linked through peptide bonds. The term "polypeptide" includes proteins, protein fragments, protein analogues, oligopeptides and the like. The term "polypeptides" contemplates polypeptides as defined above that are encoded by nucleic acids, produced through recombinant technology (isolated from an appropriate source such as a bird), or synthesized. The term "polypeptides" further contemplates polypeptides as defined above that include chemically modified amino acids or amino acids covalently or non-covalently linked to labeling ligands.

The term "gene" or "genes" as used herein refers to nucleic acid sequences (including RNA and DNA) that encode genetic information for the synthesis of a whole RNA, a whole protein, or any portion of such whole RNA or whole protein. Genes that are not naturally part of a particular organism's genome are referred to as "foreign genes," "heterologous genes" or "exogenous genes," and genes that are naturally a part of a particular organism's genome are referred to as "endogenous genes". The term "gene product" refers to RNAs or proteins that are encoded by the gene. "Foreign gene products" are RNA or proteins encoded by "foreign genes," and "endogenous gene products" are RNA or proteins encoded by endogenous genes. "Heterologous gene products" are RNAs or proteins encoded by "foreign, heterologous or exogenous genes" and are, therefore, not naturally expressed in the cell.

Discussion

The embodiments of the present disclosure encompass nanostructures, particularly lignin nanotubes and nanowires. The lignin nanostructures of the present disclosure are made substantially of lignin, meaning, as described above, that the composition of the nanostructures is about 50% or more lignin. However, the nanostructures may have a higher percentage of lignin, and in some embodiments may be made entirely of lignin (e.g., natural and/or synthetic lignin). The lignin nanotubes and nanowires provide significant advantages over carbon nanotubes or other conventional nanotubes.

Figure 9:
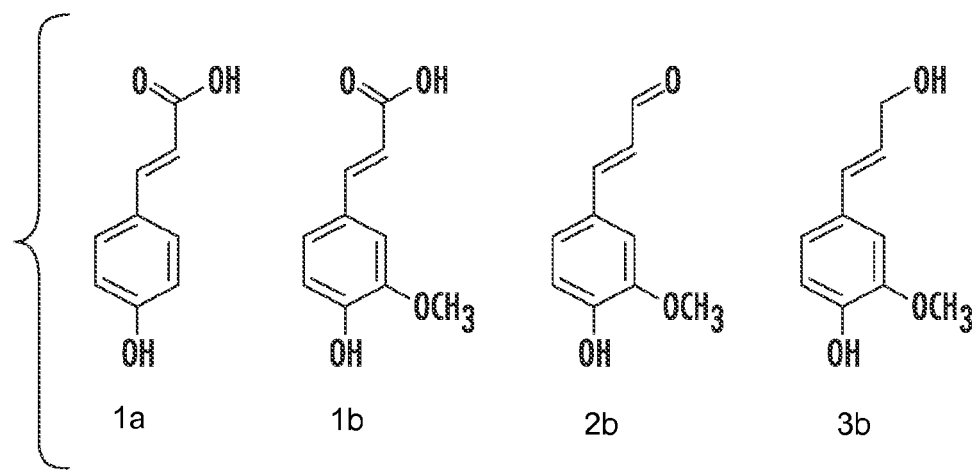
FIG. 9 illustrates the chemical structures of p-coumaric acid (1), ferulic acid (2), coniferaldehyde, (3) and coniferyl alcohol (4).

First, lignin is an abundant organic polymer and can be isolated from many natural plant sources as well as repurposed from the waste streams of industrial processes such as paper mills, biorefineries, and the like. A complex phenolic plant cell wall polymer, lignin is formed by the oxidative coupling of hydroxycinnamyl alcohols and related compounds, including hydroxycinnamaldehydes and hydroxycinnamic acids (Ralph, et al, 2004; Ralph and Hatfield, 1991, incorporated by reference herein in their entireties) (FIG. 9). The composition of lignin varies naturally among species, tissues within a given plant, and as a function of plant development. This variability in composition provides the most suitable biological and physical properties, which include providing structural support, a hydrophobic surface that facilitates water transport through vascular tissues, and a mechanical barrier against invading microbes and insects.

Lignin is also an abundantly available, low-cost waste product from biorefineries that hydrolyze cell wall polysaccharides from renewable resources, such as woody biomass, corn stover and wheat straw, and convert the monosaccharides into fuels and chemicals (Ragausakas, et al., 2006). The number of biorefineries is expected to increase in number as a result of the desire to reduce both the dependency on imported fossil fuels and the net emission of greenhouse gasses. Since the presence of lignin in the biomass lowers the processing efficiency (Zeng, et al., 2011; Yang and Wyman, 2004; Chen and Dixon, 2007), lignin is typically removed during a thermo-chemical pretreatment (Mosier, 2005, incorporated by reference herein in its entirety) and burned to generate heat for the distillation of alcoholic fuels from the fermentation broth. This waste stream represents, however, a rich diversity in chemical bonds and functional groups that are highly attractive for applications that require biodegradability and biocompatibility.

Furthermore, lignin can be synthesized from lignin monomers, allowing customization of the composition and features of the nanotubes. For instance, a synthetic lignin polymer referred to as a dehydrogenation polymer (DHP) can be synthesized in vitro by combining hydroxycinnamyl alcohols and oxidative enzymes (Nimz, et al., 1976; Higuchi, et al., 2994; Grabber, et al., 1995; Terashima, et al., 1996, incorporated by reference herein in their entireties). Since most, if not all, of the enzymes involved in the biosynthesis of lignin monomers and the genes encoding them have been identified (Humphreys et al. 2002), it is feasible to tailor the physicochemical and biological properties of lignin-based materials through chemical and genetic approaches, which offers the potential of custom templates for nanomaterials. In embodiments, lignin from natural sources as well as synthesized lignin can be used together.

The methods and compositions of the present disclosure combine the principles of combinatorial chemistry of lignin polymer synthesis together with the practice of template synthesis of nanostructures to synthesize nanotubes and nanowires whose structural and chemical features can be easily tailored by varying the monomer supply and synthesis conditions. As described in the examples below, controlling the rate of synthesis made it possible to effectively control the thickness of the polymeric layer deposited within the pores of the substrate, resulting in the synthesis of either nanotubes with an approximate wall thickness of 15 nm or nanowires with a 200-nm nominal diameter. This ability to tailor the wall thickness provides a degree of control over the strength of the nanotube network structure. Example 2, below, also describes how the source of natural lignin as well as the method used for lignin extraction can also be used to vary the properties of the lignin nanostructures produced. Varying the composition of the monomers made it possible to modify the optical properties of the resulting nanotubes. The examples below also demonstrate how, as a result of the many functional and reactive groups in the lignin, lignin-based nanotubes are highly amenable to bio-functionalization with a variety of biologically active molecules, which enables specific recognition of biological targets and expands the opportunities for the targeted delivery of therapeutic agents in humans and animals.

The present disclosure describes the analysis and versatility of template-synthesized lignin-based nanotubes. By controlling the rate of the reaction, it is possible to effectively control the thickness of the polymeric layer deposited within the pores, and therefore the strength of the nanotube network structure resulting in the synthesis of nanotubes with varying wall thickness or solid nanowires. Varying the chemical composition of the nanotubes also makes it possible to modify their optical properties. Varying the type of lignin used (e.g., different sources and/or different extraction procedures, or ratio of natural to synthetic lignin) can also be used to tailor the properties of the lignin nanostructures of the present disclosure. Lignin nanotubes are highly amenable to bio-functionalization, which enables coupling with bioactive compounds for recognition of biological targets, delivery of bioactive agents, and coupling with an array of other biomolecules, such as reporter molecules, and the like.

The present disclosure describes nanostructures, such as nanotubes and nanowires, made substantially from lignin. In embodiments, the nanostructures are nanotubes made of about 50% or more lignin by weight, including lignin derived from both natural sources as well as polymerized from lignin monomers. For example, embodiments of lignin nanotubes of the present disclosure are about 60% or more, about 70% or more, about 75% or more, about 80% or more, about 85% or more, about 95% or more, about 99% or more, or about 100% lignin by dry weight. In some embodiments, the lignin nanotube of the present disclosure consists essentially of lignin (as noted above, a nanostructure of the present disclosure that "consists essentially of lignin" may still contain some impurities and other inert components (e.g., other minor impurities co-purified with the natural lignin), but does not include other major components, such as other polymeric or binder materials). It should be noted that though the nanotube structure itself consists essentially of lignin, the nanotube may still be functionalized with other molecules. In embodiments of the present disclosure, the nanostructure may be lignin nanowires made of about 50% or more lignin by weight derived from natural or synthetic processes, as with the nanotubes. Although the present disclosure focuses primarily on the discussion of lignin nanotubes, it should be understood by one of skill in the art that the applicant does not intend to limit the scope of the present disclosure to nanotubes, and that nanowires according to the present disclosure can be made as described in the examples below and with the variations in composition described for nanotubes.

Methods of the present disclosure for making the lignin nanotubes and nanowires include providing a porous template such as, but not limited to, an alumina template and functionalizing the porous template to facilitate attachment of lignin to the template. Then, a layer of lignin is deposited on the surface of the pores of the template. In embodiments, this is achieved by immersing the template in a lignin solution. The lignin may be natural or synthetic lignin. In embodiments at least one layer, preferably the first layer, is natural lignin, such as, but not limited to, lignin derived from plant materials and byproducts via the thioglycolic acid procedure (thioglycolate lignin). The variation in the natural chemical composition of the lignin resulting from, for example, brown midrib (bmr) mutations (increased levels of cinnamaldehyde endgroups in sorgum bmr6 lignin and higher guaiacyl:syringyl ratio in sorghum bmr12 lignin) can affect the size of the lignin fragments and their reactivity, and thus affect the properties of the nanotubes. Natural lignin can be obtained form many sources, such as, but not limited to, grasses (e.g, sorghum, sugarcane, etc.), trees (e.g., pine, poplar, etc.), and other plant materials and byproducts. Lignin can be isolated from source material using a variety of isolation methods, such as, but not limited to, phosphoric acid, sulfuric acid, thioglycolic acid, or alkali solution (e.g., NaOH). Optionally, additional lignin layers are added as described in the examples below.

In embodiments, additional lignin layers can be made of synthetic lignin, (e.g., dehydrogenation polymer (DHP)) prepared from polymerization of lignin monomers, which is described in greater detail below. In embodiments, the DHP can be formed from monomers or a combination of monomers chosen from hydroxycinnamic acids (1), hydroxycinnamylaldehydes (2), hydroxycinnamyl alcohols (3), as represented by the following structures:

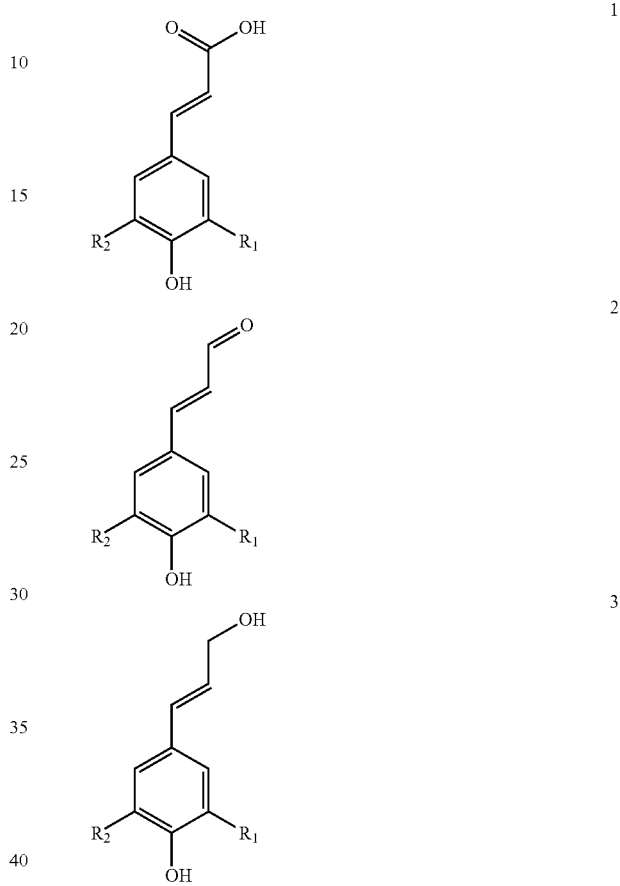

$R_1$=H, OH, $OCH_3$
$R_2$=H, OH, $OCH_3$

In embodiments, the lignin monomers can include, but are not limited to, coniferyl alcohol, coniferaldehyde, ferulic acid, p-coumaric acid, sinapyl alcohol, sinapaldehyde, 5-hydroxyconiferalcohol, 5-hydroxyconiferaldehyde, p-coumaryl alcohol, p-coumaraldehyde, caffeyl alcohol, caffeyl aldehyde, and combinations thereof. In embodiments, a first layer of natural lignin is deposited, followed by multiple layers of synthetic lignin. In exemplary embodiments, the synthetic lignin is made of a combination of the monomers ferulic acid and p-coumaric acid where the ratio of ferulic acid to p-coumaric acid is about 1 or more. As demonstrated in the Examples, the ratio of ferulic acid to p-coumaric acid affects the thickness of the nanotube walls, with wall thickness increasing as a function of the proportion of p-coumaric acid, and, in embodiments, producing a solid nanowire when the ratio of ferulic acid to p-coumaric acid reaches about 1:5. Thus, with a ratio of ferulic acid to p-coumaric acid above 1, the nanotubes are expected to retain a hollow interior space. The thickness of the walls of the nanotube, and by correlation, the diameter of the hollow interior of the nanotube, can be controlled by the number of lignin layers deposited in the substrate as well as the composition of the monomers used to make the lignin. In some embodiments, the nanotubes of the present disclosure can have a wall thickness from about 10 to about 50 nm. In some embodiments, the nanotubes can have a wall thickness from about 10 nm to about 100 nm, from about 45 to about 90 nm, as well as all intervening ranges.

After the desired layers of lignin and, hence, the desired thickness of the nanotube walls is achieved, the nanotubes are released from the template. In embodiments, the template is made of a sacrificial material, which can be dissolved to release the nanotubes. In an embodiment, the template is an alumina template, and the template is dissolved in an acid solution (e.g., phosphoric acid) that contains an optional surfactant to improve the release of the nanotubes.

In embodiments of the methods of the present disclosure, the dissolved aluminum may be recovered from the acid solution for recycling into new alumina membranes. As the cost of the alumina membranes represents a substantial cost ($5,000/m$^2$), recycling the aluminum has the potential to drastically reduce the cost of the membranes and the nanotube manufacturing process. In embodiments, the aluminum can be precipitated from the acid-dissolved aluminum solution through precipitation with sodium hydroxide. The precipitated aluminum can then be heated to form alumina and then reduced to aluminum via the Hall-Heroult electrolytic process (Grjotheim and Kvande, 1993).

The porous membranes can be produced by electrochemical anodization of aluminum in a suitable acidic electrolyte solution (Masude and Fukuda 1995; Hornyak et al. 1997). Additionally, the membrane production can be scaled up for commercial scale production of lignin-based nanotubes by using various methods of fabrication. In an embodiment, a pre-texturizing method is used for commercial scale production of lignin nanotubes. In such method, known to those of skill in the art, the aluminum substrate is pre-texturized by using nano-indentation with a master mold. The depressions formed in the aluminum serve as initiation sites for the pore creation at the initial stage of the anodization. Then, an ordered nanoporous alumna membrane is formed after anodization of the aluminum substrate with the transferred textured pattern. In embodiments, the anodized nanoporous alumina membranes can be fabricated in a two-step anodization method, also known to those of skill in the art. The above-described methods of producing templates represent non-limiting examples, and those of skill in the art may employ other methods of template fabrication known in the art.

By varying the type and ratio of lignin monomers, and or the lining source and/or isolation method, the optical properties and physical properties (e.g., wall thickness, length, etc.) of the nanotubes can be controlled and optimized as described in greater detail below. The size of the nanotubes is also a function of the size of the substrate, which may be optimized based on the intended use of the nanotubes. While not intending to be limiting, in general the length/height of the nanotube can be from a few hundred nanometers to over a few thousand nanometers. In particular, the nanotubes can have a height from about 100, 200, 300, 400, 500, 600, 700, 800, and 900 nanometers to about 500, 600, 700, 800, 900, 1000, 1100, 1200, 1300, 1400, and 1500 nanometers to about 2000, 5000 and 100,000 nanometers. In embodiments the nanotubes can have a height from about 200 to 100,000 nm (100 μm). When formed in the substrate, the substrate can produce nanotubes of the same height or of varying heights on one or more portions of the substrate. In example embodiments, the nanotubes have a height of about 100 to 1500 nanometers. The nanotubes can have a diameter of about 50 to 500 nanometers. In some nonlimiting embodiments they have a diameter of about 50 to 200 nm, in other embodiments, they have a diameter of about 50 to 100 nm.

After formation of the nanotubes, (a) bioactive agent(s) (e.g., reporter molecule, binding agent, therapeutic agent, etc.) can be coupled to the lignin nanotubes. In embodiments at least one biomolecule can be coupled to the lignin nanotubes of the present disclosure. The biomolecule can be, but is not limited to, a binding agent capable of binding to a specified target, a reporter molecule, a bioactive agent such as a therapeutic agent, a biocompatibility molecule, and combinations of these and the like. In embodiments the specified target can be a biomolecule such as, but not limited to, a polypeptide, a protein, a glycoprotein, an nucleic acid, a carbohydrate, a lipid, a vitamin, a virus, a cell, or a combination of one or more of these.

In embodiments, such agents are selectively immobilized on the surface of the nanotubes using conventional linking chemistry (e.g., biologically (e.g., hybridization) and/or chemically (e.g., ionically or covalently)). For instance, the nanotubes can be labeled and/or functionalized with the binding agent by immobilizing reporter molecules (e.g., fluorescent dye molecules) and/or binding agents (e.g., an antibody) on the nanotube surface by attachment to the surface of the nanotube via a linking agent (e.g., a cross-linking agent such as, but not limited to, N-(3-dimethylaminopropyl)-N'-ethyl-carbodiimide hydrochloride (EDC)). In other embodiments, a bioactive agent, particularly with therapeutic agents for delivery to a host or a specific target in a sample or host, the bioactive agent may be coupled to the lignin nanotubes by loading the bioactive agent into the interior of the nanotubes, such that the bioactive agent is physically associated with and contained within the nanotube, but may be easily released from the nanotube upon delivery to the host and/or target.

In some embodiments, a bioactive agent, such as a therapeutic agent, may be attached to the surface of the nanotubes as well as loaded into the interior of the tubes. In embodiments, multiple bioactive agents are coupled to the nanotubes, such as a combination of a binding agent, a reporter molecule, and/or a therapeutic agent, and the like. For instance, in a nonlimiting embodiment, a binding agent for a specified target may be attached to the surface of a nanotube, while a therapeutic agent directed at the specified target may be loaded in the interior of the nanotube for delivery to the specified target. Such an embodiment may also include a reporter molecule to allow enhanced detection of the nanotubes to determine delivery to the specified target. Other combinations of bioactive agents are intended to be included in the scope of the present disclosure.

In an embodiment, the nucleic acids (e.g., DNA) can be coupled to the lignin nanotubes. In embodiments, the nanotubes can be used to deliver nucleic acids (e.g., genes, plasmid DNA, etc.) to living cells. Nucleic acids, such as plasmid DNA can be coupled to the lignin nanotubes directly or via a linking agent such as biotin. In an embodiment, nucleic acid can be biotinylated and combined with lignin nanotubes, resulting in association of the nucleic acid with the nanotubes via the biotin. The lignin nanotubes can then carry the nucleic acid into a cell (e.g., into the cytosol and/or into the cell nucleus) where the nucleic acid can be expressed by the cell.

Due to the biological origins of lignin, the lignin nanotubes of the present disclosure are already naturally more biocompatible than conventional carbon nanotubes, or nanostructures made from metal or synthetic materials; however, it may be desirable to further functionalize the lignin nanotubes with biocompatibility molecules to further enhance biocompatibility in certain systems. An exemplary biocompatibility molecule is polyethylene glycol (PEG).

In an exemplary embodiment, the nanotube is functionalized with one or more binding agent(s) capable of binding or otherwise associating with one or more biomolecule(s) of interest. Although the nanotubes have inherent fluorescence due to the optical properties of lignin, the nanotube may be labeled with a reporter molecule (e.g. a fluorescent or luminescent dye) to allow enhanced detection of the nanotube. In an embodiment, a report molecule may be associated with a nanotube coupled to a binding agent for a target biomolecule to enhance detection of the bound nanotube in a sample being tested for the presence of a biomolecule.

A biomolecule includes, but is not limited to, naturally occurring substances such as polypeptides, polynucleotides, lipids, fatty acids, carbohydrates, vitamins, co-factors, whole cells, viruses, microorganisms such as protozoa, archaea, fungi, algae, mycoplasma, bacteria, or combinations thereof. In one embodiment of the present disclosure, the biomolecule to be detected is within a cell, thus allowing the detection of cells infected with, or otherwise harboring, a virus, pathogen, or other biomolecule of interest. In another exemplary embodiment, the biomolecule is a surface molecule or surface antigen on the surface of a pathogen (e.g., a bacterial cell), or the biomolecule is a toxin or other byproduct of a pathogen (e.g., a toxin produced by a bacterial cell).

The binding agent can be a polynucleotide, polypeptide, carbohydrate, lipid, or the like. Exemplary polypeptide binding agents include, but are not limited to, antibodies or fragments thereof. The binding agent can be attached to a surface of the nanotube using conventional linking chemistry. The binding agent can be capable of binding and/or specific for a target biomolecules of interest. When a biomolecule of interest, a specified target, is introduced to the nanotube, the target binds or otherwise interacts with the binding agent bound to the nanotube. Generally, the target can be present or believed to be present in a cell, tissue or fluid sample. Exemplary samples include buccal cells, buffered solutions, saliva, sweat, tear, phlegm, urine, blood, plasma, cerebrospinal fluid, or combinations thereof. In embodiments, interaction between the target and the binding agent can be detected by a detectable signal, such as inherent fluorescence of the lignin nanotubes or another signal that can be detected (e.g., a reporter molecule associated with (e.g., bound or otherwise coupled to) the nanotube). In an exemplary embodiment, the signal is provided by a reporter molecule, such as a fluorescent dye molecule, bound to or otherwise associated with the nanotube.

Thus, in embodiments nanotubes are labeled with a reporting molecule, preferably a fluorescent or luminescent dye, and are functionalized with a binding agent capable of binding or otherwise associating with the target biomolecule of interest. Thus, when the composition of nanotubes is applied to a host or a sample to be tested (e.g. cells obtained from a host), if the biomolecule is present, the nanotubes associate with the biomolecule via the binding agent and the presence can be detected via the signal (e.g., fluorescence) provided by the reporting molecule.

Since the lignin nanotubes of the present disclosure can be coupled to such a variety of biomolecules, useful for various purposes, the present disclosure also includes compositions including lignin nanotubes of the present disclosure with at least one biomolecule (such as, but not limited to, one or more of those described above) coupled to the nanotube, and a pharmaceutically acceptable carrier. The present disclosure also includes methods of delivering a bioactive agent to a host using the lignin nanotubes of the present disclosure. In some embodiments, the methods includes administering to the host a composition including lignin nanotubes of the present disclosure that are coupled to a bioactive agent to be delivered to the host. The bioactive agent can be, but is not limited to, a reporter molecule, a therapeutic agent (e.g., drug, DNA, protein, etc.), or both. In embodiments, the methods also include delivering the bioactive agent to a specified target in the host, where the nanotube also includes a binding agent specific for the specified target. These aspects are described in greater detail below.

In addition, the present disclosure includes probes comprising the nanotubes of the present disclosure and compositions comprising the nanotubes of the present disclosure and a pharmaceutically acceptable carrier. In embodiments, the present disclosure includes probes including a lignin nanotube of the present disclosure capable of producing a detectable signal and a binding agent coupled to the lignin nanotube, where the binding agent can bind to a specified target. In embodiments, the detectable signal is the natural fluorescence of the lignin nanotube detectable by irradiation with UV light. In other embodiments, the detectable signal also includes a reporter molecule coupled to the lignin nanotubes and capable of producing a detectable signal. The present disclosure also includes methods of using the nanotubes of the present disclosure as probes to detect a specified target in a host or a sample or to deliver a bioactive agent (e.g., a therapeutic agent) to a specified target in a host.

In embodiments, the present disclosure includes methods including attaching or otherwise coupling at least one binding agent to a lignin nanotube or plurality of nanotubes of the present disclosure to provide a composition of nanotubes functionalized with a binding agent, contacting the composition of nanotubes with the sample containing the analyte of interest (e.g., a specified target), and detecting the presence of the labeled nanotubes. In an embodiment, a method for detecting a biomolecule of interest in a sample includes contacting the sample with a composition including a plurality of nanotubes, where the nanotubes include a binding agent having an affinity for the biomolecule of interest (e.g., a specified target). In such embodiments, the nanotubes are capable of providing a detectable signal and, in the presence of the biomolecule of interest, bind the biomolecule of interest. The method further includes detecting the signal produced by the nanotubes to determine the presence or absence of the biomolecule of interest, where detection of the detectable signal in the sample indicates the presence of the specified target. In embodiments, such methods of detecting a specified target also include removing unbound nanotubes from the sample. In embodiments, the detectable signal of the nanotubes is the natural fluorescence of the lignin nanotubes, and in other embodiments, the nanotubes also include a reporter molecule coupled to the nanotube to provide the detectable signal.

Additional details regarding the lignin nanotubes of the present disclosure, probes comprising the lignin nanotubes, compositions comprising the lignin nanotubes, methods of making and functionalizing the nanotubes of the present disclosure, and methods of using the lignin nanotubes of the present disclosure to detect a specified target and/or deliver a bioactive agent can be found in the Examples.

The specific examples below are to be construed as merely illustrative, and not limitative of the remainder of the disclosure in any way whatsoever. Without further elaboration, it is believed that one skilled in the art can, based on the description herein, utilize the present disclosure to its fullest extent. All publications recited herein are hereby incorporated by reference in their entirety.

It should be emphasized that the embodiments of the present disclosure, particularly, any "preferred" embodiments, are merely possible examples of the implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure, and protected by the following embodiments.

The following examples are put forth so as to provide those of ordinary skill in the art with a complete disclosure and description of how to perform the methods and use the compositions and compounds disclosed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value.

EXAMPLES

Now having described the embodiments of the present disclosure, in general, the following Examples describe some additional embodiments of the present disclosure. While embodiments of present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure Example 1

Materials & Methods
Synthesis of Lignin Nanotubes:

Commercially available nanopore alumina membranes (60 µm thick, nominal pore diameter 200 nm) were obtained from Whatman and boiled for 15 min at 100° C. in 30% (v/v) hydrogen peroxide to increase the number of reactive hydroxyl groups on the surface, then rinsed by boiling in deionized water for 15 min. The membranes were dried under nitrogen and functionalized with amino groups by immersing the alumina membranes in 2% (v/v) (3-aminopropyl)-trimethoxysilane in ethanol for 1 h. The membranes were copiously rinsed with 100% ethanol, air-dried, and oven-cured overnight at 100° C. Thioglycolate lignin was extracted from approximately 20 mg maize brown midrib1 (bm1) stover, which contains lignin with increased levels of coniferaldehyde (as described in Vermerris, et al., 2002, incorporated herein in its entirety). The stover had been pre-extracted in 50% (v/v) ethanol at 60° C. and oven-dried (50° C.). The lignin pellet was rinsed several times with deionized water and dissolved in 0.5 M NaOH as described in Bruce and West, 1989, incorporated herein in its entirety. A 2-mL volume of solublilized thioglycolate-lignin was adjusted to pH 8.0 with 2 M HCl and diluted with 50 mM sodium phosphate buffer pH 7.4 containing 1 M NaCl to a final volume of 10 mL. Aminosilane derivatized membrane segments of approximately 1.5 $cm^2$ were immersed in 2 mL of the phosphate buffer containing thioglycolate-lignin and incubated for 24 h at 4° C. The membranes were copiously rinsed with 100% ethanol, and dried under nitrogen. The resulting coating served as a template onto which a dehydrogenation polymer (DHP) was deposited via oxidative coupling of hydroxycinnamyl alcohols (coniferyl alcohol), hydroxycinnamaldehydes (coniferaldehyde) or hydroxycinnamic acids (ferulic acid, p-coumaric acid), either neat or in mixtures. Each sample of lignin-functionalized alumina template was immersed in a 3-mL solution containing 25 mM of the particular monomer (mixture) dissolved in 100 mM potassium phosphate buffer pH 6.0. Then 0.2 mL of freshly prepared solution of 0.2 mg/mL horseradish peroxidase (188 purpurogallin units/mg) in 0.1 M potassium phosphate buffer pH 6.0 was added, followed by drop-wise addition at room temperature of 20 µL 200 mM hydrogen peroxide every 4 min. for a period of 2 h. The reaction solution was removed and the alumina template was copiously washed with 100 mM potassium phosphate buffer pH 6.0. Additional washes with 100% ethanol were carried out and the membranes were dried under nitrogen. A total of four layers of DHP were deposited onto the lignin base layer. In order to release the lignin-based nanostructured material, the alumina template was dissolved by immersion in 5% (v/v) phosphoric acid containing 0.5% (v/v) Triton X-100 surfactant. After 4 h the template was completely dissolved, and the released nanotubes were sonicated for 15 min. The nanotubes were collected by centrifugation (4000 rpm, 4° C.) and washed four times with water containing 0.05% (v/v) Triton X-100.

Physico-Chemical Characterizations:

SEM and EDS were performed using a JEOL JSM 6335F field-emission scanning electron microscope linked to a Si(Li) Energy Dispersive Spectrometer ISIS system from Oxford Instruments, Ltd. For imaging, 50 µL of a solution containing the lignin nanotubes was pipetted onto nitrocellulose, dried at room temperature, and mounted on alumina stubs. The samples were Au/Pd sputter-coated for imaging purposes, and coated with carbon using a carbon evaporator for the EDS analysis. Glass slides were carbon coated and mounted on alumina stubs for SEM imaging. TEM was performed on lignin nanotubes pipetted onto TEM Cu-grids with a graphite support film. A JEOL 2010F field emission TEM was used to acquire the images. Pyrolysis-GC-MS was performed on 1 mg dried nanotubes placed in a quartz cup and introduced in a 1079 programmable temperature vaporization (PTV) injector (Varian, Walnut Creek, Calif.) mounted on a Varian 3800 gas chromatograph coupled to a Varian 1200 mass spectrometer. The nanotubes were pyrolyzed at 450° C. under helium and the resulting thermal degradation products were separated on a capillary column (25 m, 0.32 mm i.d. fused silica coated with SGE-BPX5), which was inserted in the PTV outlet set at 325° C. Gas chromatography was carried out with helium as carrier gas, at a constant flow rate of 2.5 mL $min^{-1}$. The split ratio was 1/20. The GC program started at 70° C. for 1 min, followed by a temperature increase to 220° C. at a rate of 4° C. $min^{-1}$, followed by a temperature increase to 325° C. at 6° C. $min^{-1}$. The mass spectrometer was operated at 1.2 kV. The mass range included mass-to-charge ratio (m/z) 45 to 350 and was scanned every 0.20 s. Data were acquired using Varian WS software. Compound identification was based on a combination of the NIST 08 mass spectral library and Ralph and Hatfield (1991), which is incorporated herein by reference in its entirety).

Quantification of Lignin Nanotubes Used for Bio-Functionalization Experiments:

Nanotubes produced as described above from equimolar amounts of ferulic and p-coumaric acid were liberated via acid dissolution of the alumina membrane template, collected via centrifugation, washed in ddH$_2$O and suspended in 2 mL ddH$_2$O, Nanotubes were quantified as lignosulfonic acid equivalents, based on a calibration with lignosulfonic acid (SigmaAldrich) with an average molecular weight of 12,000 g/mole, dissolved in 1 M NaOH. Absorbance was measured spectrophotometrically at 280 nm on a SpectraMax M5 plate reader.

Amino-Derivatization of Glass Platforms:

Pieces of glass microscope slides with an approximate area of 1 cm$^2$ were thoroughly cleaned with freshly prepared piranha solution (3:1 concentrated sulfuric acid and 30% (v/v) hydrogen peroxide, 65° C. for 45 minutes). The cleaned glass slides were placed in a Teflon beaker containing 50 ml ethanol and 1 ml APTES, pH-adjusted to 4.5 with acetic acid, and incubated for 30 minutes to functionalize the glass with amino groups. The slides were extensively rinsed with ethanol to remove excess silane, dried under a nitrogen stream, baked overnight at 105° C. and stored under a nitrogen atmosphere until use, for a maximum of five days.

Figure 11:
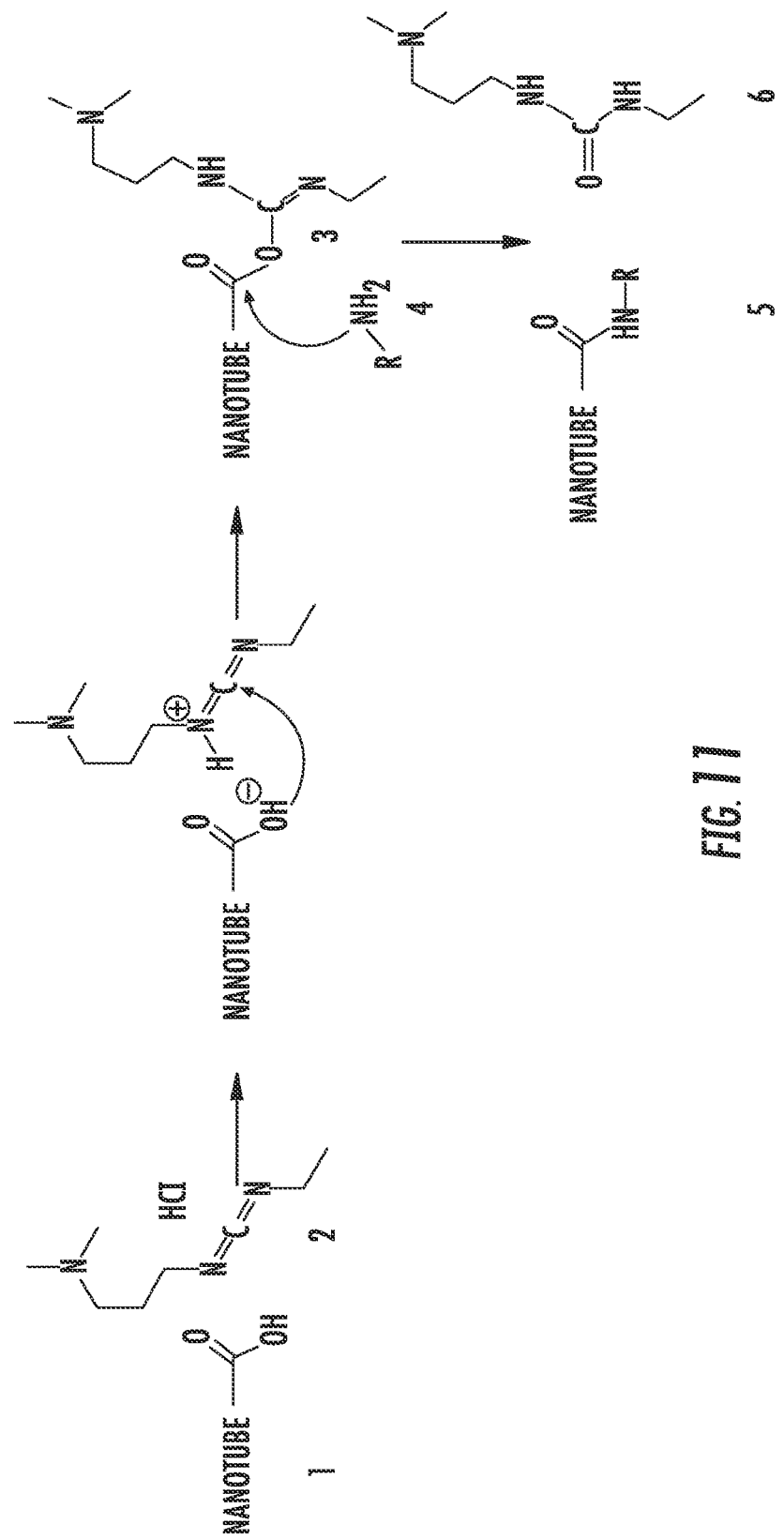
FIG. 11 is a pyrogram of lignin-based nanotubes of the present disclosure derived from coniferyl alcohol. Peak identities are listed in Supplementary Table 1.

Direct Immobilization of Lignin Nanotubes onto Amino-Derivatized Glass Platforms:

The amino-derivatized glass surfaces were extensively rinsed with 100 mM MES buffer pH 7.0 containing 500 mM NaCl. The upper surface of each glass section was covered with 0.2 ml MES/NaCl buffer containing 5 mg/ml of the activating agent N-(3-dimethylaminopropyl)-N'-ethylcarbodiimide hydrochloride (EDC; SigmaAldrich), which activates carboxyl groups thus catalyzing the formation of amide bonds (FIG. 11), and 0.25 ml of a suspension of lignin nanotubes (in water containing 0.05% (v/v) Triton X-100) with a concentration of 90 µM lignosulfonic acid equivalents. Following incubation at 4° C. for 4 h, surfaces were rinsed copiously with 0.1 M phosphate-buffered saline (PBS) pH 7.4 and ddH$_2$O and viewed under an Olympus MVX10 fluorescence microscope using the red fluorescence filter to detect the intrinsic signal from the lignin nanotubes. Negative controls were identical as described above, except that EDC was omitted, thus limiting the formation of amide bonds between the amino-functionalized glass and the carboxyl groups on the exterior of the nanotubes.

Immobilization of Lignin Nanotubes Functionalized with Avidin onto Glass Functionalized with Desthiobiotin:

Derivatization of the glass surface with desthiobiotin was identical as described above, except that 1 mg/ml desthiobiotin (SigmaAldrich) was added to the 100 mM MES/500 mM NaCl buffer containing 5 mg/ml EDC. After 4 h incubation at 4° C. the desthiobiotin-derivatized surfaces were rinsed with PBS pH 7.4. Lignin nanotubes were derivatized concurrently with Avidin-fluorescein isothiocyanate (FITC) (SigmaAldrich) by combining 2 ml MES/NaCl buffer containing 5 mg/ml EDC, 2 mg Avidin-FITC and 0.5 ml of a suspension of lignin nanotubes (90 µM lignosulfonic acid equivalents). A 0.2 ml-volume of the avidin-FITC-functionalized nanotube suspension was placed on the surface of the desthiobiotin-derivatized glass and incubated for 4 h at 4° C. to allow binding. Afterwards, the surfaces were rinsed copiously with PBS pH 7.4 and ddH$_2$O, and visualized under fluorescence microscope using an RFP or GFP filter to detect the nanotubes or the FITC, respectively. Negative controls were identical as described above, except that EDC was omitted in the functionalization reaction of the nanotubes.

Immobilization of Lignin Nanotubes Functionalized with Anti-Concanavalin a onto Glass Functionalized with Concanavalin A:

Amino-derivatized glass surfaces were extensively rinsed with 0.1 M PBS pH 7.4, incubated for 2 h at room temperature in a beaker containing 20 ml 4% glutaraldehyde in 0.1 M PBS pH 7.4, washed in PBS and ddH$_2$O, and dried and stored under a nitrogen atmosphere until use. The upper surface of each piece of amino-linked-derivatized glass was incubated at 4° C. for 4 h with 0.2 ml PBS containing 1 mg/ml of FITC-labeled concanavalin A (SigmaAldrich). Concurrently, lignin nanotubes were functionalized in 2 ml MES/NaCl buffer containing 5 mg/ml EDC, 1 mg/ml anti-concanavalin A (SigmaAldrich), and 0.5 ml of suspension of lignin nanotubes (90 µM lignosulfonic acid equivalents). After rinsing the FITC-concanavalin A-derivatized glass surfaces with PBS, 0.2 ml of the anti-concanavalin A-functionalized nanotube suspension was placed on the upper surface of each piece of glass and incubated at 4° C. for 4 h. Afterwards, the surfaces were rinsed copiously with PBS and ddH$_2$O, and visualized under fluorescence microscope using the RFP filter. Negative controls were identical as described above, except that EDC was omitted in the functionalization reaction of the nanotubes.

Results and Discussion

Synthesis of Lignin Nanotubes

A schematic illustration of the reaction mechanism for the template synthesis of lignin nanotubes is shown in FIG. 1. The pore walls of commercially available alumina membranes ($10^9$ pores cm$^{-2}$) were first activated with (3-aminopropyl)-triethoxysilane (APTES). Aldehyde-rich lignin was isolated from stover of brown midrib1 (bm1) mutant maize (*Zea mays* L.) (Vermerris et al. 2002, incorporated herein by reference in its entirety) using the thioglycolic acid procedure (as described by Bruce and West, 1989, incorporated herein by reference in its entirety) and subsequently attached to the walls of amino-silane functionalized pores of alumina membrane via a Schiff's base reaction. The covalently-attached lignin base layer inside of the membrane pores served as a template onto which a layer of dehydrogenation polymer (DHP; 'synthetic lignin') was deposited via a horseradish peroxidase-catalyzed reaction using either cinnamyl alcohols (monolignols), hydroxycinnamylaldehydes, or hydroxycinnamic acids (Shimada et al., 1971 and Nakamura and Higuchi, 1978, both incorporated by reference herein in their entirety).

FIG. 2 shows a scanning electron micrograph of the initial synthesis of lignin nanotubes based on oxidative coupling of ferulic acid (4-hydroxy, 3-methoxycinnamic acid) and p-coumaric acid (4-hydroxycinnamic acid; structures provided in FIG. 9) in a 1:1 molar ratio onto the base layer of thioglycolate lignin. In addition to the deposition of lignin inside the pores of the membrane, material was deposited on the top and bottom surfaces of the membrane. This resulted in the formation of bundles of nanotubes or nanowires that could not be separated into individual structures unless the top and bottom layers were removed via mechanical abrasion with a razor blade and cotton swabs impregnated with dichloromethane. Even after removal of the top and bottom layers, the nanotubes continued to form bundles, some of which were intertwined, most likely due to the presence of strong Van der Waals interactions between adjacent nanotubes. The protocol was improved by sputter coating the top and bottom surfaces of the membrane with Au/Pd prior to functionalization, rendering them inert to the reaction with APTES. In addition, surface tension during the dissolution of the membrane was minimized with the addition of the surfactant Triton X-100. A sonication step was included to maximize the disruption of intermolecular attractive forces involved in the nanotube aggregation. It is possible that the benzene rings and alkyl chains of the Triton X-100 are able to effectively adsorb on the tubes through the formation of aromatic stacking interactions during the process of nanotube release from the membrane, thus stabilizing the individual nanotubes (Islam et al. 2003, Hasan et al. 2007, both of which are incorporated herein by reference in their entirety).

Structural and Chemical Characterization of Lignin Nanotubes

Figure 3A:
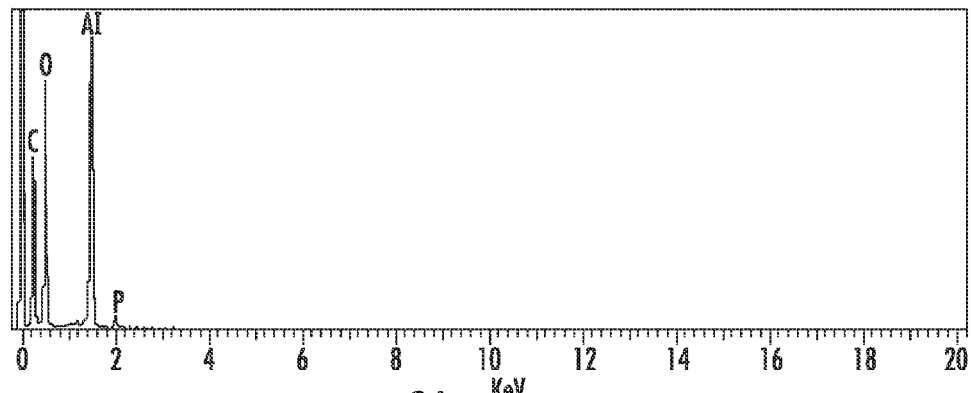
FIGS. 3A-3B illustrate EDS microanalysis for the local chemical composition of an embodiment of lignin nanotubes of the present disclosure.
Figure 3B:
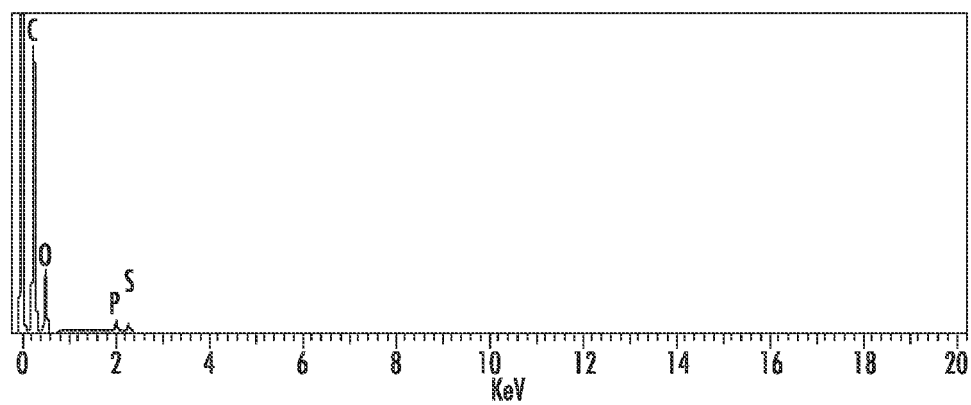
Figure 3C:
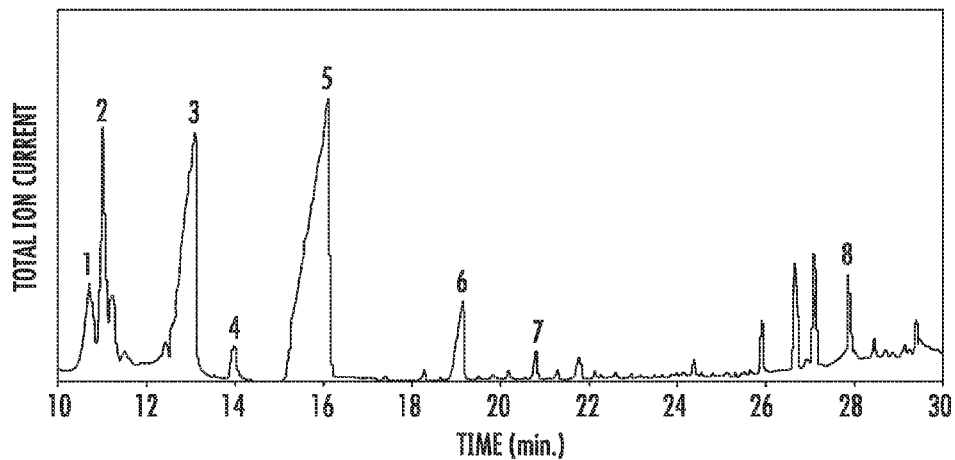
FIG. 3C is a pyrogram of lignin-based nanotubes synthesized using a 1:1 molar ratio of p-coumaric acid and ferulic acid. Peaks representing compounds for which the identity could be unambiguously established based on the NIST08 spectral library and Ralph and Hatfield (1991) are as follows, with the m/z values of the main ions, including the molecular ion $[M]^+$, and the most likely origin of the compound in parentheses: 1. 4-ethylphenol (m/z 122 $[M]^+$, 107; p-coumaric acid), 2. 2-methoxy-4-methylphenol (m/z 138 $[M]^+$, 123; ferulic acid, residues derived from coniferyl alcohol in lignin base layer), 3. 4-vinylphenol (m/z 120 $[M]^+$, 91; p-coumaric acid), 4. 4-ethyl-2-methoxyphenol (m/z 152 $[M]^+$, 137; ferulic acid, residues derived from coniferyl alcohol in lignin base layer), 5. 4-vinylguaiacol (m/z 150 $[M]^+$, 135; ferulic acid), 6. vanillin (m/z 152 $[M]^+$, 151; coniferaldehyde in lignin base layer), 7. 2-methoxy-4-propylphenol (m/z 166 $[M]^+$, 137; ferulic acid; residues derived from coniferyl alcohol in lignin base layer), 8. ferulic acid methyl ester (m/z 208 $[M]^+$, 177, 145; ferulic acid).
Figure 10B:
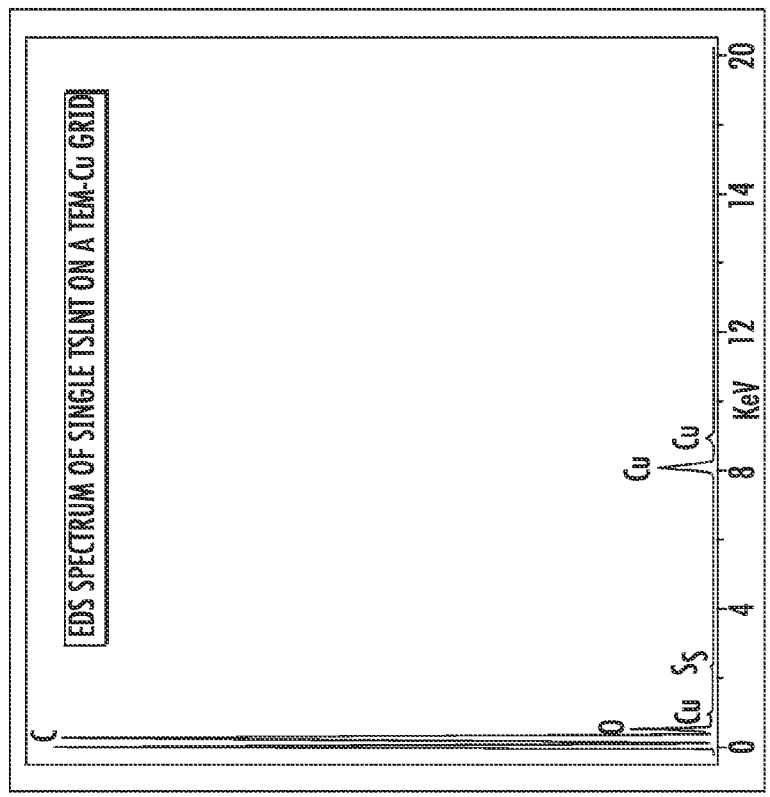
FIG. 10B illustrates EDS microanalysis of the local chemical composition of a single lignin nanotube on a TEM-Cu grid. The spectrum is derived from the area marked by the circle.
Figure 10A:
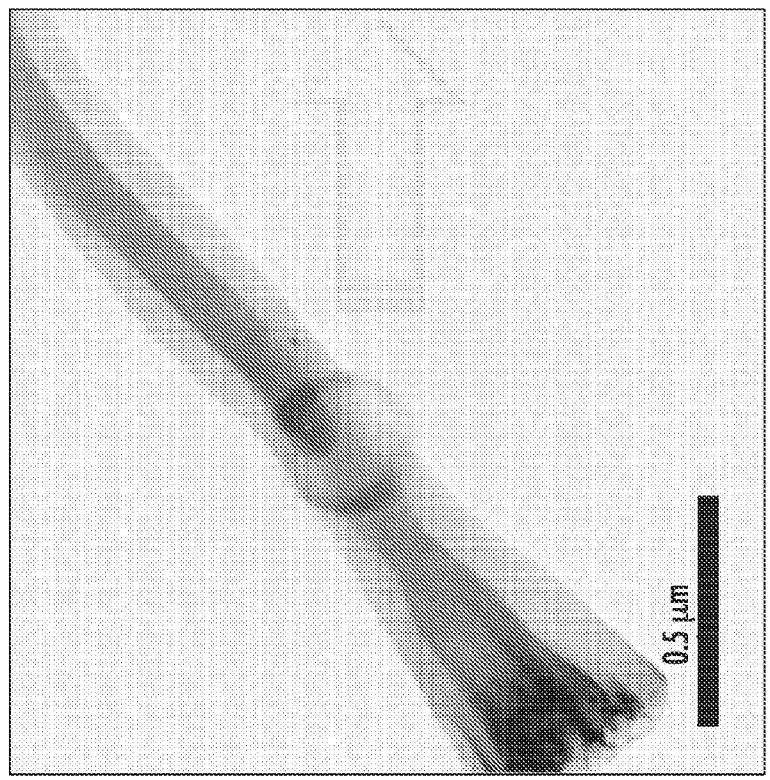
FIG. 10A is a digital image of a lignin nanotube of the present disclosure.

Gross chemical (elemental) composition of the lignin-based nanotubes was determined with energy dispersive X-ray spectroscopy (EDS) microanalysis and revealed that the examined nanostructure is essentially composed of carbon, oxygen, and sulfur (FIG. 3; FIG. 10). The presence of these elements is consistent with the chemical composition of the thioglycolate-lignin (C, H, O, S). Quantification of the individual elements could not be performed because the specimens were carbon coated as part of the analysis, and are susceptible to surface contamination by water and carbonate groups (from $CO_2$ in the air). In addition there are limitations associated with the measurement of very light elements using EDS (Bastin and Heijligers 1986). The chemical composition of the nanotubes determined with pyrolysis-GC-MS confirmed that p-coumaric and ferulic acid were the major components as evidenced by the large peaks representing their respective breakdown products, 4-vinylphenol (m/z 120 $[M]^+$, 91) and 4-vinylguaiacol (m/z 150 $[M]^+$, 135) (FIG. 3C) (Ralph and Hatfield, 1991 and Vermerris, et al., 2010, incorporated herein by reference in their entirety). The presence of the lignin base layer derived from the stover of the maize bmf mutant is evident from the presence of vanillin (m/z 152 $[M]^+$, 151), a breakdown product of coniferaldehyde (Vermerris, 2010).

Figure 4A:
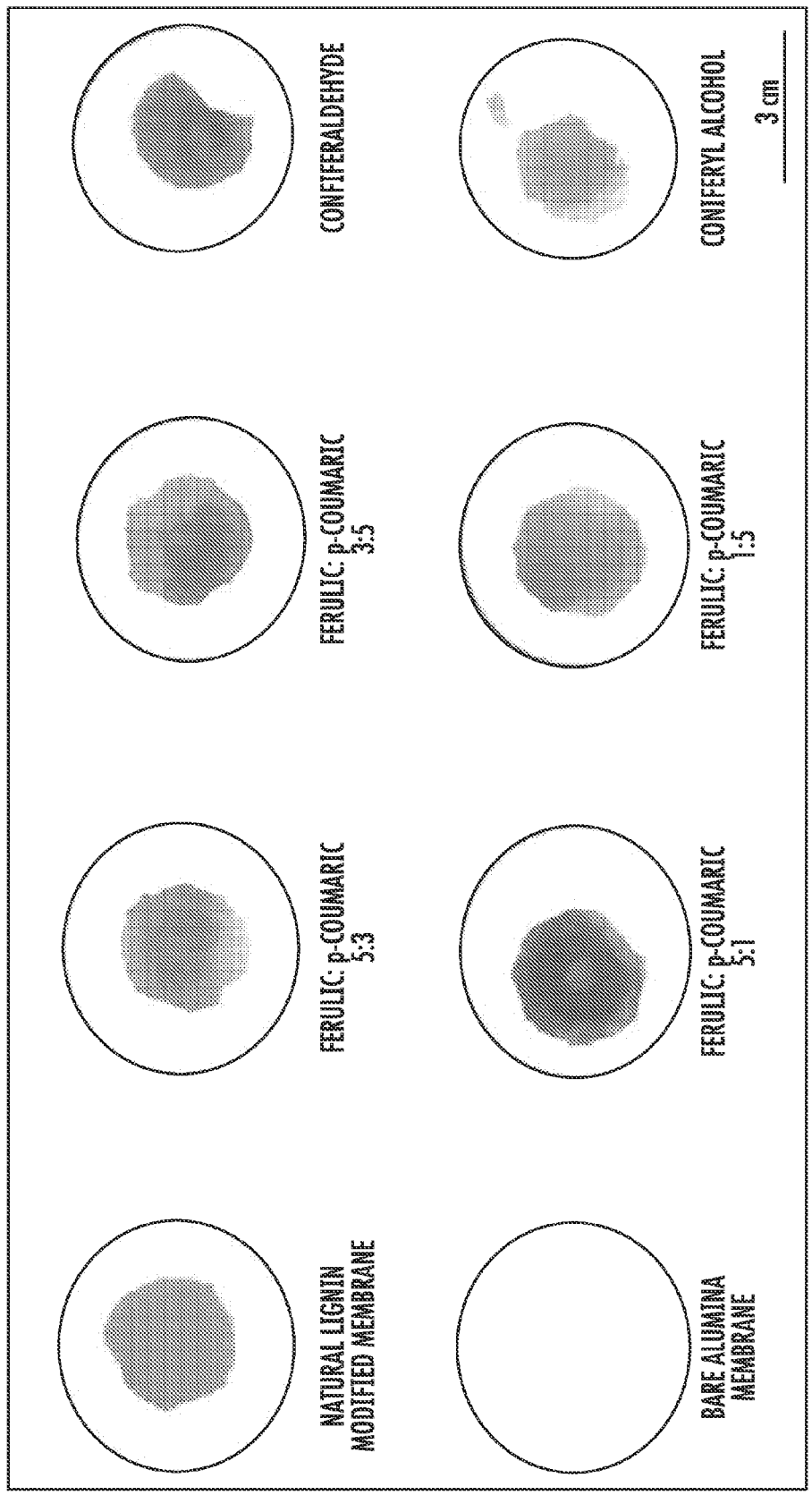
FIGS. 4A-4C are digital images of photographs and fluorescence microscopy images of alumina templates before and after lignin nanotube synthesis.
Figure 4B:
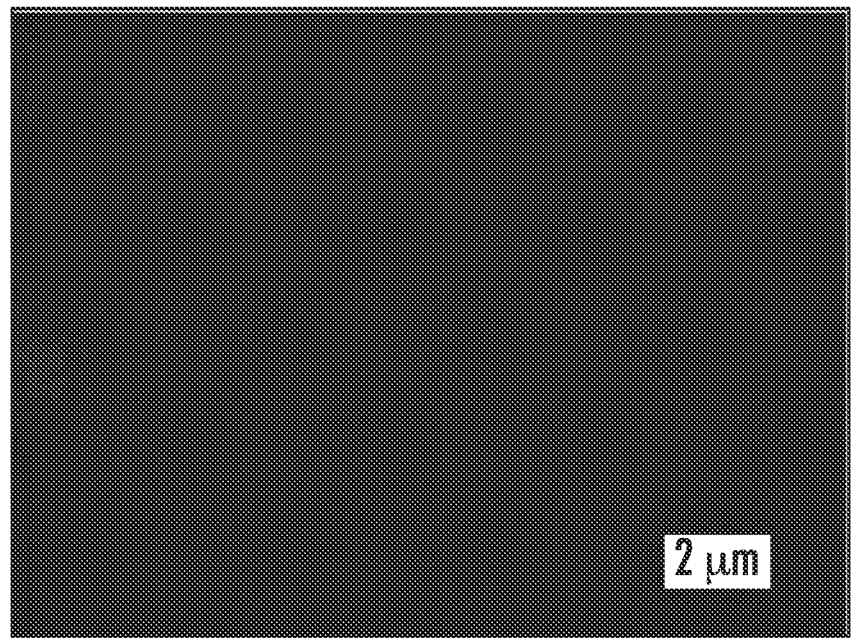
Figure 4C:
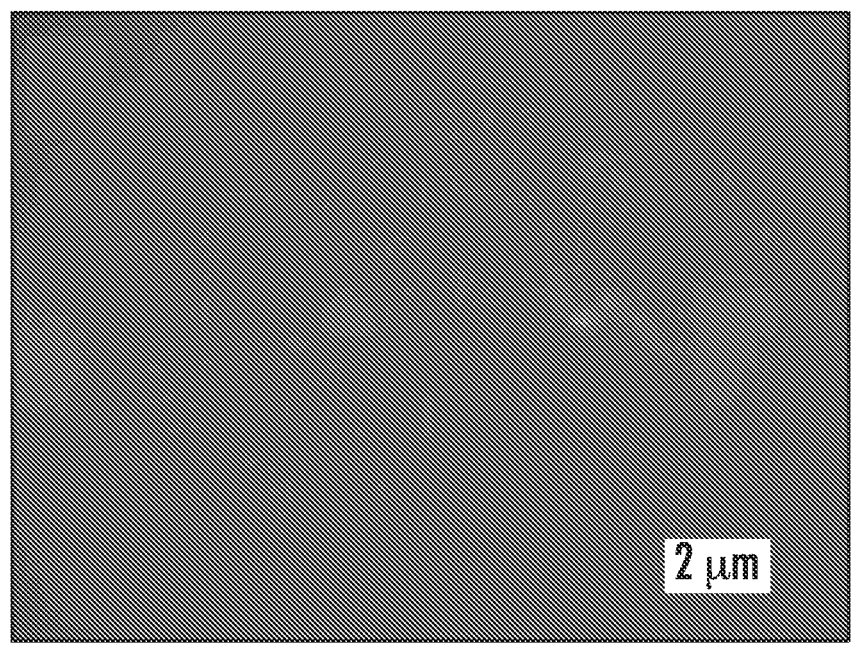

Next, the effects of monomer composition and monomer ratio on the physico-chemical properties of the lignin-based carbon nanotubes were investigated. Nanotubes derived from coniferyl alcohol, coniferaldehyde, ferulic acid, p-coumaric acid (chemical structures provided in FIG. 9), and mixtures of ferulic acid and p-coumaric acid (in 5:1, 5:3, 3:5, and 1:5 molar ratios) were synthesized with the improved protocol. Striking differences in the color of the deposits on the membranes were apparent (FIG. 4), which are consistent with reports on in vitro synthesized dehydrogenation polymers (DHP) (Higuchi et al. 1994, incorporated herein by reference in its entirety). Color differences are illustrated as varying shades of gray in the black and white image shown in FIG. 4A, and the fluorescence of the membrane containing lignin nanotubes in FIG. 4C has red fluorescence which appears as a shade of gray in the black and white image, as contrasted with the stark black image of the bare alumina template in FIG. 4B. Furthermore, the nanotubes formed inside the membranes fluoresced when excited with UV radiation, consistent with the autofluorescence properties of natural lignin (Albinsson et al., 1999, incorporated herein by reference in its entirety). This attribute provides value to monitor the transport and/or location of lignin nanotubes in biological systems.

Figure 5:
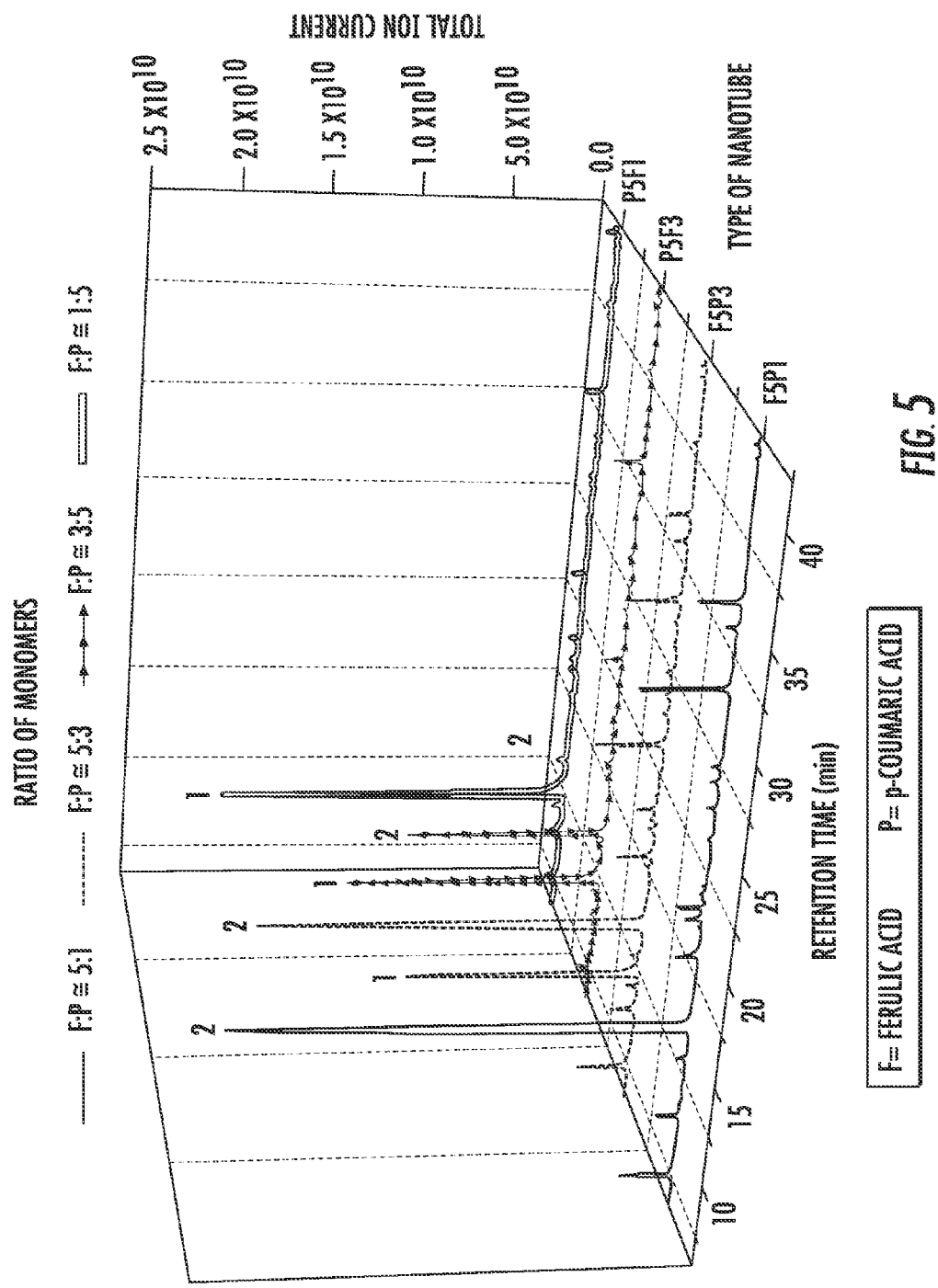
FIG. 5 illustrates variation in chemical composition as revealed by total ion chromatograms obtained after analytical pyrolysis of lignin nanotubes synthesized with different monomer ratios. The peaks labeled as '1' (retention time 7.5 min.) and '2' (retention time 15 min.) represent 4-vinylphenol and 4-vinylguaiacol, respectively, which are breakdown products from p-coumaric acid- and ferulic acid-derived polymers.
Figure 6A:
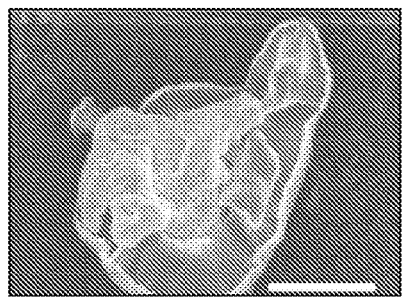
FIGS. 6A-6D and FIGS. 6F-6I are SEM images of lignin nanotubes of the present disclosure.
Figure 6B:
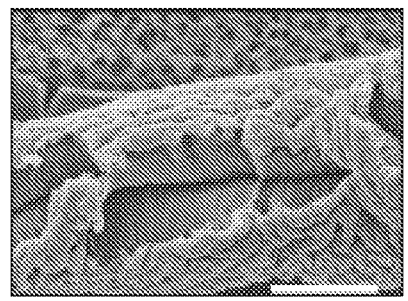
Figure 6C:
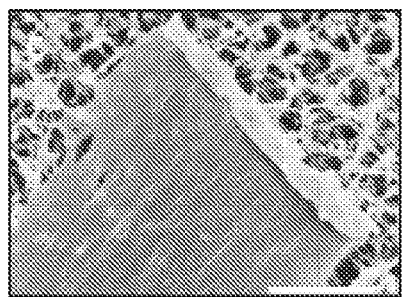
Figure 6D:
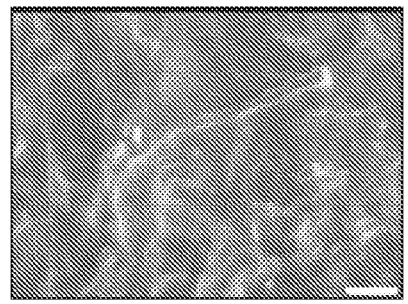
Figure 6E:
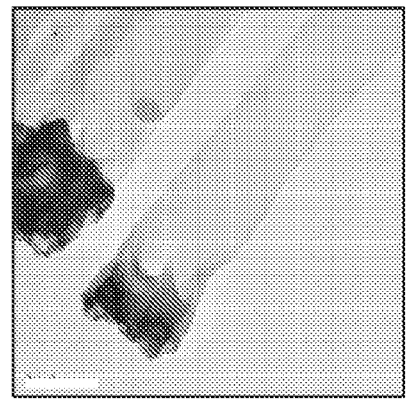
FIGS. 6E and 6J are TEM images of the lignin nanotubes. The lignin nanotubes were synthesized with 5:1 (FIGS. 6A-6E) and 1:5 (FIGS. 6F-6J) molar ratios of ferulic acid and p-coumaric acid, respectively. Digital images 6A-6E represent sequential phases of membrane dissolution leading to the formation of free nanotubes, whereas images 6F-6J show the corresponding stages leading to the formation of free nanowires. Scale bars are as follows: A. 20 µm, B. 7.5 µm, C. 4.29 µm, D. 1 µm, E. 0.2 µm, F. 15 µm, G. 12 µm, H. 2.73 µm, I. 2.73 µm, J. 0.2 µm.
Figure 6F:
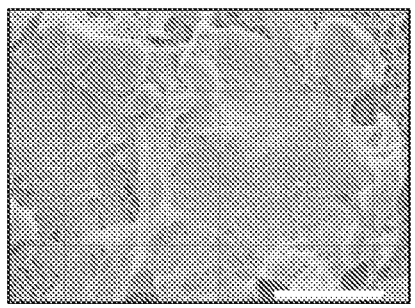
Figure 6G:
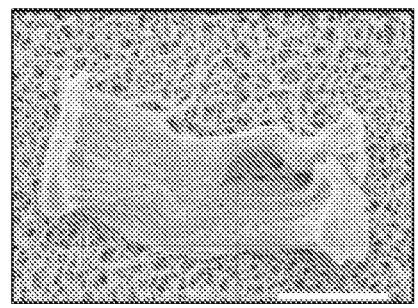
Figure 6H:
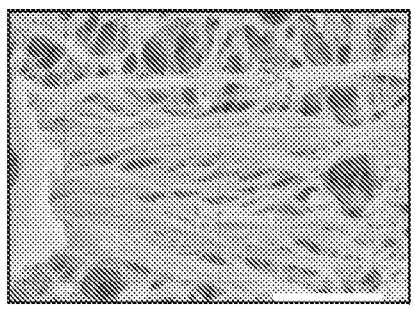
Figure 6I:
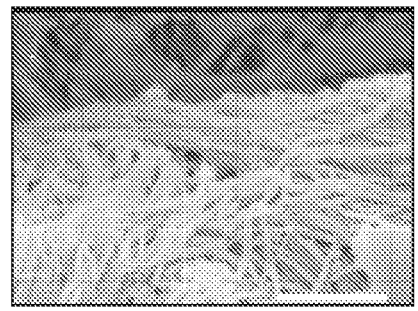
Figure 6J:
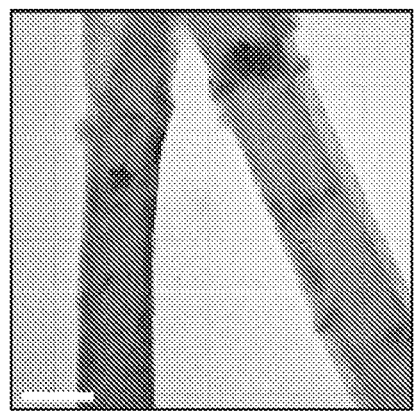

The chemical composition of the nanotubes determined with pyrolysis-GC-MS reflected the variation in monomer composition (FIG. 5). In order to assess the impact of monomer composition on the overall structure of the nanotubes, transmission electron microscopy (TEM) and scanning electron microscopy (SEM) were employed to measure wall thickness and nanototube surface structure. Given that the pore size of the template is known, and that TEM is performed in vacuo, hollow nanotubes will flatten out and appear wider than the pore size, whereas solid nanowires will have diameters equal to the pore size of the template. FIG. 6 shows SEM and TEM images of nanostructures prepared with 5:1 (FIGS. 6A-6E) and 1:5 (FIGS. 6F-6J) ratios of ferulic acid:p-coumaric acid, respectively. These studies revealed that wall thickness increased with the proportion of p-coumaric acid in the reaction. The synthesis carried out with a higher proportion of ferulic acid resulted in hollow nanotubes. This observation demonstrates that the structural characteristics of the nanotubes are under simple chemical control. We hypothesize that this feature reflects a strong morphological dependence on the rate of the polymerization reaction, with p-coumaric acid being more reactive because of its ability to form cross-links at both the C3 and C5 positions of the phenolic ring, whereas ferulic acid does not have the C3 position available for crosslinks. In addition, the formation of an intermolecular hydrogen bond between the methoxy oxygen and the phenolic hydrogen may further reduce the reactivity of ferulic acid during the enzyme-mediated formation of the corresponding radical. The relationship between the chemical composition of the lignin and physical attributes of the resulting structure is consistent with what has been observed in plants: genetic perturbation of lignin subunit composition resulted in variation in the structure of water-conducting xylem vessels (Nakashima et al. 2008, incorporated herein by reference in its entirety; Vermerris et al. 2010).

Biofunctionalization of Lignin Nanotubes

Figure 7A:
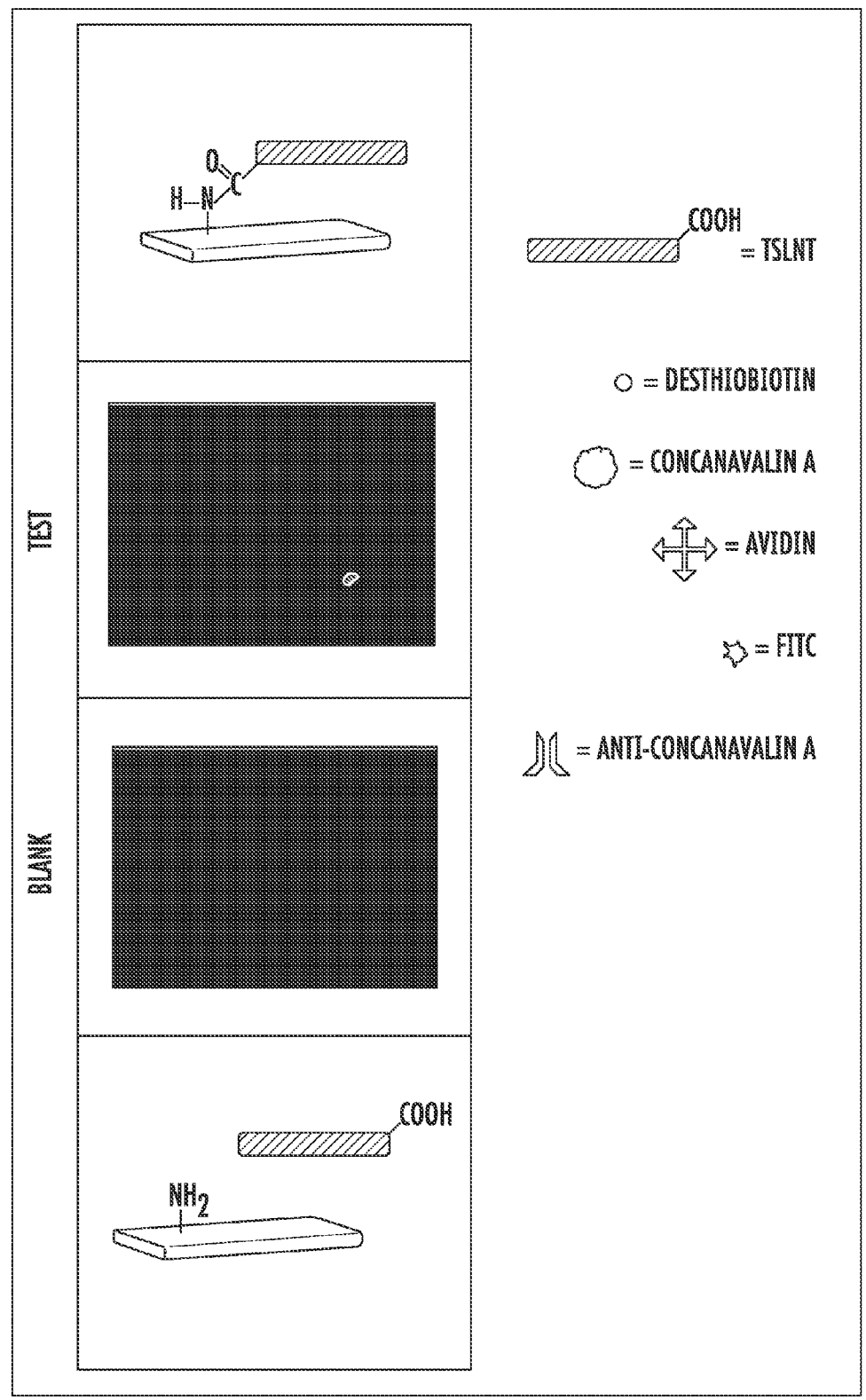
FIGS. 7A-C are UV-fluorescence images (labeled 'test') of bio-functionalized-lignin nanotubes immobilized and visualized on an amino-derivatized glass platform.
Figure 7B:
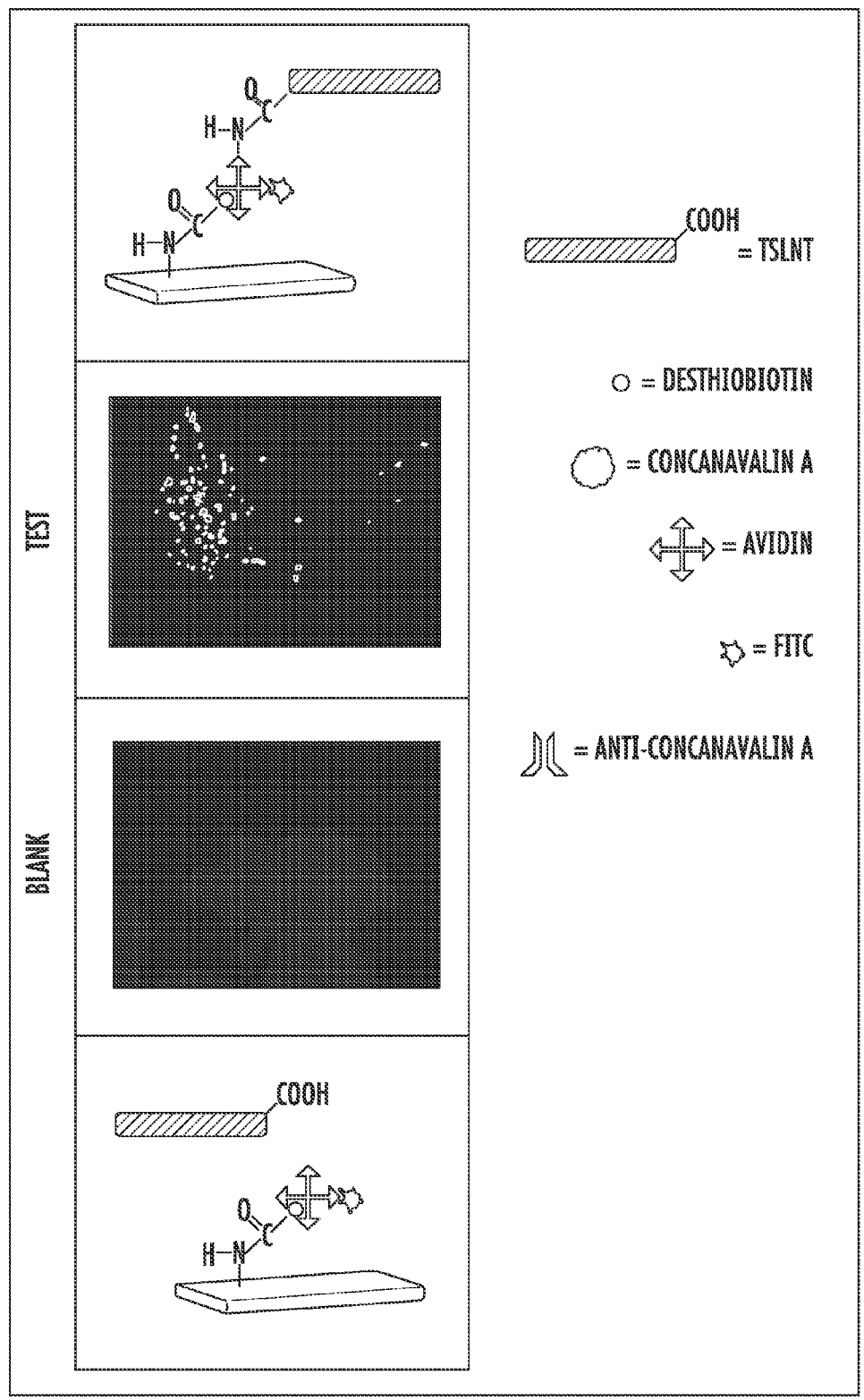
Figure 7C:
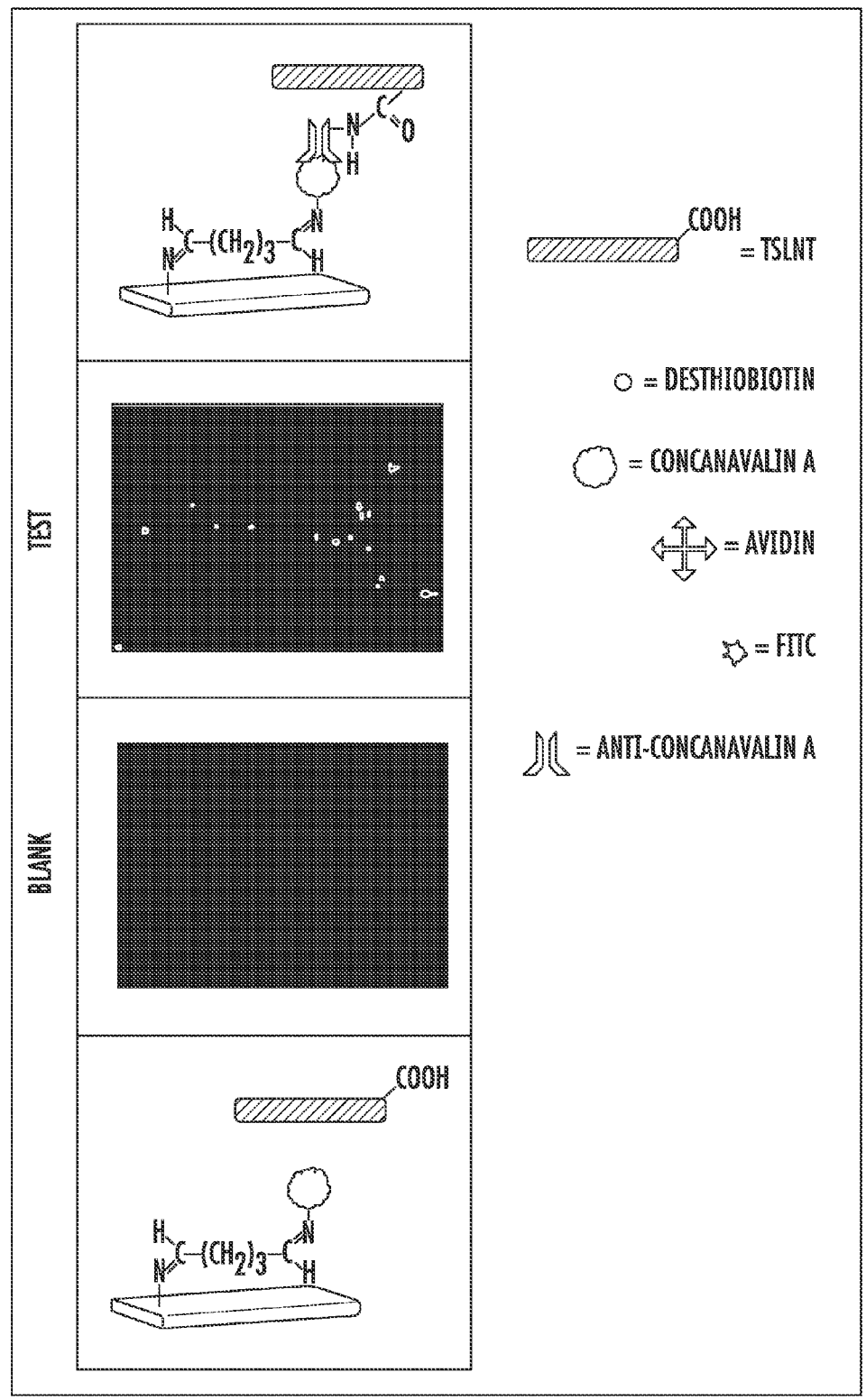

To increase compatibility of lignin nanotubes with biological systems, for example as carriers of bioactive compounds to specific target cells or to organs within the human body, the nanotube surfaces can be bio-functionalized. The rich diversity in chemical bonds and functional groups present in the lignin structure enables multiple approaches for surface modification. Alternatively, the lignin nanotubes can be designed with surface properties tailored to a specific function. Lignin nanotubes synthesized from a 1:1 molar ratio of p-coumaric acid and ferulic acid (as described above) were bio-functionalized, and demonstrated specific immobilization onto an amino-functionalized glass platform. Three different systems were examined: molecular recognition of desthiobiotin with avidin, recognition of concanavalin A with anti-concanavalin A antibodies, and direct immobilization of nanotubes on the glass surface (FIG. 7). The lignin nanotubes were functionalized using EDC as an activating agent of the carboxyl groups present in the lignin, so that amide bonds could be formed with the amino groups on either the glass (direct immobilization) or the proteins (avidin; anti-Concanavalin A). By omitting EDC from the functionalization reaction, observed interactions of the nanotubes with the glass surface would be the result of non-specific binding. The intrinsic fluorescence of the lignin nanotubes permitted a label-free detection under the fluorescence microscope (FIGS. 7A and 7C). However, FITC-labeled proteins were also employed to obtain additional evidence in support of the bio-molecular recognition reactions (FIG. 7B).

Figure 8A:
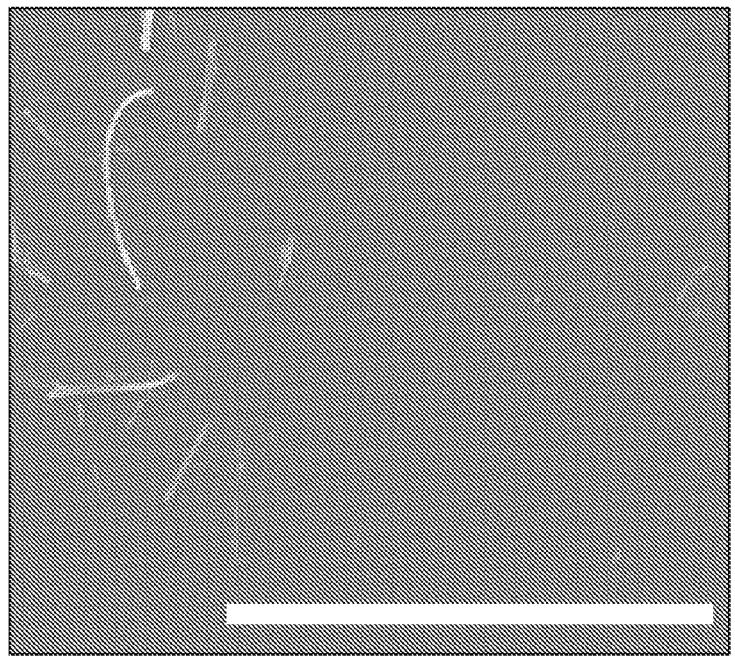
FIG. 8A is an SEM image of a representative section of the $NH_2$-derivatized glass slide after incubation with activated nanotubes of the present disclosure (EDC chemistry) and washing in PBS buffer; scale bar equals 50 µm.
Figure 8B:
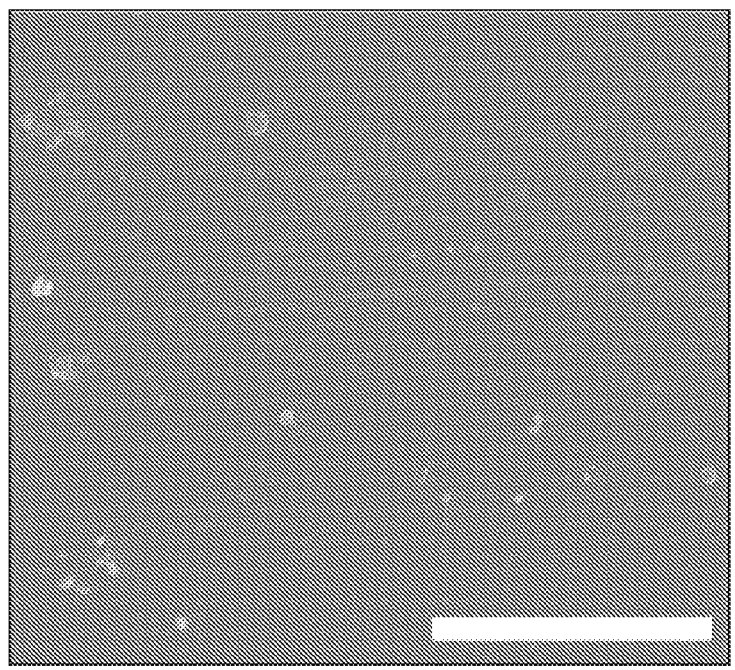
FIG. 8B is an SEM image of a representative section of the $NH_2$-derivatized glass slide after incubation with underivatized nanotubes and washing in PBS buffer; scale bar equals 50 µm.
Figure 8C:
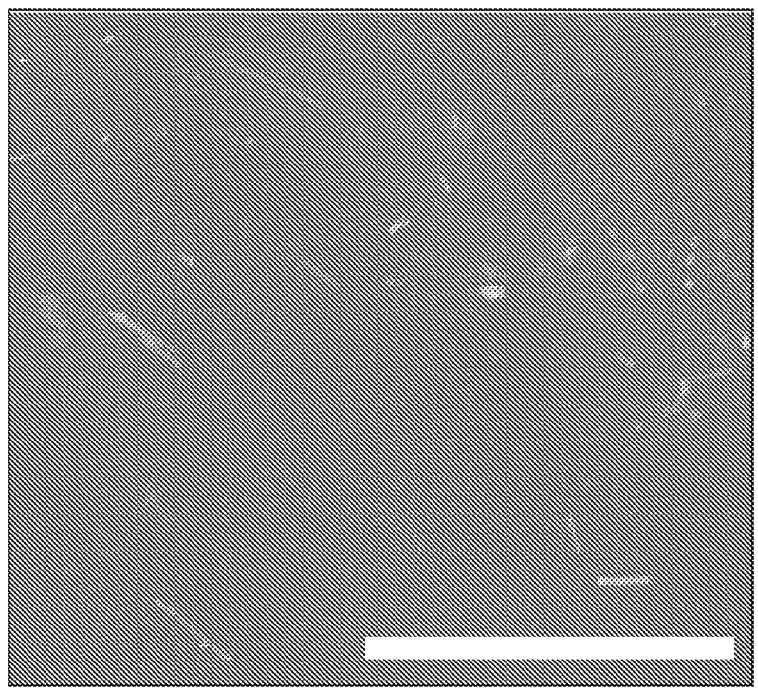
FIG. 8C is an SEM image of a representative section of the Concanavalin A-derivatized glass slide after incubation with nanotubes bio-functionalized with Anti-Concanavalin A antibodies, and washing in PBS buffer; scale bar equals 50 µm.
Figure 8D:
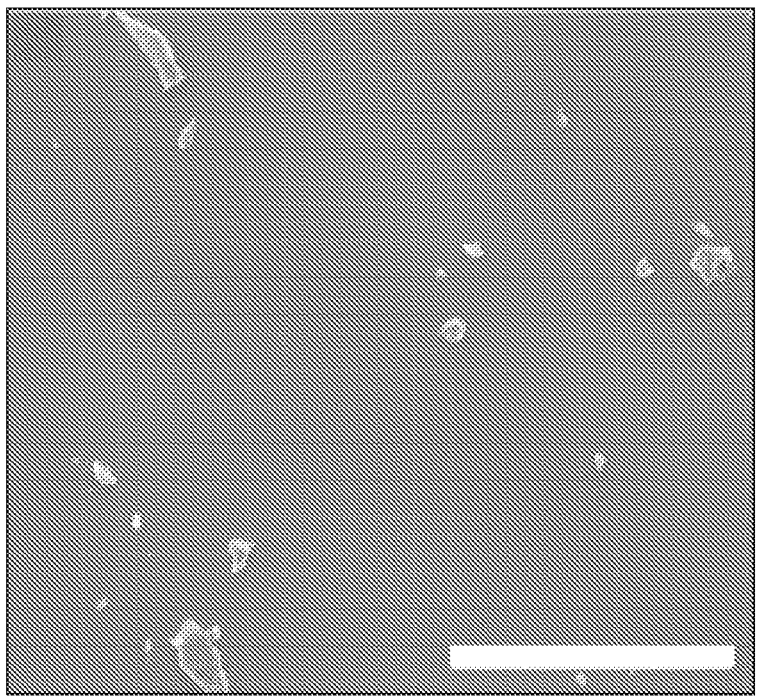
FIG. 8D is an SEM image of a representative section of the Concanavalin A-derivatized glass slide after incubation with underivatized nanotubes and washing in PBS buffer; scale bar equals 100 µm. Note that the negative controls show a larger surface area of the glass to confirm the absence of nanotubes

The negative control showing a background fluorescence resulting from the binding of FITC-labeled avidin to desthiobiotinylated glass, whereas the desthiobiotinylated glass surface onto which the bio-functionalized nanotubes had been deposited showed distinct foci representing the binding of nanotubes. The observations based on fluorescence were corroborated using SEM (FIGS. 8A-C), which showed individual nanotubes on the glass surface only when the nanotube functionalization reaction included EDC.

The lack of detectable fluorescence in the negative controls in which the cross-linking agent EDC was omitted and the lack of nanotubes on the glass surface when viewed under SEM (only salt deposits are visible) demonstrate that lignin nanotubes can be easily functionalized and are able to recognize and bind to targets in a specific manner. Given that nanowires have exterior surfaces with similar structure, such as the presence of a lignin base layer in lignin nanowires, bio-functionalized lignin nanowires may produce similar results.

Conclusions

Template synthesis is a versatile technique to produce nanotubes, nanowires and other nanostructured materials. This technology was pioneered by Martin and colleagues (Martin 1994; Martin 1996) to synthesize nanotubes of varying size by using polymeric substrates. The present examples demonstrated the ability to synthesize lignin nanotubes with an alumina template using a naturally biodegradable and biocompatible plant cell wall polymer. The present disclosure further shows that the nature of the monomers used to form the wall of the tubes has an effect on both the optical and physical parameters of the nanotubes. Thus, optical properties and wall thickness can be fine-tuned for specific applications. Further parameters that may affect these properties include, but are not limited to, the source of the lignin (gymnosperm and angiosperm woody species, herbaceous angiosperm dicots and monocot grasses), the lignin isolation procedure (mineral acids, alkaline solutions, ionic liquids), the amount of lignin used to form the base layer, and the pore size and thickness of the membrane. The ability to bio-functionalize these structures so that they can recognize and specifically bind to target molecules, combined with their pliable nature makes nanotubes uniquely suited for biomedical applications, such as the delivery of therapeutic agents to specific cells or organs. Additionally, functionalized nanowires may be of value to impede or modify physical and/or chemical interactions between ligands and receptors in living systems. The use of lignin nanotubes and nanostructures derived from the waste stream of biorefineries as a high-value drug delivery system has the potential to offset biomass processing costs, thereby making the production of renewable fuels more cost effective.

REFERENCES FOR EXAMPLE 1

Which are Incorporated Herein by Reference

[1] Bianco, A., Kostarelos, K. and Prato, M. 2005 *Curr. Opin. Chem. Biol.*, 9, 674-679.
[2] Kam, N. W. S, and Dai, H. 2005 *J. Am. Chem. Soc.*, 127, 6021-6026.
[3] Singh, R. et al. 2005 *J. Am. Chem. Soc.*, 127, 4388-4396.
[4] Bhirde, A. A. et al. 2009 *ACS Nano*, 3, 307-316
[5] Li, R. et al. 2010 *ACS Nano*, 4, 1399-1408.
[6] Warheit, D. B. et al. 2004 *Toxicol. Sci.*, 77, 117-125.
[7] Shvedova, A. A. et al. 2003 *J. Toxicol. Environ. Health Part A*, 66, 1909-1926.
[8] Kisin, E. R. et al. 2007 *J. Toxicol. Environ. Health Part A*, 70, 2071-2079.
[9] Murray, A. R. et al. 2009 *Toxicology*, 257, 161-171.
[10] Smart, S. K., Cassady, A. I., Lu, G. Q. and Martin, D. J. 2006 *Carbon*, 44, 1034-1047.
[11] Belyanskaya, L. et al. 2009 *NeuroToxicology*, 30, 702-711.
[12] Magrez, A. et al. 2006 *Nano Lett.*, 6, 1121-1125.
[13] Poland, C. A. et al. 2008 *Nature Nanotechnol.*, 3, 423-428.
[14] Ai, S., Lu, G., He, Q. and Li, J. 2003 *J. Am. Chem. Soc.*, 125, 11140-11141.
[15] Landoulsi, J., Roy, C. C. J., Dupont-Gillain, C. and Demoustier-Champagne, S. 2009 *Biomacromolecules*, 10, 1021-1024.
[16] Xiao, R., Cho, S. I., Liu, R. and Lee, S. B. 2007 *J. Am. Chem. Soc.*, 129, 4483-4489.
[17] Martin, C. R. 1994 *Science*, 266, 1961-1966.
[18] Huczko, A. 2000 *Appl. Phys. A*, 70, 365-376.
[19] Martin, C. R. 1996 *Chem. Mat.*, 8, 1739-1746.
[20] Duncan, R. 2003 *Nature Rev. Drug Discovery*, 2, 347-360.
[21] Martin, C. R. and Kohli, P. 2003. *Nature Rev. Drug Discovery*, 2, 29-37.
[22] Reiner, J. E., Wells, J. M., Kishore, R. B., Pfefferkorn, C. and Helmerson, K. 2006 *Proc. Natl. Acad. Sci. USA*, 103, 1173-1177.
[23] Mabrouk, E., Cuvelier, D., Brochard-Wyart, F. 0., Nassoy, P. and Li, M.-H. 2009 *Proc. Natl. Acad. Sci. USA*, 106, 7294-7298.
[24] Ralph, J. et al. 2004 *Phytochem. Rev.*, 3, 29-60.
[25] Ralph, J. and Hatfield, R. D. 1991 *J. Agric. Food Chem.*, 39, 1426-1437.
[26] Nimz, H. H. and Ludemann, H.-D. 1976 *Holzforschung*, 30, 33-40.
[27] Higuchi, T., Ito, T., Umezawa, T., Hibino, T. and Shibata, D. 1994 *J. Biotechnol.*, 37, 151-158.
[28] Grabber, J. H., Hatfield, R. D., Ralph, J., Zon, J. and Amrhein, N. 1995 *Phytochem.*, 40, 1077-1082.
[29] Terashima, N. et al. 1996 *Holzforschung*, 50, 9-14.
[30] Ragauskas, A. J. et al. 2006 *Science*, 311, 484-489.
[31] Zeng M, Ximenes E, Ladisch M R, Mosier N S, Vermerris W, Huang C—P, Sherman D M. 2011 *Biotechnol. Bioeng.* (in press).
[32] Yang, B. and Wyman, C. E. 2004 *Biotechnol. Bioeng.*, 86, 88-98.
[33] Chen, F. and Dixon, R. A. 2007 *Nature Biotechnol.*, 25, 759-761.
[34] Mosier, N. et al. 2005 *Biores. Technol.*, 96, 673-686.
[35] Humphreys, J. M. and Chapple, C. 2002 *Curr. Opin. Plant Biol.*, 5, 224-229.
[36] Vermerris, W., Thompson, K. J. and Mcintyre, L. M. 2002 *Heredity*, 88, 450-457.
[37] Bruce, R. J. and West, C. A. 1989 *Plant Physiol.*, 91, 889-897.
[38] Shimada, M., Fukusuka., T. and Higuchi, T. 1971 *TAPPI*, 54, 72-78.
[39] Nakamura, Y. and Higuchi, T. 1978 *Cellul. Chem. Technol.*, 12, 209-221.
[40] Islam, M. F., Rojas, E., Bergey, D. M., Johnson, A. T. and Yodh, A. G. 2003 *Nano Lett.*, 3, 269-273.
[41] Hasan, T. et al. 2007 *J. Phys. Chem. C*, 111, 12594-12602.
[42] Bastin, G. F. and Heijligers, H. J. M. 1986 *X-Ray Spectrom.* 15, 135-141
[43] Albinsson, B., Li, S., Lundquist, K. and Stomberg, R. 1999 *J. Mol. Struct.*, 508, 19-27.
[44] Nakashima, J., Chen, F., Jackson, L., Shadle, G. and Dixon, R. A. 2008 *New Phytol.*, 179, 738-750.
[45] Vermerris, W., Sherman, D. M. and McIntyre, L. M. 2010 *J. Exp. Bot.*, 61, 2479-2490.

Example 2

Lignin Nanotubes for Gene Delivery into Human Cells

Introduction

Example 1, above, describes the synthesis of lignin-based nanotubes and nanowires as a basis for higher-value applications of lignin (Caicedo et al., 2012). Due to their autofluorescence, lignin nanotubes permit label-free detection under UV radiation. These features make lignin nanotubes suitable candidates for numerous biomedical applications, such as the delivery of therapeutic agents and DNA to specific cells.

Gene therapy is a promising approach to treat a variety of genetic disorders by delivering functional copies of defective genes to specific cells as therapeutic agents (Friedmann 1989; Kaiser 2011; Morgan 2012). A variety of physical and chemical methods have been developed for introducing exogenous DNA sequences into eukaryotic cells, including the use of viruses and carbon nanotubes. Viral vectors based on retroviruses and adenoviruses have already been employed in a number of clinical trials (Rosenberg et al. 1990; Zabner et al. 1993; May et al. 2000; Pawliuk et al. 2001), but have caused serious side effects (Donahue et al. 1992; Hacein-Bey-Abina et al. 2003; Kohn et al. 2003). In contrast, there has been no association with malignant diseases for vectors based on parvoviruses, including recombinant Adeno-associated virus (rAAV) (Blacklow et al. 1971; Blacklow et al. 1998). When AAV is used without a helper virus, which normally ensures optimal replication (Berns and Bohenzky 1987), a latent infection ensues, followed by the site-specific integration of the (recombinant) viral genome in the human genome (Kotin et al. 1991; Kotin et al. 1990; Samulski et al. 1991). rAAV is currently in use in a number of gene therapy clinical trials (Mingozzi and High 2011), including Leber's congenital amaurosis (Bainbridge et al 0.2008; Maguire et al. 2008; Hauswirth et al. 2008; Cideciyan et al. 2008), hemophilia B (Nathwani et al. 2011) and aromatic amino acid decarboxylase deficiency (Hwu et al. 2012).

However, due to the relatively high titer of viral vectors necessary to ensure sufficient uptake of DNA, such viral vectors can be immunogenic, leading to inflammations and/or their removal by the host immune system. An alternative is non-viral vectors, in which synthetic liposomes, polymers or carbon nanotubes (CNT) carry DNA. Due to their favorable physicochemical and electrical properties, CNTs have been extensively explored nanomaterials as a non-viral delivery system (Pantarotto et al 2004; Singh et al 2005). However, the presence of residual metal catalyst, their insolubility in water and many other solvents, and their needle-like edges cause cytotoxic effects and requires CNTs to be functionalized (Bianco et al., 2005; Lacerda et al., 2008).

Developing flexible nanotubes from natural polymers can offer promising alternatives for both viral and non-viral DNA vectors, due to the potential for reduced immunogenicity and cytotoxicity.

The present example evaluated the potential of using lignin nanotubes for the delivery of plasmid DNA into human HeLa cells grown in tissue culture. This included an evaluation of the effect of lignin source and extraction method on morphology and mechanical properties of lignin nanotubes (LNTs), cell cytotoxicity of LNTs to HeLa cells, and the ability to use LNTs as nanocarriers for DNA.

Materials and Methods
Plant Material

Figure 12:
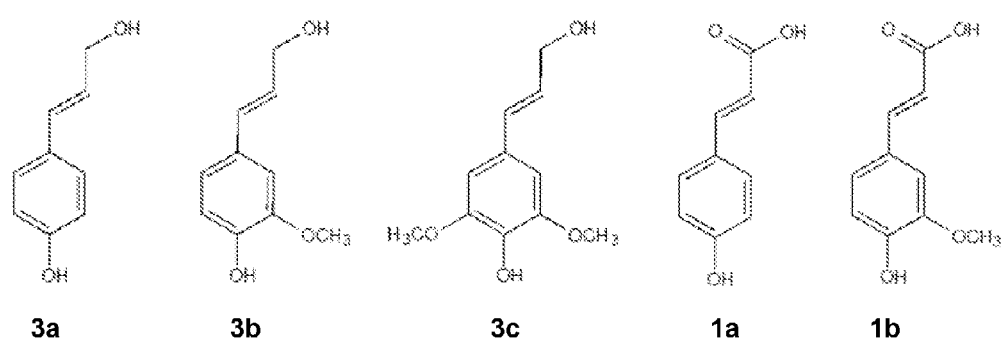
FIG. 12 illustrates the structures of p-coumaryl alcohol (3b), coniferyl alcohol (3b), sinapyl alcohol (3c), p-coumaric acid (1a) and ferulic acid (1b)
Figure 13A:
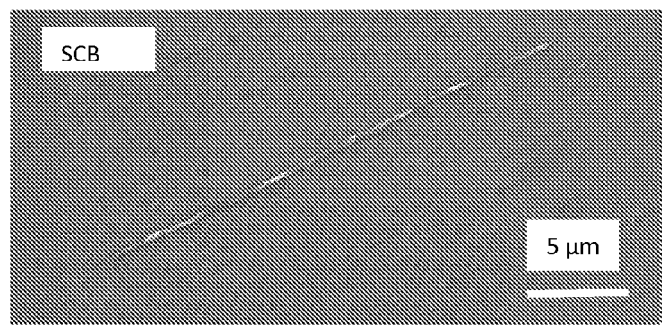
FIGS. 13A-13M are digital SEM images of lignin nanotubes (LNT). The scale bar varies, as shown.
Figure 13B:
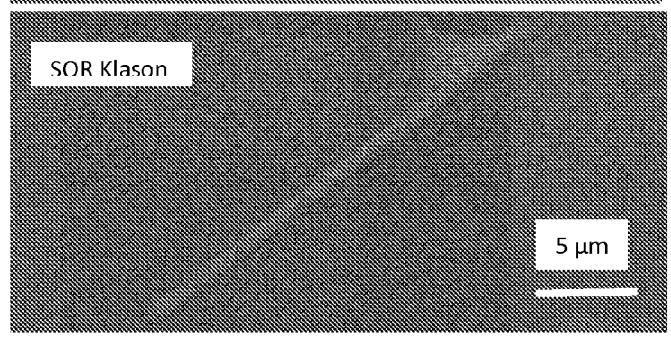
Figure 13C:
Figure 13D:
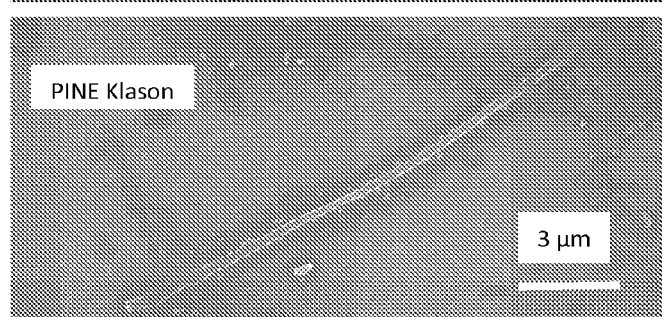
Figure 13E:
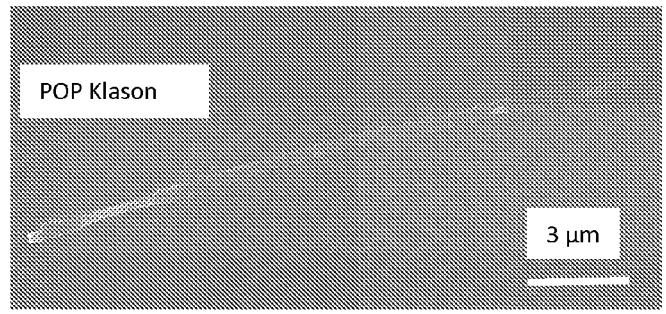
Figure 13F:
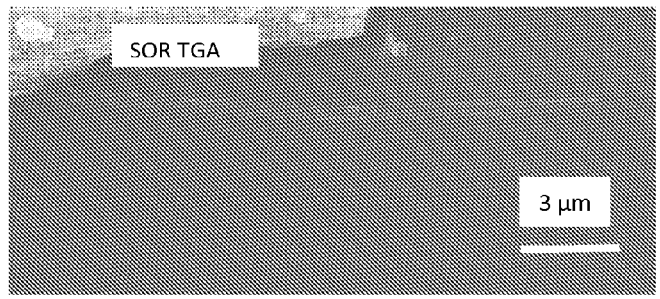
Figure 13G:
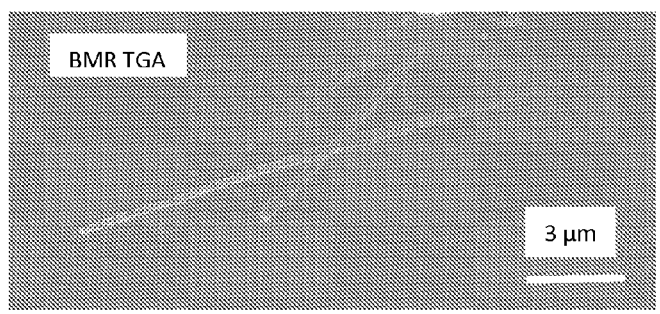
Figure 13H:
Figure 13I:
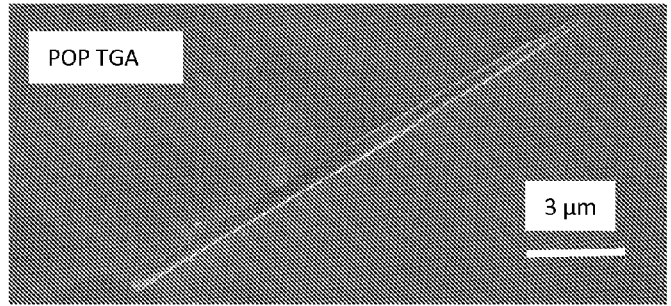
Figure 13J:
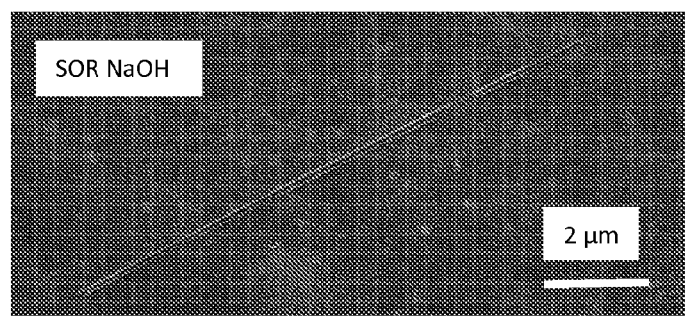
Figure 13K:
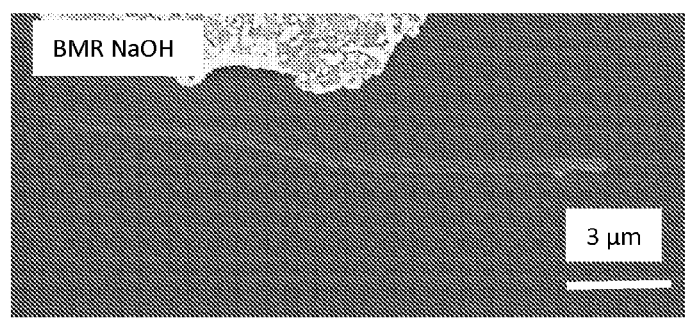
Figure 13L:
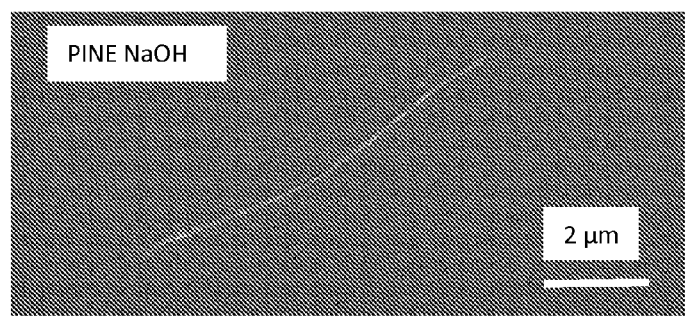
Figure 13M:
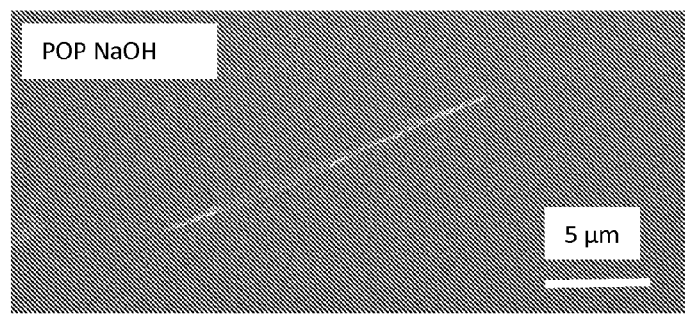

Lignin in the grasses, such as sorghum (*Sorghum bicolor* (L.) Moench) and sugarcane (*Saccharum* spp.) contains H-residues, derived from p-coumaryl alcohol (3a), guaiacyl (G) residues, derived from coniferyl alcohol (3b), and syringyl-residues, derived form sinapyl alcohol 3c) (FIG. 12). Gymnosperms such as loblolly pine (*Pinus taeda* L.) contain lignin that is composed almost exclusively of G-residues, whereas lignin from angiosperm dicots, including poplar (*Populus* spp.) contains a mixture of G- and S-residues. For the present example, lignin samples were isolated from five sources: dried and ground stems of mature, field-grown sorghum (*Sorghum bicolor* (L.) Moench) cultivar 'BTx623' (SOR) and a near-isogenic sister line carrying the brown midrib6 (bmr6) mutation 'BTx623-bmr6' (BMR) (Pedersen et al., 2006), which reduces the proportion of S-residues and which increases the content of cinnamaldehyde end-groups in the lignin (Saballos et al., 2008; Palmer et al., 2008); debarked stems of greenhouse-grown, 1-year-old rooted cuttings of loblolly pine (*Pinus taeda* L.) (PINE); debarked stems of 3-month-old, greenhouse-grown rooted cuttings of poplar (*Populus deltoides* W. Bartram ex Humphry Marshall) (POP); sugar cane bagasse (SCB) produced from crushed, mature, field-grown sugarcane (*Saccharum* spp.) plants. All samples were dried at 50° C. and ball-milled prior to lignin extraction.

Isolation of Sugar Cane Bagasse Lignin with Phosphoric Acid

Sugar cane bagasse (SCB) was pretreated at the University of Florida Ethanol Pilot Plant (Gainesville, Fla.). Lignin was isolated from SCB following a two-step hydrolysis in phosphoric acid followed by enzymatic saccharification. First, the raw bagasse was soaked in 0.5% (v/v) phosphoric acid and screw pressed to approximately 50% moisture content. The SCB was then subjected to a thermo-chemical pretreatment (steam explosion, 190° C., 5 min.). This process solubilized 80-90% of the hemicellulose, leaving the cellulose and lignin largely intact as polymers. The pretreated biomass containing 70% moisture was ground to fine powder. A sample of 3.33 g ground biomass was mixed with 10 mL ddH$_2$O and the pH was adjusted to 5.2 with KOH. A volume of 200 µL of the cellulase formulation CTec2 (Novozymes, Franklinton, N.C., USA; cellulase activity is 147 filter paper units/mL (Zhou et al. 2013)) was added to the suspension, which was then agitated for 6 h at 50° C. After enzymatic hydrolysis, the lignin was collected on a glass filter and dried at 50° C. The lignin powder was dissolved in 0.5M NaOH to 10 mg/mL.

Isolation of Lignin with Sulfuric Acid (Klason Lignin)

Klason lignin was isolated from 100-mg samples of SOR, BMR, PINE and POP tissue using the procedure of Theander and Westerlund (1986) with modifications by Hatfield et al. (1994). The Klason lignin was dissolved in 0.5M NaOH to 10 mg/mL.

Isolation of Lignin with Thioglycolic Acid

Thioglycolic acid (TGA) lignin was isolated from 100-mg samples of SOR, BMR, PINE, and POP tissue using the procedure described by Bruce and West (Bruce and West, 1989). This procedure resulted in a lignin pellet that was washed with 10 mL ddH$_2$O and dissolved in 0.5M NaOH to 10 mg/mL.

Isolation of Lignin with Alkali Solution (NaOH)

Isolation of lignin using NaOH was performed according to Li et al. (2009). Samples of 200 mg SOR, BMR, PINE and POP tissue were mixed with 2 mL 2M NaOH and incubated overnight at 60° C. After centrifugation at 5,000 rpm for 15 min, supernatants were collected and 5M H$_2$SO$_4$ was added drop-wise until the pH reached 4.0. Lignin was precipitated overnight at 4° C. and collected after centrifugation at 5,000 rpm for 15 min. The lignin pellets were dissolved in 0.5M NaOH to 10 mg/mL.

Synthesis of Lignin Nanotubes

The preparation of the sacrificial alumina membranes in which the lignin nanotubes were synthesized was based on the procedure described in the Example above and by Caicedo et al. 2012 (Caicedo et al., 2012), which is incorporated herein by reference. After activation with 3-aminopropyltriethoxysilane (APTES; SigmaAldrich), the Anodisc™ alumina membranes (13 mm in diameter, 60 µm in thickness and 200 nm pore diameter; Whatman (Maidstone, UK)) were sputter coated with Au/Pd for 40 s. on both sides (Hummer V by Technics Kadoma, Osaka, Japan) to render the membrane surfaces inert.

SCB lignin isolated with phosphoric acid and SOR, BMR, PINE and POP lignin extracted by the three isolation methods described above comprised 13 samples used to synthesize lignin nanotubes (LNT). The concentrations of lignin in each preparation were measured by UV-vis absorbance at 280 nm on a SpectraMax M5 microplate reader (Sunnyvale, Calif.) after adjusting the pH of lignin solutions to 8.0 with 2M HCl. Lignosulfonic acid ($M_w$=12,000 g/mol; Sigma-Aldrich), dissolved in 1 M NaOH was used as a reference for the calibration curve.

For each LNT preparation, 2 mg lignin in solution was mixed with 5 mL 100 mM sodium phosphate buffer pH 7.4 containing 2M NaCl. The solutions were diluted with dd$H_2O$ to a final volume of 10 mL. The functionalized $Al_2O_3$ membranes were immersed in 10 mL of this solution and incubated for 24 h at 4° C. The membranes were then rinsed in 100% ethanol and dried under nitrogen. Four layers of dehydrogenation polymer (DHP) were deposited onto the baselayer following the procedure described by Caicedo et al. (2012). Each layer was deposited by immersing the membrane in 3 mL 100 mM potassium phosphate buffer (pH 6.0) containing 12.5 mM p-coumaric acid (FIG. 12; compound 1a) and 12.5 mM ferulic acid (FIG. 12; compound 1b) dissolved in 4 mL 35% (v/v) dioxane in dd$H_2O$. In order to release the LNTs, the membranes were dissolved in 50% (v/v) phosphoric acid containing 0.5% (v/v) Triton X-100 surfactant (Fisher BioReagents, Hampton, N.H.). After 24 h the template was completely dissolved and the released LNTs were sonicated for 15 min. The LNTs were collected by centrifugation (4,000 rpm, 4° C. for 15 min) and washed four times with water containing 0.05% (v/v) Triton X-100. Sixty µL of each LNT suspension was dissolved in 60 µL 1M NaOH. The concentration and yield of lignin nanotubes was determined by UV-vis absorbance at 280 nm on a SpectraMax M5 microplate reader. The concentration for all samples was adjusted to 140 mg/mL with water containing 0.05% (v/v) Triton X-100.

Scanning Electron Microscopy (SEM)

Morphology of the lignin nanotubes was investigated using a FEI XL-40 (Hillsboro, Oreg.) field emission scanning electron microscope (FESEM) at an accelerating voltage of 20 kV. A 10-µL drop of lignin suspension was deposited onto a glass slide (10 mm diameter; Ted Pella Inc. Redding, Calif.) and the solvent was evaporated at ambient temperature. The samples were then sputter coated with a thin layer of Au/Pb before imaging approximate thickness of the coating was 15-20 nm. The dimensions of the nanotubes were determined based on the measurements of 100 individual nanotubes using ImageJ software (National Institute of Health, Bethesda, Md.).

Nanoindentation Measurements

The nanoindentation measurements were carried out in laboratory air on a Hysitron nano-indentation system (Eden Prairie, Minn.) equipped with a Berkovich diamond indenter with 70-nm radius. The area function, which is used to calculate contact area $A_c$ from contact depth $h_c$, was calibrated by using fused quartz as a standard sample, prior to the experiments. Fifteen load-displacement curves were recorded for each sample. The indent ranged between 5 and 15 nm, depending on LNT wall thickness, and selected so that the influence of the hollow structure was avoided.

The hardness and Young's modulus were obtained from the load-displacement curves using the method of Oliver and Pharr (1992). Hardness is defined as the resistance to local deformation. In nanoindentation, the hardness H is expressed as the maximum indentation load, $P_{max}$, divided by the contact area, $A_c$:

$$H = \frac{P_{max}}{A_c} = 24.5 h_c^2; \quad (1)$$

The contact area is a function of the contact depth $h_c$, and $H=24.5 H_c^2$ for a Berkovich tip geometry (Berkovich 1951). For a viscoelastic solid, the calculations of H and $h_c$ are highly dependent on the time of the hold segment and the unloading rate.

The Young's modulus (modulus of elasticity) E of the test material can be obtained with the following equation (Oliver and Pharr, 1992):

$$E = (1-v)^2 \left( \frac{1}{E^*} - \frac{1-v_i}{E_i} \right)^{-1} \quad (2)$$

where v is the Poisson's ratio of the test material, and $E_i$ and $v_i$ denote Young's modulus and Poisson's ratio of the indenter, respectively. The indenter properties used in this study are $E_i$=1,141 GPa and $v_i$=0.07.

$E^*$ is the reduced modulus of the system and can further be defined as $$E^* = \frac{\sqrt{\pi}}{2} \frac{S}{\beta \sqrt{A_c}} \quad (3)$$

where S is the stiffness of the test material, which can be determined from the slope of the initial unloading by evaluating the maximum load and the maximum depth, where S=dP/dh. β is a shape constant of the indenter, which is 1.034 for the Berkovich tip. The images prior and after the indents were taken in-situ using a built-in Scanning Probe Microscope. The loading rate of indentations was fixed at 2 nm s−1, with hold times 2 s at maximum displacement. Unloading rates of 5 nm s−1 were used to remove the tip from the nanotubes.

Cell Culture Studies

Human cervical adenocarcinoma cells (HeLa cells) from the American Type Culture Collection (Manassas, Va.) were seeded at a density of $5 \times 10^3$ cells/well in 96-well plates containing complete Dulbecco's Modified Eagle's Medium (DMEM, Sigma-Aldrich) supplemented with 10% (v/v) heat-inactivated fetal bovine serum (FBS, Sigma-Aldrich), 100

μg/mL penicillin and 100 μg/mL streptomycin (P/S; Lonza, Walkersville, Md.) at 37° C. in humidified air containing 5% (v/v) $CO_2$.

In Vitro Cytotoxicity Tests

To evaluate the cytotoxicity of the LNT to HeLa cells, cell viability was assessed quantitatively using a Cell Count Kit-8 (CCK-8; Sigma-Aldrich). LNT suspensions in $ddH_2O$ were added to each well at concentrations of 93; 187; 447; 933; 4,667; 9,333; 46,667; and 93,333 μg/mL. The incubations were carried out at 37° C. in a 5% (v/v) $CO_2$ atmosphere for 4 h. After incubation, the medium was replaced with 100 μL of complete DMEM per well and cells were incubated for another 24 h. CCK-8 reagent (10 μl) was added to each well and the optical density at 450 nm ($OD_{450}$) was measured on a SpectraMax M5 microplate reader. All procedures were replicated three times. The mean absorbance of non-exposed cells was the reference value for calculating 100% cellular viability.

Green Florescent Protein (GFP) Transfection Assay and Fluorescence Microscopy

The in vitro transfection efficiency of LNTs was evaluated in HeLa cells, using the gene encoding the green fluorescent protein (GFP) as a reporter gene. HeLa cells were seeded in 96-well plates 24 h prior to transfection at an initial density of $5 \times 10^3$ cells per well in complete DMEM. LNT treatments with plasmid pdsAAV-CB-EGFP (Ling et al., 2007), encoding the GFP gene under control of the chicken beta-actin promoter, were performed in serum- and antibiotic-free DMEM. At the time of transfection, the medium in each well was replaced with 50 μL DMEM containing 280 ng plasmid DNA and either 1.4 mg LNTs or 0.5 μg of poly(ethyleneimine) (PEI). The mixtures had been incubated at 37° C. for 1 h prior to addition to the cells; the cells were then incubated with the mixtures for 4 h. The transfection medium was replaced with 100 μL complete DMEM medium, and the cells were incubated for an additional 48 h. Expression of GFP was analyzed by direct fluorescence imaging 48 h after transfection using a fluorescence microscope (DMI 4000B; Leica Microsystems, Wetzlar, Germany), and via western blot analysis.

Western Blot Analysis

Transfection of HeLa cells was performed as described above, using 44.8 mg LNTs and 43.3 μg of pdsAAV-CB-EGFP plasmid DNA in a 6-well plate. Forty-eight hours post transfection HeLa cells were rinsed twice with cold PBS and lysed in RIPA buffer (1 M Tris-HCl, pH 8.0, 5M NaCl, 1% Nonidet P-40 (surfactant), 10 mM NaF, 0.5 mM EDTA, 10% (w/v) SDS, 10% (v/v) sodium deoxycholate, 10 μg/mL aprotinin, 100 μg/mL PMSF (proteinase inhibitor), and 10 μg/mL leupeptin) on ice for 10 min. The contents of the well were collected and spun down by centrifugation at 12,000 rpm for 15 min at 4° C. The protein concentration in the supernatant was determined using a Bio-Rad 500-0006 protein assay kit (Berkeley, Calif.) in a SpectraMax M5 microplate reader at 595 nm. Each sample containing a total of 10 μg protein was loaded on a 12% denaturing polyacrylamide gel (SDS/PAGE), and following electrophoresis, transferred onto an Immobilon-P membrane (Amersham Life Science, Amersham, UK). After the membrane was blocked with 5% (w/v) nonfat dry milk in Tris-buffered saline (TBS)—0.1% (v/v) Tween-20 for 1.5 hours and incubated with rabbit polyclonal anti-eGFP antibody (Thermo Scientific, Waltham, Mass.) (1:300) in 5% nonfat dry milk—TBS—0.1% Tween-20 overnight at 4° C., it was washed three times with 1×TBS—0.1% Tween-20 for 10 minutes and incubated for 2 hours in 1×TBS—0.1% Tween-20 with a horseradish peroxidase—conjugated goat anti-rabbit secondary antibody (1:1000 dilution, Thermo Scientific, Waltham, Mass.) at room temperature. Bound antibody complexes were detected by using an enhanced chemiluminescence reagent (GE Healthcare Life Science: ECL Plus Western Blotting Detection Reagents, Pascataway, N.J.) according to the manufacturer's instructions, followed by autoradiography. Three replicates were performed for each experiment. In order to verify equal loading in each well, the membrane was stripped by washing it in 25 mM glycine, 1% (w/v) SDS for 15 min at 60° C., and then blocked, incubated with polyclonal rabbit antibodies against GAPDH (1:2000 dilution, Thermo Scientific, Waltham, Mass.) in 5% nonfat dry milk—TBS—0.1% Tween-20 overnight at 4° C., followed by incubation with a horseradish peroxidase—conjugated goat anti-rabbit secondary antibody (1:5000 dilution, Thermo Scientific, Waltham, Mass.) in 1×TBS—0.1% Tween-20 at room temperature for 2 hours.

Confocal Microscopy

A total of $5 \times 10^3$ HeLa cells per 12-mm diameter dish were cultured overnight in 400 μL complete DMEM. After 24 hours complete DMEM was replaced with 100 μL complete DMEM containing 1.4 mg LNT suspensions and incubated for 3 hours at 37° C. Another 100 μL of complete DMEM was added to the cells followed by 24 hours incubation at 37° C. After LNT treatment for 24 hours, cells were washed with PBS and fixed in 4% (w/v) paraformaldehyde for 10 min and washed with PBS again. The cell nuclei were then stained with 4',6-diamidino-2-phenylindole (DAPI; 20 mM in PBS; Invitrogen, Grand Island, N.Y.) for 10 min. Excess DAPI was removed by washing with PBS and the fixed cells were stored at 4° C. until confocal microscopy (Leica TCS SP5; Wetzlar, Germany). Scan speed was 400 Hz; numerical aperture was 1.4; Laser—405 nm diode UV. The acquisition was in xyz scanning mode. Images format was 512×512 pixels.

DNA Biotinylation

Plasmid DNA was biotinylated using the EZ-Link TFPA-PEG3-Biotin kit (ThermoFisher Scientific, Rockford, Ill.). The reagent, dissolved in DMSO to a concentration of 10 mg/mL, was added to 25 μg pdsAAV-CB-EGFP plasmid DNA in a 1:1 molar ratio and in a 20-fold molar excess, considering a nucleotide (average MW 330 g/mol) rather than the whole plasmid as the reactive molecule. The reaction volume was adjusted to 400 μL by the addition of PBS. The biotinylation reaction was photoactivated using UV light (302 nm; 8 W) for 8 min. at 5 cm distance from the samples. After the reaction, the samples were kept in the dark. The biotinylated DNA was purified with the Clean and Concentrator™-25 kit (Zymo Research, Irvine, Calif.). The samples were stored in the dark at 4° C. until use.

Capture and Visualization of Biotinylated DNA with Streptavidin-Coated Magnetic Beads A suspension containing 1.4 mg LNTs and 500 ng (3 μL) biotinylated DNA (using 1:20 molar ratio) in a final volume of 50 μL DMEM were incubated at 37° C. while rotating for 1 h. These conditions matched the conditions preceding transfection. Control samples consisting of biotinylated plasmid DNA incubated without LNTs, and native (non-biotinylated) DNA with LNTs were included. After the incubation, the entire mixture was added to 50 μL of streptavidin-coupled Dynabeads (Life Technologies Corporation, Carlsbad, Calif.) in resuspension buffer (10 mM Tris-HCl pH 8.0, 1 mM EDTA and 2 M NaCl) to a final concentration of 5 μg/μL. The suspensions were incubated for 20 min. at room temperature while rotating and then placed in a magnetic stand for 3 min. to pull the Dynabeads to the wall of the tube. After the supernatant was completely removed with a pipette, fresh 400 μL wash buffer (5 mM Tris-HCl, 0.5 mM EDTA and 1 M NaCl) was added. After gently mixing the beads, the tubes were placed in the magnet again. After the beads had been washed twice, they were resuspended in 100 μL buffer (10 mM Tris-HCl pH 8.0, 1 mM EDTA, 0.1 M NaCl). This buffer matches the NaCl concentration of DMEM. A 10-μL droplet of the bead suspension was sputter coated and observed using SEM, using the same procedure as described for visualization of LNTs. The remainder of the bead suspension was stored at 4° C. for polymerase chain reactions (PCR). In order to release biotinylated DNA from the Dynabeads, samples of 10 μL suspension were added to 200 μL 95% (v/v) formamide containing 10 mM EDTA, and heated at 65° C. for 5 min. After extraction, the samples were spun for 2 min at 14 krpm. The DNA was purified from the supernatant using the Clean and Concentrator™-25 Kit. Samples of 1 ng DNA were used for PCR.

Direct Capture of DNA on LNTs

Suspensions containing 7 mg LNTs derived from PINE-TGA and POP-TGA lignin were incubated with 0.5 μg plasmid DNA in 50 μL DMEM for 1 hour at 37° C. while rotating. The LNTs were collected in the bottom of the tube by centrifugation (5 min. 14 krpm). The supernatant was carefully removed. The LNTs were washed three times in 100 μL DMEM. The LNT pellet was then resuspended in 20 μL ddH$_2$O and diluted 100-fold in ddH$_2$O and subjected to PCR.

For quantitative analysis of the amount of plasmid DNA adsorbed on LNTs, a total of 4.65 μg LNTs made from PINE-TGA or PINE-NaOH lignin were added to 500 μL buffer containing plasmid DNA at a concentration of 10 ng/μL. The buffer was either 10 mM Tris.HCl pH 8, 0.1 mM EDTA (TE) or 10 mM Tris-HCl pH 8.0 containing 0.1 M NaCl. The incubation was performed at 37° C. for 1 hour with rotation. After the incubation, LNTs were precipitated by centrifugation at 14 krpm for 5 minutes. The concentration of plasmid DNA in the supernatant was measured using a NanoDrop Lite spectrophotometer (Thermo Scientific, Waltham, Mass.) and compared to the values measured prior to the addition of the LNTs.

Polymerase Chain Reaction

Red Taq 2× Mastermix (SigmaAldrich, St. Louis, Mo.) was used for PCR in a final volume of 20 μL. The reactions contained 10 μmol of each primer. A three-step PCR program was used, consisting of an initial denaturation step of 1 min at 94° C., followed by 35 cycles of 10 s at 94° C., 20 s at 59° C., and 30 s at 72° C., and a final extension of 2 min at 72° C., in a Bio-Rad C-1000 Thermal Cycler (Hercules, Calif.). The primer sequences used to amplify a 600-bp fragment from the plasmid DNA were as follows: AAV2-F: 5'-GAACAACACT-CAACCCTATCTCG-3' (SEQ ID NO: 1) and AAV2-R: 5'-TACCGTAAATACTCCACCCATTG-3' (SEQ ID NO: 2).

Results and Discussion

The Morphology of Lignin Nanotubes is Influenced by the Source of the Lignin and the Lignin Isolation Procedure The original LNT synthesis protocol was based on the use of lignin isolated via the thioglycolic acid procedure from the maize brown midrib1 mutant (Caicedo et al., 2012). In order to determine whether it is possible to synthesize LNTs from other plant sources with different lignin subunit composition, and different lignin isolation procedures, lignin nanotubes (LNTs) were prepared from thirteen different sources of lignin: four plant samples (poplar (POP), pine (PINE), wild-type ('normal') sorghum (SOR) and brown-midrib6 sorghum (BMR)), three different isolation methods (Klason (KL), thioglycolic acid (TGA), sodium hydroxide (NaOH)) and one sugarcane bagasse sample from which the lignin had been isolated using a combination of phosphoric acid pretreatment and enzymatic saccharification. These different sources of lignin provide diversity in lignin subunit composition (H-, G-, and S-units) and in the average molecular weight of the lignin fragments, which declines in the order thioglycolic acid lignin>phosphoric acid lignin>Klason lignin>alkaline extracted lignin, based on data reported in the literature (Morohoshi and Glasser, 1979; Sun et al., 1996; Zhu et al., 2009). The DHP 'liner' deposited inside the lignin baselayer in all cases was made of p-coumaric acid and ferulic acid in a 1:1 molar ratio.

The morphology of the resulting lignin nanotubes was evaluated by using a scanning electron microscopy (SEM). FIGS. 13A-13K show the representative SEM images of the resultant LNT microstructure. The length, diameter and wall thickness were measured, and the aspect ratio was calculated (Table 1). Analysis of the data in Table 1 reveals that the length of the different LNTs varies, primarily as a function of lignin isolation procedure rather than the species from which the lignin originated. Specifically, LNTs based on TGA lignin tend to be the longest (17.4-18.6 μm), followed by LNTs made from Klason lignin, whereas LNTs produced from NaOH-extracted lignin are shortest (10.8-15.7 μm). These differences in length correlate with the average molecular weight of the lignin.

The wall thickness ranges between 45 and 75 nm and is overall more variable across the 13 samples than nanotube length. LNTs synthesized from TGA lignin tend to have thinner walls, whereas LNTs synthesized from NaOH lignin tend to have thicker walls. Combined with the length, the aspect ratios (and surface area-to-volume ratio) of LNTs made from TGA lignin are substantially higher than those of LNTs made from NaOH lignin (Table 1). The diameters are constrained by the pore sizes of the membrane and consistent with the mean pore size of 200 nm. The observed variance in pore size is likely the result of slight variation in pore diameter size across the membrane.

The combined data from this experiment indicate that the current LNT synthesis protocol can accommodate lignin from different sources, that there is some variation in the dimensions of the resulting LNTs, and that the variation due to the lignin isolation procedure is bigger than the variation due to the plant species.

TABLE 1

Dimensions of lignin nanotubes.

| | | Length (μm) | Diameter (nm) | Wall thickness (nm) | Aspect ratio |
|---|---|---|---|---|---|
| 1. | SCB Phos | 17.0 ± 2.5 | 200 ± 45 | 49.5 ± 2.9 | 85 |
| 2. | SOR Klason | 15.2 ± 1.4 | 219.3 ± 71 | 75.2 ± 16 | 69 |
| 3. | BMR Klason | 14.3 ± 2.4 | 223.5 ± 32 | 59.7 ± 6.7 | 64 |
| 4. | PINE Klason | 15.9 ± 0.9 | 215.1 ± 33 | 45.2 ± 2.4 | 74 |
| 5. | POP Klason | 16.2 ± 1.0 | 214.1 ± 39 | 51.6 ± 4.1 | 76 |
| 6. | SOR TGA | 18.6 ± 1.6 | 219.1 ± 54 | 44.8 ± 4.3 | 85 |
| 7. | BMR TGA | 18.0 ± 1.2 | 203.7 ± 36 | 51.0 ± 3.6 | 89 |
| 8. | PINE TGA | 17.4 ± 1.4 | 194.9 ± 20 | 47.8 ± 3.0 | 89 |
| 9. | POP TGA | 17.9 ± 1.4 | 190.5 ± 99 | 58.1 ± 7.0 | 94 |
| 10. | SOR NaOH | 14.7 ± 1.9 | 172.4 ± 78 | 67.9 ± 6.4 | 85 |
| 11. | BMR NaOH | 15.7 ± 1.5 | 180.5 ± 74 | 66.3 ± 7.1 | 87 |
| 12. | PINE NaOH | 10.8 ± 0.7 | 172.3 ± 28 | 55.2 ± 3.8 | 62 |
| 13. | POP NaOH | 10.9 ± 1.2 | 178.9 ± 62 | 69.2 ± 5.6 | 61 |

The mechanical properties of LNTs are influenced by the source of the lignin

Figure 14:
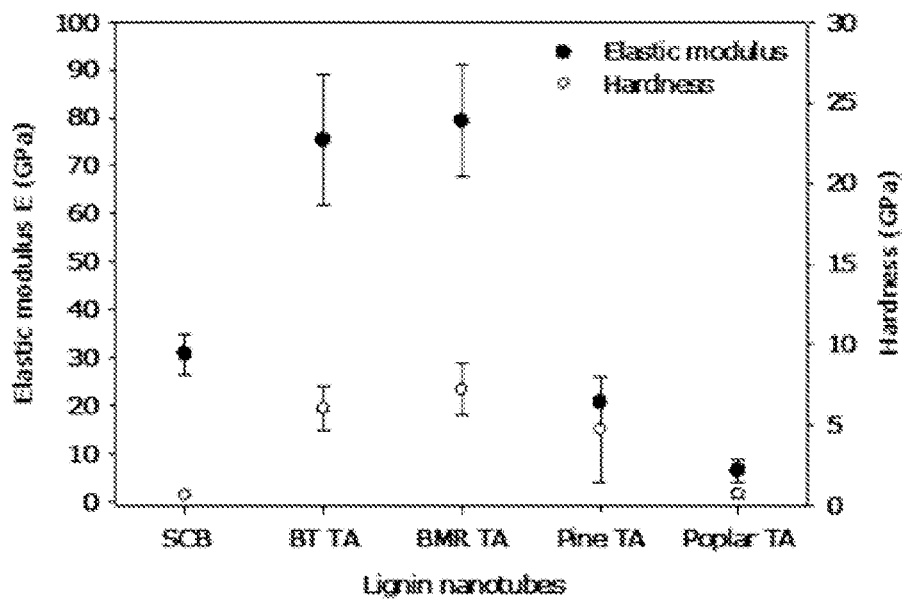
FIG. 14 illustrates a graph of the elastic modulus and hardness of lignin nanotubes.

The nanoindentation test measures the nanomechanical characteristics of the LNTs, specifically hardness H and Young's modulus E measured in the transverse direction. Given the instrumentation and time required to collect these data, LNTs generated from SCB and from TGA lignin of the other four plant sources were subjected to nanoindentation. FIG. 14 shows Young's modulus values of the corresponding LNTs. Both E and H showed similar trends. The E values, derived from the initial unloading portions of the load-displacement curves, were the highest for LNT extracted from sorghum, 75.3±13.6 GPa for SOR and 79.3±11.6 GPa for BMR, whereas LNT from PINE and POP were the lowest, 20.6±5.5 GPa and 6.5±2.5, respectively. The LNTs made from SCB had an intermediate value of 30.7±4.1 GPa. The hardness, defined as the relative resistance to deformation, was determined as maximum indentation load divided by the contact area (Eq. 1). LNTs derived from SOR and BMR TGA lignin displayed the greatest hardness (FIG. 14). The hardness of LNTs derived from SCB is small, and similar in value to the LNTs made from POP-TGA lignin. Considering the intermediate E-value for SCB LNTs and the fact that wild-type sorghum and sugarcane are quite similar in their lignin composition, these data suggest that both lignin source and lignin isolation procedure influence the nanomechanical properties of the LNTs.

Figure 15:
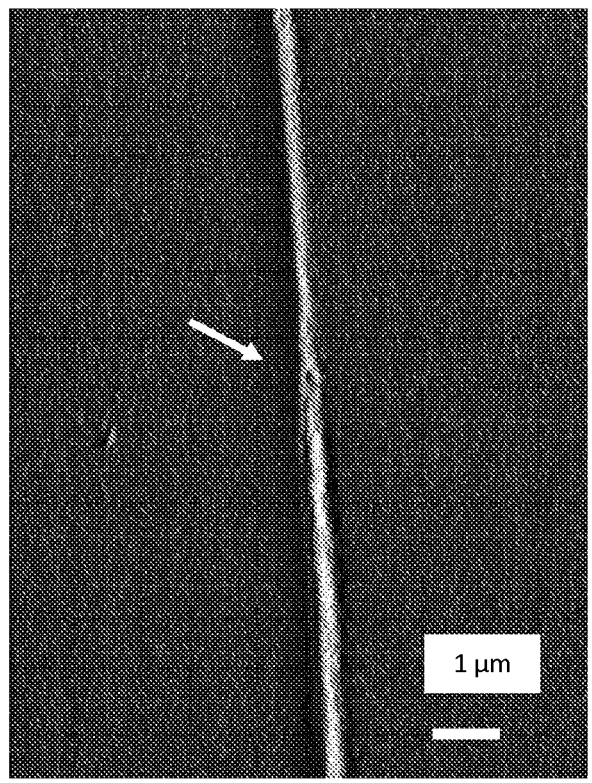
FIG. 15 is a digital scanning probe microscopy image of an LNT made from PINE-TGA lignin after nanoindentation (5 nm). The arrow shows the indent and LNT wall collapse.

FIG. 15 displays the scanning probe microscopy image of a LNT made from Pine TA lignin after the nanoindentation has been made. Low stiffness and hardness of the sample resulted in LNT wall collapse under the applied load.

LNTs are Less Cytotoxic to HeLa Cells than CNTs

Figure 16A:
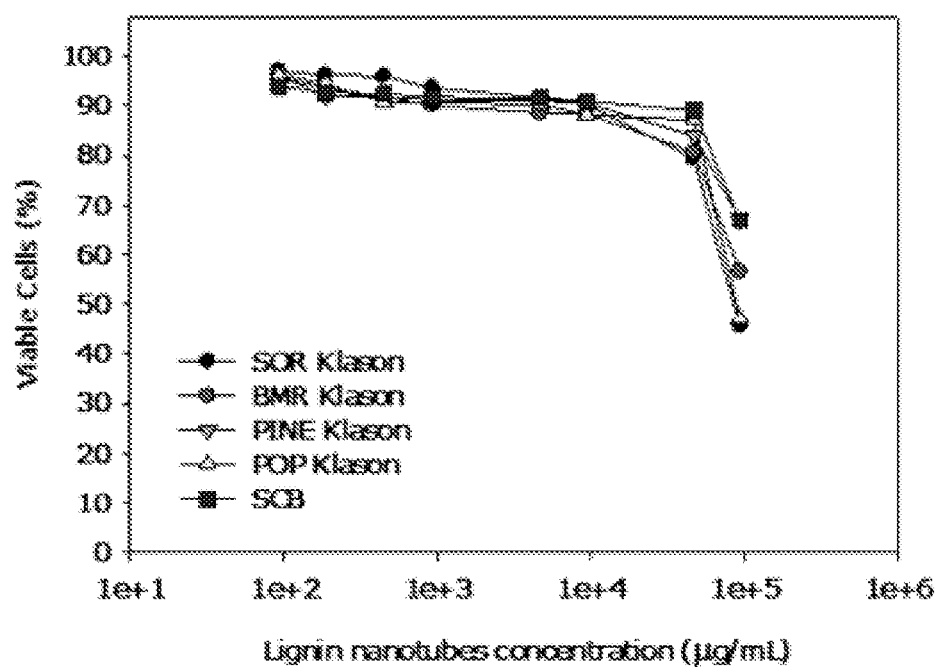
FIGS. 16A-16C are graphs illustrating the cytotoxicity of LNTs to HeLa cells after exposure for 48 hours determined by the CCK-8 assay for LNTs prepared from (16A) SCB and Klason lignins, (16B) TGA lignin, and (16C) NaOH-extracted lignins. Data are expressed as percent of control (no LNTs) and represent the mean of three independent experiments. Note the logarithmic scale on the horizontal axis.

One of the concerns associated with the use of CNTs for therapeutic uses is their cytotoxicity (Liu et al. 2013; Magrez et al 2006). Consequently, utilization of LNT for diagnostic and therapeutic purposes warrants investigation of their cytotoxic effects on human cells in vitro and in vivo. In order to assess the effect of different types of LNTs on human HeLa cells in cell culture, cytotoxicity was assessed by measuring the proportion of live cells following exposure to increasing amounts of LNTs (FIGS. 16A-16C).

Figure 16B:
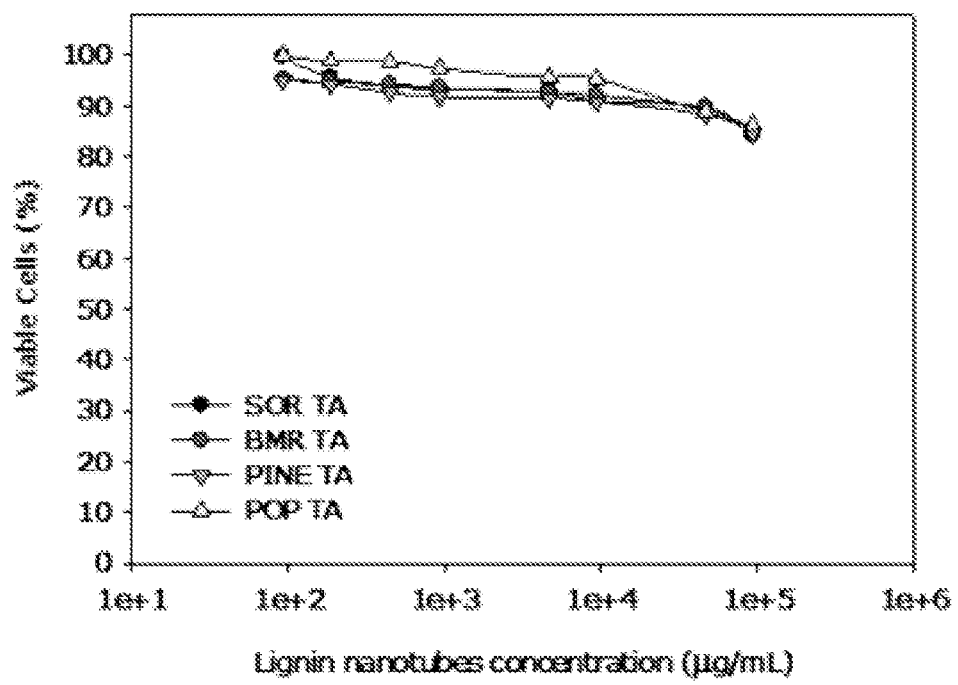
Figure 16C:
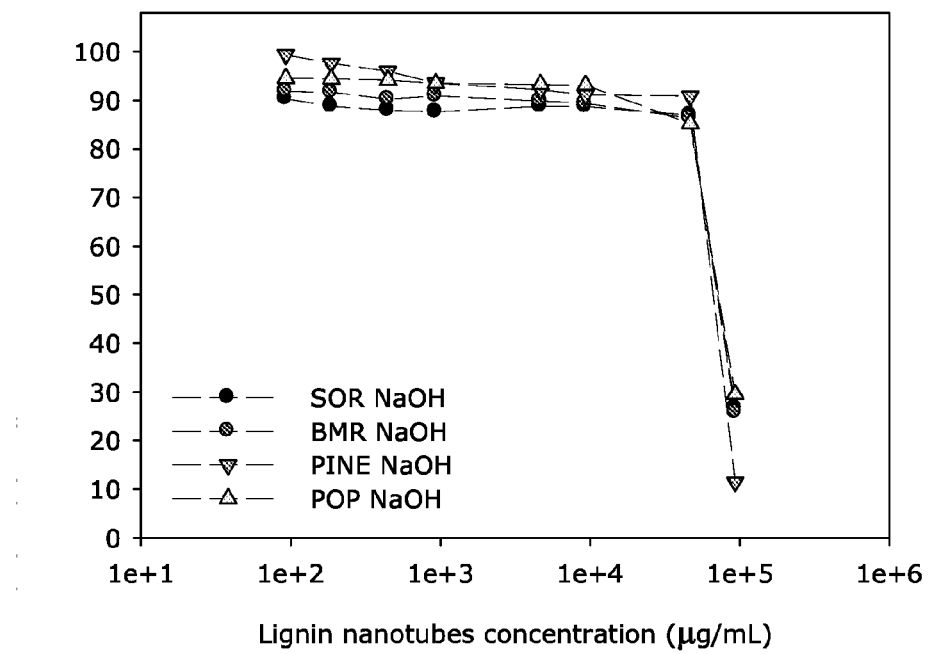

FIG. 16 shows that when cells are exposed to less than 7 mg LNTs (corresponding to a concentration of 46.7 mg/mL), the number of viable cells exceeds 80% for all preparations. Furthermore, at LNT concentrations above 46.7 mg/mL, LNTs prepared from TGA lignin cause cell death in only 15% of the cells (FIG. 16B), whereas more than 76% of the cells treated with LNTs made from NaOH lignin died under the same conditions (FIG. 16C). Overall, the viability of cells decreases in the following order: TGA>SCB>Klason>NaOH. This sequence correlates with the average molecular weight of the lignin used as the base layer for the synthesis of LNTs.

Based on these observations, LNTs appear to exhibit lower cytotoxic effects to HeLa cells in culture compared to single-walled (SW) or multi-walled (MW) carbon nanotubes (CNT). For example, Pantarotto et al. reported that after a 6-hour incubation of HeLa cells with only 5-10 mg/mL either SWCNT or MWCNT, 50% of the cells died (Pantarotto et al., 2004).

Cellular uptake and subsequent subcellular localization of carbon nanotubes have been shown to be strongly dependent upon physical size of the nanotubes. Kang et al. reported that SWCNTs of 100-200 nm in length penetrate cell membranes and are mainly distributed in the cytoplasm, whereas SWNTs of 50-100 nm in length were also localized in the cell nuclei (Kang et al., 2010). With an average length of 13 μm, LNTs made from NaOH-extracted lignin may have better penetrability across the plasma and nuclear membranes, which at high concentrations might have adverse affects on viability of HeLa cells. In contrast, their greater average length of 18 μm may allow LNTs made from TGA lignin to enter cells without causing severe cytotoxic effects. To insure the viability of cells, the concentration 1.4 mg/well or 9.3 mg/mL was used for further cell culture experiments.

LNTs Target the Cell Nuclei

Figure 17:
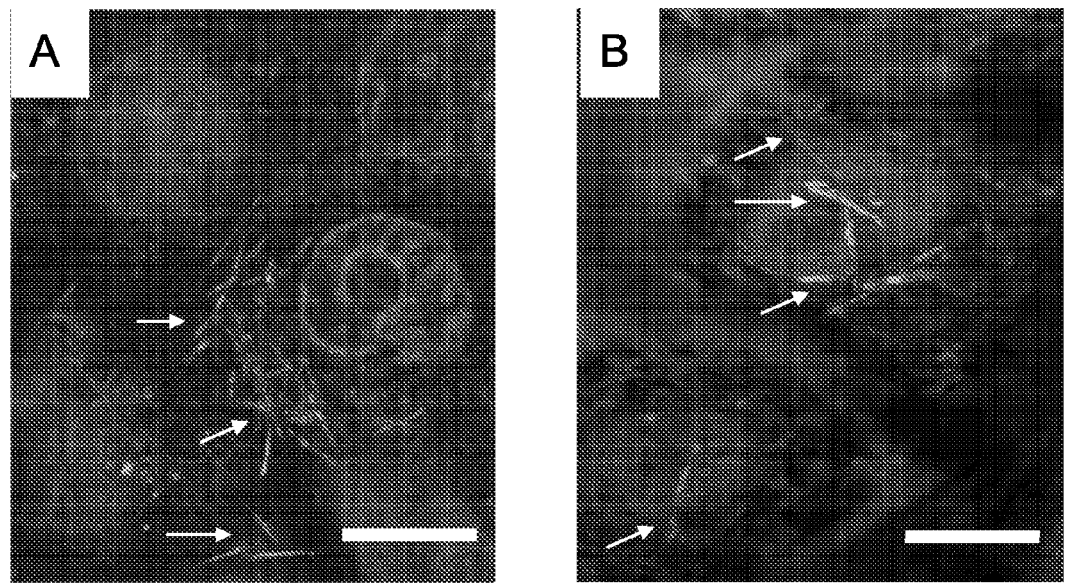
FIGS. 17A-17B are digital confocal microscopy images of LNTs made from (17A) PINE TGA lignin and (17B) PINE NaOH lignin located inside HeLa cells. Scale bar represents 15 µm. White arrows show LNTs.

In order to study the fate of the LNTs following addition to HeLa cells, their localization was examined by confocal microscopy. After incubation with LNTs for 24 hours, cells were fixed and cellular nuclei were stained with DAPI. FIGS. 17A and 17B show confocal microscopy images of HeLa cells exposed to LNTs made from PINE TGA lignin (FIG. 17A) and PINE NaOH lignin (FIG. 17B). The bright green oval areas correspond to HeLa nuclei, whereas the green needle-like structures correspond to LNTs (denoted with white arrows on FIGS. 17A-17B). Analysis of sequential images representing different depths (data not shown) reveals that LNTs made from PINE TGA lignin are primarily localized in the cytosol, whereas the LNTs made from PINE NaOH lignin are present inside the nuclei (FIG. 17B).

The differences between the two extraction methods of lignin used for these LNTs may explain the observed variation in both the subcellular localization and cytotoxicity. In other words, the cytotoxicity of the LNTs derived from NaOH-extracted lignin observed at higher concentrations, may be due to their nuclear localization.

LNTs Mediate Transfection of HeLa Cells

Figure 18:
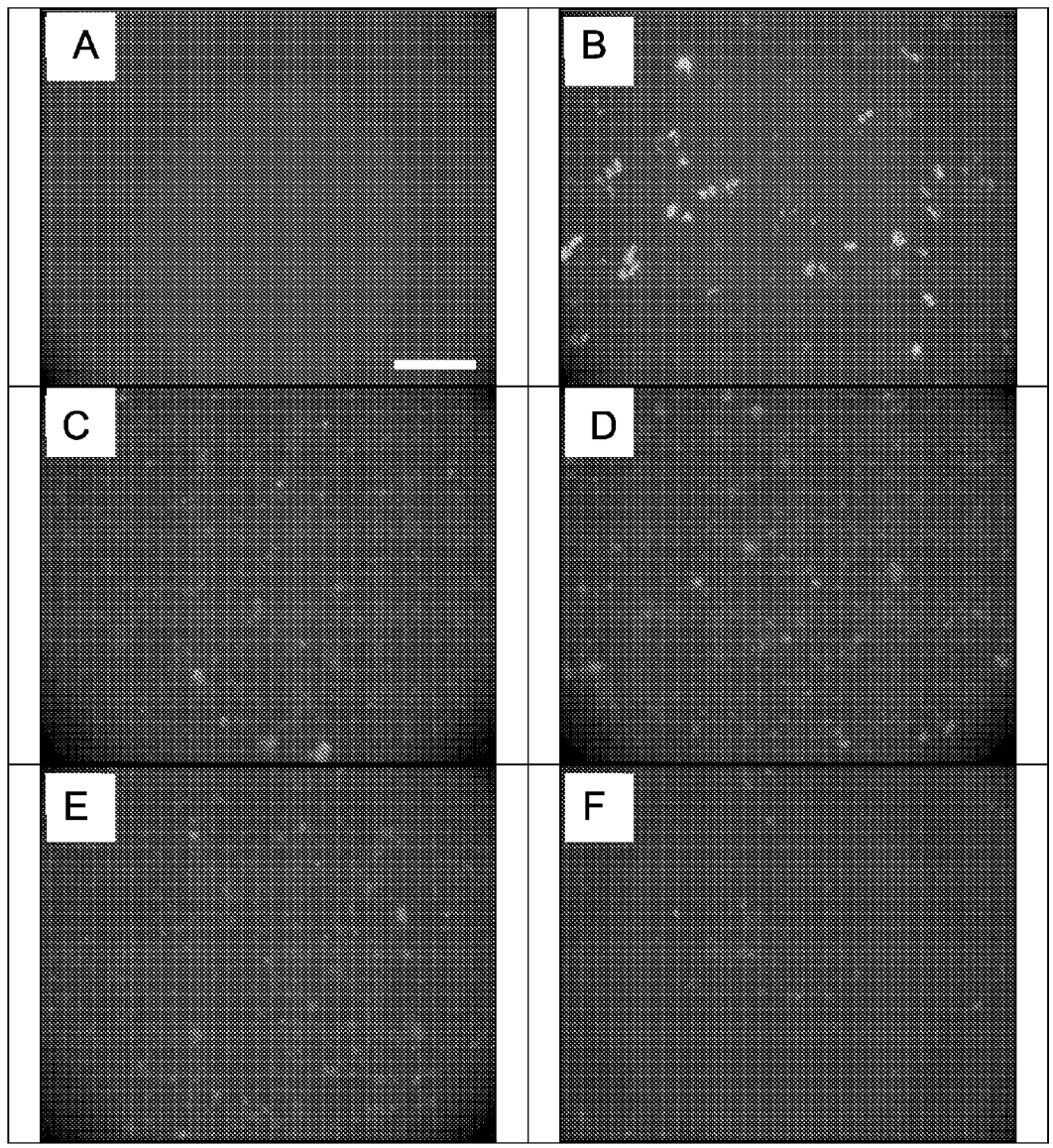
FIGS. 18A-18F are digital UV-fluorescence images of green fluorescent protein (GFP) expression in (18A) untreated HeLa cells (blank); (18B) cells exposed to plasmid DNA/PEI (polyethyleneimine) gene transfer agent; cells exposed to 1.1 mg plasmid DNA and 9.3 mg/mL LNTs made from (18C) SCB, (18D) SOR KL (18E) POP KL; (18F) POP TGA lignin. Scale bar is 200 µm

Given that the LNTs are able to penetrate the cell, and even the nucleus, the next step was to assess whether the LNTs were able to function as carriers of DNA. HeLa cells were exposed to different LNT/plasmid DNA formulations and the resulting level of reporter gene expression was compared with that of the commercially available gene transfer agent poly(ethyleneimine) (PEI). The plasmid pdsAAV-CB-EGPF contains the green fluorescent protein (GFP) reporter gene. Successful expression of the GFP gene can be easily observed under UV light by the appearance of green fluorescent foci indicating the presence of GFP. FIGS. 18A-18F show fluorescence images of HeLa cells transfected with PEI or LNTs, and a negative control (FIG. 18A, no transfection). It is clear that exposure of HeLa cells to LNT/plasmid DNA formulations results in transfection. Moreover, the number of transfected cells was dependent on lignin source and extraction method. In particular, when cells were exposed to LNTs made from TGA lignin, the proportion of transfected cells was lower (FIG. 18F). FIG. 18 also shows that the LNTs made from SCB, Klason and NaOH lignin have higher transfection efficiency (FIGS. 18C-18E).

Since LNTs are made of lignin, an aromatic polymer, UV exposure results in auto-fluorescence (Caicedo et al., 2012), which might appear similar to the fluorescent signal of GFP. Therefore, cells were transfected with a constant amount of LNT (Pine TA lignin), but increasing concentration of plasmid DNA. Fluorescence signals gradually increase with increasing amount of plasmid DNA, suggesting that more cells are expressing GFP (FIGS. 19A-19D). These results indicate that the fluorescence signal is representative of GFP expression levels and that LNTs are able to mediate the uptake of DNA in a form that enables gene expression.

Figure 20:
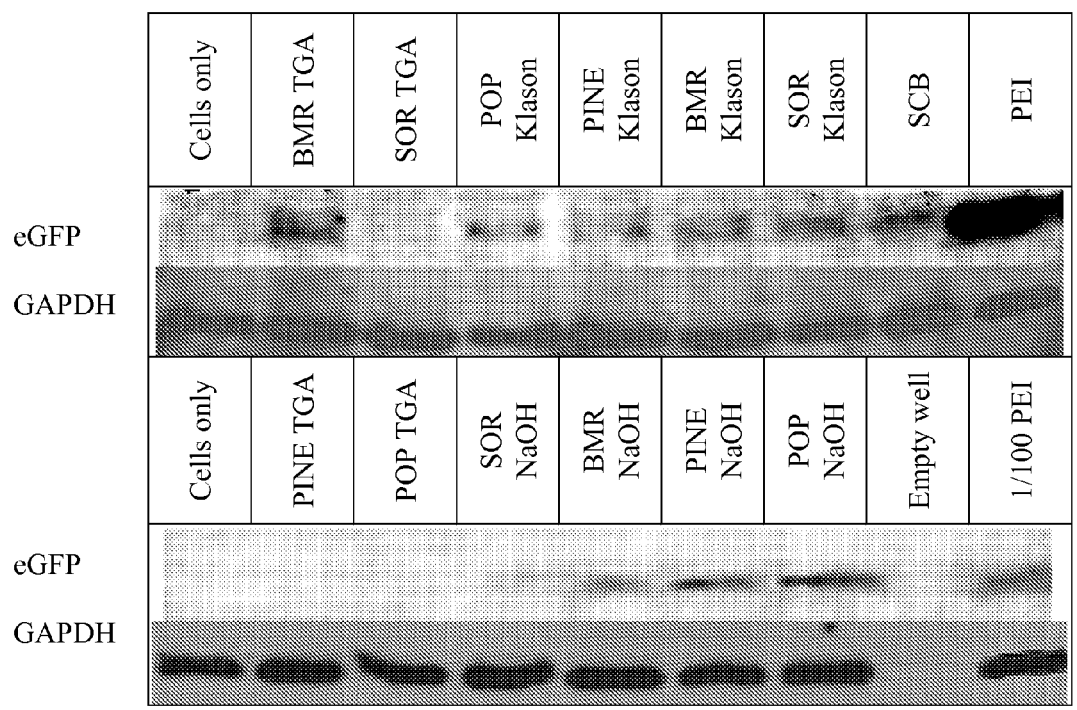
FIG. 20 illustrates western blots of untreated HeLa cells (no LNT, no plasmid DNA) and HeLa cells following transfection with PEI (after 100-fold dilution) or different LNTs/plasmid DNA combinations as labeled. The detection of GFP was based on a polyclonal rabbit anti-eGFP antibody, with a horseradish-conjugated goat-anti-rabbit secondary antibody. Signals from GAPDH are consistent across all samples, indicating that variation in GFP is dependent on the treatments.

In order to further confirm the expression of GFP by HeLa cells transfected with LNT/plasmid DNA, GFP was also detected via western blotting with GFP-specific antibodies (FIG. 20).

The use of PEI resulted in high levels of GFP expression, as evidenced by the strong signal on the western blot. The expression of GFP as a result of transfection with LNT/plasmid DNA varied among LNTs. High expression was obtained with LNTs made from SCB lignin, all Klason lignins, and NaOH-extracted lignin from pine and poplar. The GFP signal from cells exposed to LNTs made from TGA-lignin was low, and only above background level for BMR (FIG. 20). These results are in good agreement with the observations from the fluorescence microscopy.

The Transfection of HeLa Cells is Based on a Physical Association Between DNA and LNTs The observation that LNT can cross the plasma and nuclear membranes offers two possible scenarios as to how the plasmid DNA enters the cells. The first scenario is that the DNA is physically associated with the LNTs and co-migrates to the nucleus. An alternative scenario is that the DNA passively co-migrates with the LNTs, without physical association.

In order to investigate any physical association between DNA and LNTs, two sets of complementary experiments were conducted. First, a suspension of LNTs made from PINE TGA lignin was mixed with 500 ng biotinylated plasmid DNA. Biotinylated DNA was then removed from the solution with streptavidin-coated magnetic beads. Streptavidin binds strongly ($K_d=10^{-14}$ M) to biotin via a combination of Van der Waals and hydrophobic interactions (Donaldson et al., 2013). With a physical association between the DNA and the LNTs, LNTs would also be captured on the magnetic beads. Controls for this experiment included biotinylated DNA by itself (positive control to demonstrate effective capture), LNTs by themselves (control to evaluate any physical interaction between LNTs and streptavidin, independent of biotin), and a mix of native (non-biotinylated) plasmid DNA and LNTs (control to verify the biotin-dependent binding to streptavidin-coated beads).

Second, in order to take into account the possible role of biotin on the association between DNA and LNTs, the LNTs were incubated with DNA, the nanotubes were precipitated from the suspension by centrifugation, followed by several washes, and PCR was used to examine the presence of DNA on the LNTs.

Figure 21A:
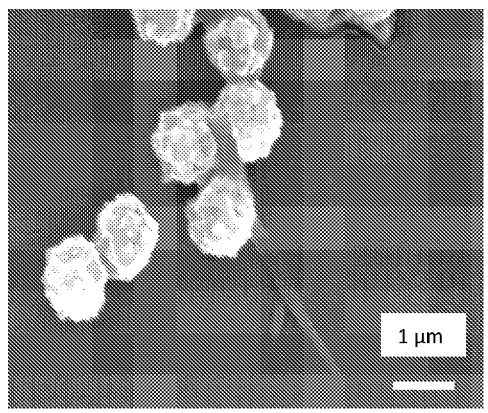
FIGS. 21A-21C are representative digital SEM images of captured streptavidin-coated magnetic beads following incubation with (21A) biotinylated plasmid DNA and LNTs made from PINE TGA lignin; (21B) biotinylated plasmid DNA and LNTs made from POP TGA lignin; (21C) LNTs (POP-TGA) (no biotinylated plasmid DNA); and (21D) native plasmid DNA and LNTs (POP-TGA)
Figure 21B:
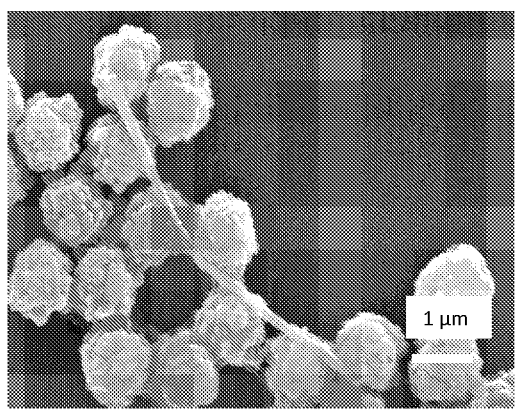
Figure 21C:
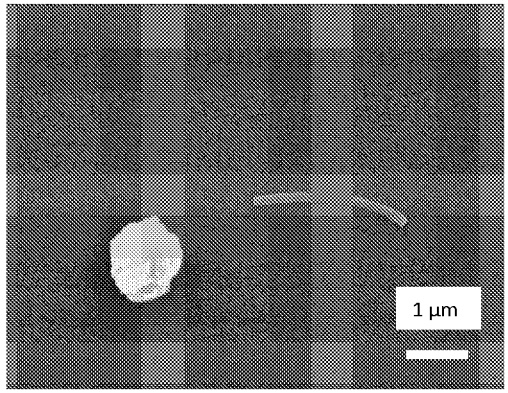
Figure 21D:
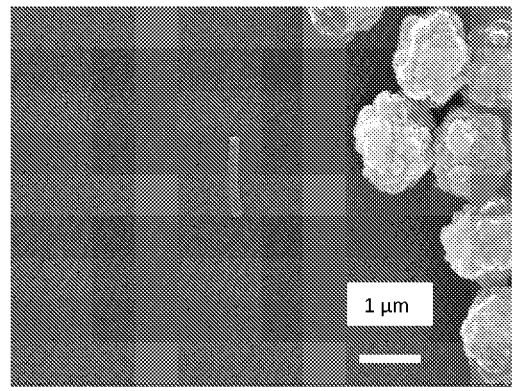
Figure 22:
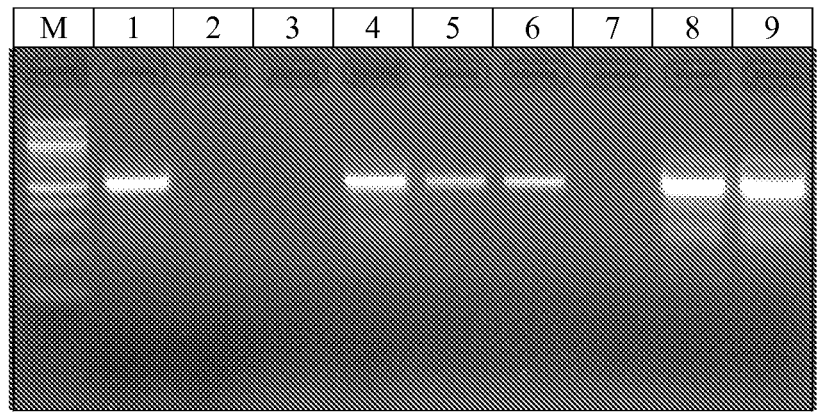
FIG. 22 is a digital image of an ethidium bromide stained agarose gel showing PCR products generated from the following DNA templates: 1-0.01 ng plasmid DNA (positive control); 2—plasmid DNA with LNTs (PINE-TGA) added in the reaction; no incubation; 10-fold dilution; 3—As lane 2,100-fold dilution; 4—As lane 2; 1000-fold dilution; 5—plasmid DNA following 1 h. incubation with LNTs made from PINE-TGA lignin; 100-fold dilution; 6—plasmid DNA following 1 h. incubation with LNTs made from POP-TGA lignin; 100-fold dilution; 7—negative control (no plasmid DNA); 8—biotinylated plasmid DNA after incubation with LNTs (PINE-TGA) and formamide extraction; 9—biotinylated plasmid DNA after incubation with LNTs (POP-TGA) and formamide extraction; M=PCR size marker (Sigma-Aldrich).
Figure 23:
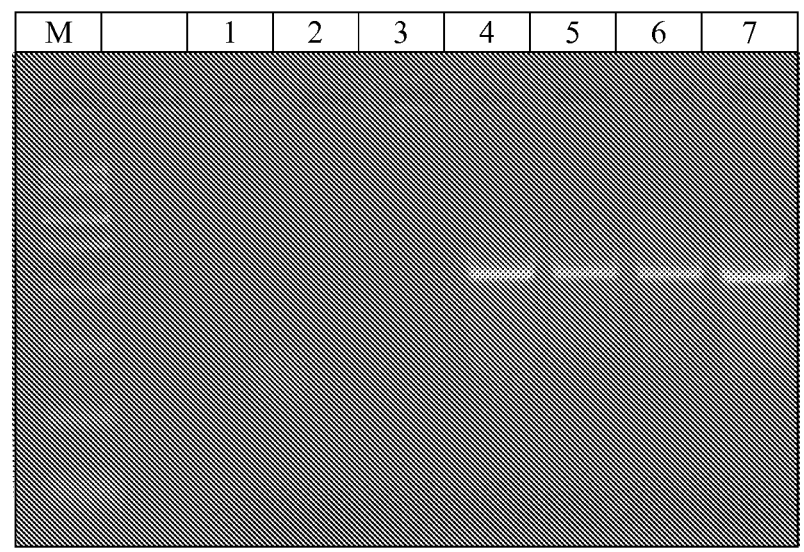
FIG. 23 is a digital image of an ethidium bromide stained agarose gel showing PCR products generated from the following DNA templates: 1—negative control (no plasmid DNA (pDNA)); 2—Pine TA LNT/streptavidin beads; 3—Native-pDNA/Pine TA LNT/streptavidin beads; 4—biotin-pDNA/Pine LNT/streptavidin beads; 5—Biotin-DNA/streptavidin beads; 6—native DNA; 7—biotin-DNA. M=PCR marker size ladder (Sigma-Aldrich).

Following the first experiment, a small volume of beads suspension was placed on a glass slide and visualized under the fluorescence microscope and SEM. The image under the fluorescence microscope revealed bright fluorescent spots among the lawn of beads, suggesting the presence of LNTs (data not shown). Visualization by SEM shows streptavidin-coated beads attached to the surface of LNTs (FIGS. 21A and 21B). The controls with just LNTs (no DNA) (FIG. 21C) and LNTs with non-biotinylated DNA (FIG. 21D) revealed the presence of just a few scattered fragments of isolated LNTs, but provided no evidence for the association between LNTs and streptavidin-coated beads. In addition, PCR performed on DNA that had been removed from the magnetic beads (FIG. 22 (lanes 8,9); FIG. 23) confirmed the association of biotinylated plasmid DNA and magnetic beads. Based on these observations, it was concluded that biotinylated DNA physically associates with LNTs. This example demonstrates that LNT binds with DNA first and then enters the cells. Since the LNTs extracted with TGA are longer, their diffusion into the cells is restricted, therefore LNTs from TGA lignin show low transfection efficiency (FIG. 20).

A complementary experiment was conducted with LNTs made from pine and poplar TGA lignin incubated with 500 ng plasmid DNA. Following collection of the nanotubes in the bottom of the tube by centrifugation and multiple washes in order to remove any residual plasmid DNA not bound to the LNTs, the pellets were resuspended in 10 μL ddH$_2$O. An aliquot was diluted 100-fold in ddH$_2$O for PCR. Gel electrophoresis following amplification showed a PCR product of the expected size, indicating that DNA was physically associated with the LNTs. Given that Taq polymerase used in PCR is known to be inhibited by phenolics (De Boer et al. 1995), the impact of the LNTs on PCR was evaluated by adding 1.4 mg LNT in suspension to 0.1 ng DNA without incubation. These samples were then diluted 10-, 100- and 1.000-fold in ddH$_2$O and subjected to PCR. FIG. 22 shows that the presence of LNT adversely affects the amplification of DNA from the plasmid template (FIG. 22, lanes 2-4). The higher the dilution of LNT, the stronger the signal, even though the template concentration decreases. As in the experiment with the streptavidin-coated magnetic beads, these PCR results confirm the physical association between LNTs and DNA (FIG. 22, lanes 6-7).

This example demonstrates that the lignin extraction method can influence the dimensions, cytotoxicity and transfection efficiency of the resulting LNTs. Since DNA molecules under physiological conditions are in elongated random coil states and negatively charged, effective gene delivery and transfection using nonviral vehicles requires a moderately high positive charge (Zhou et al. 2013).

The electrostatic attractive interaction between DNA and transfection agent is driven by the increase in entropy attributed to the release of counter ions upon complex formation (Jho et al. 2010). Monovalent ions cannot induce DNA condensation by themselves, but they influence DNA adsorption induced by multivalent ligands, changing the binding constants (Iwaki et al. 2007; Teif 2005). Therefore, high LNT-mediated transfection efficiency may benefit from the presence of salt in the interaction media. This hypothesis was tested by measuring plasmid DNA concentrations before and after incubation with LNTs in buffers with or without 0.1 M NaCl. The difference in DNA concentration measured before and after the incubation represents the binding capacity of LNTs. The influence of the extraction method and NaCl on plasmid DNA binding capacity of LNTs is presented in Table 2. LNTs based on PINE NaOH lignin show better binding capacity than those based on PINE TGA lignin, possibly because of a slightly positively charged LNT surface. LNTs made from PINE NaOH lignin in the absence and presence of NaCl captured 6.1 and 7.0 ng/μg plasmid DNA, respectively. In contrast, those made from PINE TGA lignin captured 0.73 and 1.7 ng/μg plasmid DNA in the absence and presence of NaCl, respectively (Table 2). It appears that when incubations are performed in NaCl-containing buffers, plasmid DNA binding capacity is higher than in buffers without NaCl. Due to the better binding capacity of LNTs made from PINE NaOH lignin (Table 2) and their ability to enter cell nuclei (FIG. 17), these LNTs demonstrate high gene transfection efficiency as evidenced by fluorescent microscopy images and western blots (FIG. 20)

Owing to the fact that plasmid DNA physically binds to the non-toxic LNTs and enters cell nuclei, lignin nanotubes can potentially be used as nonviral gene delivery vectors in vitro and in vivo. Since surface functionality of LNTs can be easily controlled via versatile chemical modifications, it is anticipated to further improve their transfection efficiency.

TABLE 2 pDNA binding capacity of LNTs in TE buffer and 10 mM Tris-HCl containing 0.1M NaCl.

|  | In 10 mM Tris-HCl and 1 mM EDTA | | In 10 mM Tris-HCl and 0.1M NaCl | |
| --- | --- | --- | --- | --- |
|  | Pine TA | Pine NaOH | Pine TA | Pine NaOH |
| DMA binding capacity of LNTs (ng/μg) | 0.73 | 6.1 | 1.7 | 7.0 |

Conclusions

Physico-Chemical Characteristics of LNTs Influence their Efficiency as DNA Delivery Vehicles The synthesis of LNTs in a sacrificial template membrane is not limited to a single source of lignin or a single lignin isolation procedure. Dimensions of the LNTs appear to be affected by the lignin isolation procedure, whereas the nanomechanical properties and transfection efficiency are also influenced by the source of the lignin (plant species and genotype). This means that LNTs can be tailored to the application for which they are intended.

This example demonstrated that DNA is physically associated with the LNTs and that the LNTs enter the cytosol, and in some case the nucleus. The LNTs made from NaOH-extracted lignin are of special interest, as they were the shortest in length, substantially reduced HeLa cell viability at levels above approximately 50 mg/mL, and, in the case of pine and poplar, were the most effective in the transfection experiments. The cytotoxicity of the LNTs prepared from NaOH-extracted lignin could be the result of the ease of penetration of the nucleus, but this attribute will also enhance the delivery of DNA. Consequently, there is likely an optimum between the cytotoxicity and transfection efficiency. The LNT-mediated transfection of HeLa cells was performed at concentrations well below the threshold value.

Figure 19:
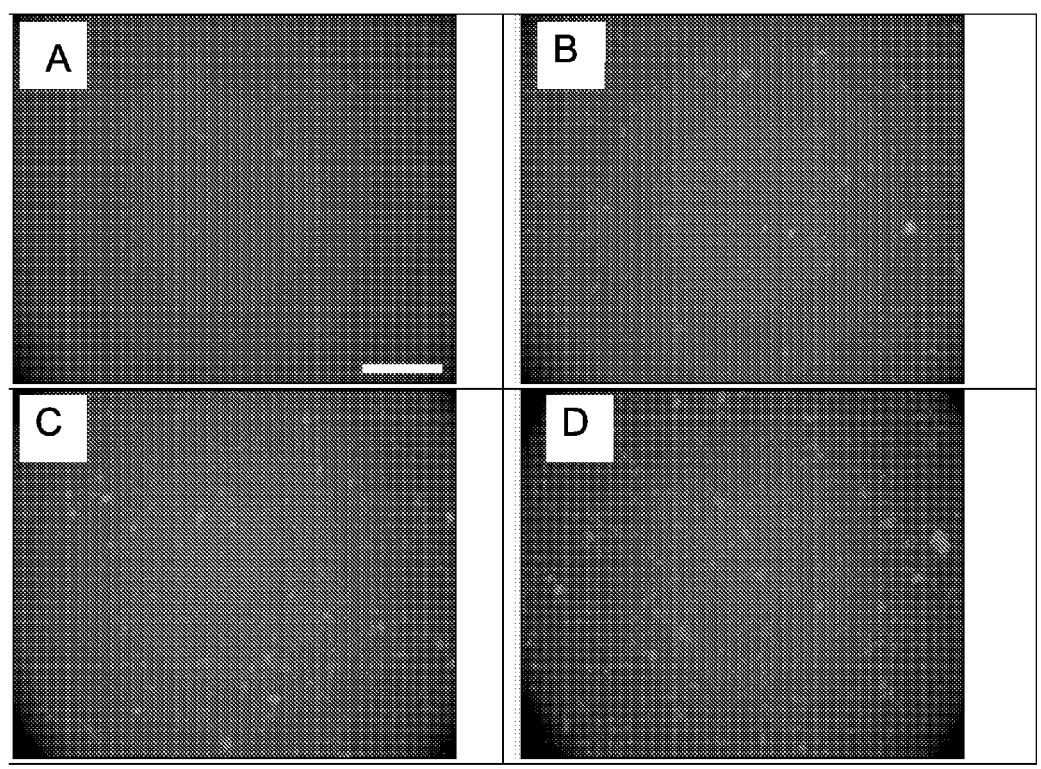
FIGS. 19A-19D are digital UV-fluorescence images of green fluorescent protein (GFP) expression in HeLa cells exposed to 9.3 mg/mL LNTs made from PINE TGA lignin with (19A) no plasmid DNA; (19B) 84 ng pdsAAV-CB-EGPF; (19C) 294 ng pdsAAV-CB-EGPF; and (19D) 1.1 mg pdsAAV-CB-EGPF. Scale bar is 200 µm.

PEI-mediated transfection of HeLa cells growing in liquid culture was still more efficient than the use of LNTs, as evidenced by the fluorescence data (FIG. 17) and western blot analysis (FIG. 19). The high transfection efficiency of PEI in vitro has been ascribed to its ability to act as a proton sponge that buffers the low pH in the endolysosomal compartments and potentially induces ruptures of the endolysosomal membrane, resulting in the release of PEI/DNA complex into the cytoplasm (Boussif et al. 1995). Therefore, PEI is commonly used for in vitro transfection experiments, but is not suitable for the use of in vivo transfection. The reason is that the transfection efficiency of PEI is highly dependent upon their molecular weight (Fischer et al. 1999). The high molecular weight, branching and amount of positive charges result in undesirable toxicity of PEI polymers. The toxicity and the fact that these polymers are not biodegradable are limiting factors for PEI use in vivo (Lee at al. 2008; Eliyahu et al. 2005). The ability to derivatize LNTs, including the attachment of antibodies (Caicedo et al., 2012) offers great potential to develop a smart delivery system for DNA in living organisms. A key aspect to be investigated is the immunogenicity of LNTs, and, if there is an immune response, to what extent that is influenced by the source of the lignin and lignin isolation procedure.

REFERENCES FOR EXAMPLE 2

Incorporated Herein by Reference

Bainbridge, J. W.; Smith, A. J.; Barker, S. S.; Robbie, S.; Henderson, R.; Balaggan, K.; Viswanathan, A.; Holder, G. E.; Stockman, A.; Tyler, N.; Petersen-Jones, S.; Bhattacharya, S. S.; Thrasher, A. J.; Fitzke, F. W.; Carter, B. J.; Rubin, G. S.; Moore, A. T.; Ali, R. R., *N Engl J Med* 2008, 358 (21), 2231-9.

Baker, D. A.; Gallego, N. C.; Baker, F. S., On the characterization and spinning of an organic-purified lignin towards the manufacture of low-cost carbon fiber. J. Appl. Polym. Sci.: 2012; 124, 227-234.

Berkovich, E. S. Three-faceted diamond pyramid for microhardness testing. Ind. Diamond Rev. 1951, 11 (127), 129-133.

Berns, K. I.; Bohenzky, R. A., Adv Virus Res 1987, 32, 243-306.

Bianco, A.; Kostarelos, K.; Partidos, C. D.; Prato, M., *Chem Commun (Camb)* 2005, (5), 571-7.

Blacklow, N. R. 2003. Parvovirus Infections in Humans. eLS.

Blacklow, N. R.; Hoggan, M. D.; Sereno, M. S.; Brandt, C. D.; Kim, H. W.; Parrott, R. H.; Chanock, R. M., *Am J Epidemiol* 1971, 94 (4), 359-66.

Boussif, O.; Lezoualc'h, F.; Zanta, M. A.; Mergny, M. D.; Scherman, D.; Demeneix, B.; Behr, J. P., *Proc Natl Acad Sci USA* 1995, 92 (16), 7297-301.

Brodin, I.; Ernstsson, M.; Gellerstedt, G.; Sjoholm, E., *Holzforschung* 2012, 66 (2), 141-147.

Brodin, I.; Sjoholm, E.; Gellerstedt, G., *Journal of Analytical and Applied Pyrolysis* 2010, 87 (1), 70-77.

Bruce, R.; West, C., *Plant Physiology* 1989, 91 (3), 889-897.

Caicedo, H.; Dempere, L.; Vermerris, W., *Nanotechnology* 2012, 23 (10), 105605.

Calgeris, I.; Cakmakci, E.; Ogan, A.; Kahraman, M.; Kayaman-Apohan, N., *Starch-Starke* 2012, 64 (5), 399-407.

Chen, P.; Zhang, L.; Peng, S.; Liao, B., *Journal of Applied Polymer Science* 2006, 101 (1), 334-341.

Cideciyan, A.; Aleman, T.; Boye, S.; Schwartz, S.; Kaushal, S.; Roman, A.; Pang, J.; Sumaroka, A.; Windsor, E.; Wilson, J.; Flotte, T.; Fishman, G.; Heon, E.; Stone, E.; Byrne, B.; Jacobson, S.; Hauswirth, W., *Proceedings of the National Academy of Sciences of the United States of America* 2008, 105 (39), 15112-15117.

Coccia, F.; Tonucci, L.; Bosco, D.; Bressan, M.; d'Alessandro, N., *Green Chemistry* 2012, 14 (4), 1073-1078.

Deboer, S.; Ward, L.; Li, X.; Chittaranjan, S., *Nucleic Acids Research* 1995, 23 (13), 2567-2568.

Deoliveira, W.; Glasser, W., *Macromolecules* 1994, 27 (1), 5-11.

Donahue, R. E.; Kessler, S. W.; Bodine, D.; McDonagh, K.; Dunbar, C.; Goodman, S.; Agricola, B.; Byrne, E.; Raffeld, M.; Moen, R., *J Exp Med* 1992, 176 (4), 1125-35.

Donaldson, O.; Huang, Z. J.; N., C., *Progress in Biomaterials* 2013, 3 (2), 1-10.

Eliyahu, H.; Barenholz, Y.; Domb, A., *Molecules* 2005, 10 (1), 34-64.

Fischer, D.; Bieber, T.; Li, Y.; Elsasser, H.; Kissel, T., *Pharmaceutical Research* 1999, 16 (8), 1273-1279.

Friedmann, T., *Science* 1989, 244 (4910), 1275-1281.

Gao, G.; Dallmeyer, J.; Kadla, J., *Biomacromolecules* 2012, 13 (11), 3602-3610.

Hacien-Bey-Abina, S., *Science* 2003, 302 (5645), 568-568.

Hatfield, R.; Jung, H.; Ralph, J.; Buxton, D.; Weimer, P., *Journal of the Science of Food and Agriculture* 1994, 65 (1), 51-58.

Hauswirth, W.; Aleman, T.; Kaushal, S.; Cideciyan, A.; Schwartz, S.; Wang, L.; Conlon, T.; Boye, S.; Flotte, T.; Byrne, B.; Jacobson, S., *Human Gene Therapy* 2008, 19 (10), 979-990.

Huang, J.; Zhang, L.; Chen, F., *Journal of Applied Polymer Science* 2003, 88 (14), 3284-3290.

Huang, J.; Zhang, L.; Chen, P., *Journal of Applied Polymer Science* 2003, 88 (14), 3291-3297.

Hwu, W. L.; Muramatsu, S.; Tseng, S. H.; Tzen, K. Y.; Lee, N. C.; Chien, Y. H.; Snyder, R. O.; Byrne, B. J.; Tai, C. H.; Wu, R. M., *Sci Transl Med* 2012, 4 (134), 134ra61.

Iwaki, T.; Saito, T.; Yoshikawa, K., *Colloids Surf B Biointerfaces* 2007, 56 (1-2), 126-33.

Jho, Y.; Kim, M.; Safran, S.; Pincus, P., *European Physical Journal E* 2010, 31 (2), 207-214.

Kadla, J.; Kubo, S.; Venditti, R.; Gilbert, R.; Compere, A.; Griffith, W., *Carbon* 2002, 40 (15), 2913-2920.

Kai, W.; He, Y.; Asakawa, N.; Inoue, Y., *Journal of Applied Polymer Science* 2004, 94 (6), 2466-2474.

Kaiser, J., *Science* 2011, 334 (6052), 29-30.

Kang, B.; Chang, S.; Dai, Y.; Yu, D.; Chen, D., *Small* 2010, 6 (21), 2362-6.

Kohn, D. B.; Sadelain, M.; Dunbar, C.; Bodine, D.; Kiem, H. P.; Candotti, F.; Tisdale, J.; Riviére, I.; Blau, C. A.; Richard, R. E.; Sorrentino, B.; Nolta, J.; Malech, H.; Brenner, M.; Cornetta, K.; Cavagnaro, J.; High, K.; Glorioso, J.; (ASGT), A. S. o. G. T., *Mol Ther* 2003, 8 (2), 180-7.

Kotin, R. M.; Siniscalco, M.; Samulski, R. J.; Zhu, X. D.; Hunter, L.; Laughlin, C. A.; McLaughlin, S.; Muzyczka, N.; Rocchi, M.; Berns, K. I., *Proc Natl Acad Sci USA* 1990, 87 (6), 2211-5.

Kotin, R.; Menninger, J.; Ward, D.; Berns, K., *Genomics* 1991, 10 (3), 831-834.

Kubo, S.; Kadla, J., *Journal of Polymers and the Environment* 2005, 13 (2), 97-105.

Kumar, M.; Mohanty, A.; Erickson, L.; Misra, M., *Journal of Biobased Materials and Bioenergy* 2009, 3 (1), 1-24.

Lacerda, L.; Bianco, A.; Prato, M.; Kostarelos, K., *Journal of Materials Chemistry* 2008, 18 (1), 17-22.

Lee, Y.; Cho, M. Y.; Mo, H.; Nam, K.; Koo, H.; Jin, G.-w.; Park, J. S., *Bull. Korean Chem. Soc.* 2008, 29 (3), 666-668.

Li, J.; Gellerstedt, G.; Toven, K., *Bioresour Technol* 2009, 100 (9), 2556-2561.

Li, J.; He, Y.; Inoue, Y., *Polymer International* 2003, 52 (6), 949-955.

Ling, C.; Lu, Y.; Cheng, B.; McGoogan, K. E.; Gee, S. W.; Ma, W.; Li, B.; Aslanidi, G. V.; Srivastava, A., *J Vis Exp* 2011, 49.

Liu, Y.; Zhao, Y.; Sun, B.; Chen, C., *Accounts of Chemical Research* 2013, 46 (3), 702-713.

Magrez, A.; Kasas, S.; Salicio, V.; Pasquier, N.; Seo, J.; Celio, M.; Catsicas, S.; Schwaller, B.; Forro, L., *Nano Letters* 2006, 6 (6), 1121-1125.

Maguire, A.; Simonelli, F.; Pierce, E.; Pugh, E.; Mingozzi, F.; Bennicelli, J.; Banfi, S.; Marshall, K.; Testa, F.; Surace, E.; Rossi, S.; Lyubarsky, A.; Arruda, V.; Konkle, B.; Stone, E.; Sun, J.; Jacobs, J.; Dell'Osso, L.; Hertle, R.; Ma, J.; Redmond, T.; Zhu, X.; Hauck, B.; Zelenaia, O.; Shindler, K.; Maguire, M.; Wright, J.; Volpe, N.; McDonnell, J.; Auricchio, A.; High, K.; Bennett, J., *New England Journal of Medicine* 2008, 358 (21), 2240-2248.

May, C.; Rivella, S.; Callegari, J.; Heller, G.; Gaensler, K.; Luzzatto, L.; Sadelain, M., *Nature* 2000, 406 (6791), 82-86.

Mingozzi, F.; High, K., *Nature Reviews Genetics* 2011, 12 (7), 516-516.

Morgan, R., *Molecular Therapy* 2012, 20 (1), 11-13.\Morohoshi, N.; G., G. W., *Wood Sci. Technol.* 1979, 13, 165-178.

Mousavioun, P.; George, G.; Doherty, W., *Polymer Degradation and Stability* 2012, 97 (7), 1114-1122.

Nathwani, A.; Tuddenham, E.; Rangarajan, S.; Rosales, C.; McIntosh, J.; Linch, D.; Chowdary, P.; Riddell, A.; Pie, A.; Harrington, C.; O'Beirne, J.; Smith, K.; Pasi, J.; Glader, B.; Rustagi, P.; Ng, C.; Kay, M.; Zhou, J.; Spence, Y.; Morton, C.; Allay, J.; Coleman, J.; Sleep, S.; Cunningham, J.; Srivastava, D.; Basner-Tschakarjan, E.; Mingozzi, F.; High, K.; Gray, J.; Reiss, U.; Nienhuis, A.; Davidoff, A., *New England Journal of Medicine* 2011, 365 (25), 2357-2365.

Oliver, W.; Pharr, G., *Journal of Materials Research* 1992, 7 (6), 1564-1583.

Palmer, N.; Sattler, S.; Saathoff, A.; Funnell, D.; Pedersen, J.; Sarath, G., *Planta* 2008, 229 (1), 115-127.

Pantarotto, D.; Singh, R.; McCarthy, D.; Erhardt, M.; Briand, J.; Prato, M.; Kostarelos, K.; Bianco, A., *Angewandte Chemie-International Edition* 2004, 43 (39), 5242-5246.

Pawliuk, R.; Westerman, K.; Fabry, M.; Payen, E.; Tighe, R.; Bouhassira, E.; Acharya, S.; Ellis, J.; London, I.; Eaves, C.; Humphries, R.; Beuzard, Y.; Nagel, R.; Leboulch, P., *Science* 2001, 294 (5550), 2368-2371.

Pedersen, J.; Funnell, D.; Toy, J.; Oliver, A.; Grant, R., *Crop Science* 2006, 46 (1), 491-492.

Ragauskas, A.; Williams, C.; Davison, B.; Britovsek, G.; Cairney, J.; Eckert, C.; Frederick, W.; Hallett, J.; Leak, D.; Liotta, C.; Mielenz, J.; Murphy, R.; Templer, R.; Tschaplinski, T., *Science* 2006, 311 (5760), 484-489.

Ralph, J.; Lundquist, K.; Brunow, G.; Lu, F.; Kim, H.; Schatz, P. F.; Marita, J. M.; Hatfield, R. D.; Ralph, S. A.; Christensen, J. H.; Boerjan, W., *Phytochem Rev.* 2004, 3, 29-60.

Rosenberg, S.; Aebersold, P.; Cornetta, K.; Kasid, A.; Morgan, R.; Moen, R.; Karson, E.; Lotze, M.; Yang, J.; Topallian, S.; Merino, M.; Culver, K.; Miller, A.; Blaese, R.; Anderson, W., *New England Journal of Medicine* 1990, 323 (9), 570-578.

Saballos, A.; Vermerris, W.; Rivera, L.; Ejeta, G., *Bioenergy Research* 2008, 1 (3-4), 193-204.

Sahoo, S.; Misra, M.; Mohanty, A., *Composites Part a-Applied Science and Manufacturing* 2011, 42 (11), 1710-1718.

Sahoo, S.; Misra, M.; Mohanty, A., *Journal of Applied Polymer Science* 2013, 127 (5), 4110-4121.

Samulski, R. J.; Zhu, X.; Xiao, X.; Brook, J. D.; Housman, D. E.; Epstein, N.; Hunter, L. A., *EMBO J.* 1991, 10 (12), 3941-50.

Singh, R.; Pantarotto, D.; McCarthy, D.; Chaloin, O.; Hoebeke, J.; Partidos, C.; Briand, J.; Prato, M.; Bianco, A.; Kostarelos, K., *Journal of the American Chemical Society* 2005, 127 (12), 4388-4396.

Spender, J.; Demers, A.; Xie, X.; Cline, A.; Earle, M.; Ellis, L.; Neivandt, D., *Nano Letters* 2012, 12 (7), 3857-3860.

Sun, R.; Lawther, J.; Banks, W.; Xiao, B., *Industrial Crops and Products* 1997, 6 (2), 97-106.

Ten, E.; Vermerris, W., *Polymer* 2013, 5, 600-642.

Theander, O.; Westerlund, E., *Journal of Agricultural and Food Chemistry* 1986, 34 (2), 330-336.

Thomas, C.; Ehrhardt, A.; Kay, M., *Nature Reviews Genetics* 2003, 4 (5), 346-358.

Vermerris, W.; Boon, J. J., *J Agric Food Chem* 2001, 49 (2), 721-8.

Vermerris, W.; Nicholson, R., Phenolic Compound Biochemistry. Springer: Dordrecht, The Netherlands, 2006; p 276.

Wei, M.; Fan, L.; Huang, J.; Chen, Y., *Macromolecular Materials and Engineering* 2006, 291 (5), 524-530.

Zabner, J.; Couture, L.; Gregory, R.; Graham, S.; Smith, A.; Welsh, M., *Cell* 1993, 75 (2), 207-216.

Zhang, R.; Xiao, X.; Tai, Q.; Huang, H.; Hu, Y., *Polymer Engineering and Science* 2012, 52 (12), 2620-2626.

Zhou, H.; Lou, H.; Yang, D.; Zhu, J. Y.; Qiu, X., *Ind. Eng. Chem. Res.* 2013, 52 (25), 8464-8470.

Zhou, T.; Llizo, A.; Wan, C.; Xu, G.; Yang, Y., *Nanoscale* 2013.

Zhu, Z.; Sathitsuksanoh, N.; Vinzant, T.; Schell, D.; McMillan, J.; Zhang, Y., *Biotechnology and Bioengineering* 2009, 103 (4), 715-724.

The invention claimed is:

1. A nanostructure comprising:
a nanotube or a nanowire comprised substantially of lignin.

2. The nanostructure of claim 1, wherein the lignin is chosen from: natural lignin, synthetic lignin, or a combination thereof.

3. The nanostructure of claim 1, wherein the nanostructure is about 50% to about 100% lignin.

4. The nanostructure of claim 2, wherein the natural lignin is isolated from plant source material.

5. The nanostructure of claim 4, wherein the natural lignin is isolated from the source material by the thioglycolic acid procedure.

6. The nanostructure of claim 4, wherein the natural lignin is isolated from plant source material produced as a byproduct of biorefineries or paper mills.

7. The nanostructure of claim 2, wherein the synthetic lignin comprises dehydrogenation polymer (DHP) formed from monomers or a combination of monomers chosen from hydroxycinnamic acids (1), hydroxycinnamylaldehydes (2), and hydroxycinnamyl alcohols (3) as represented by the following structures:

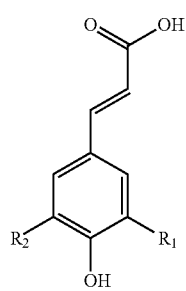

1

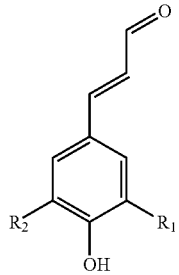

2

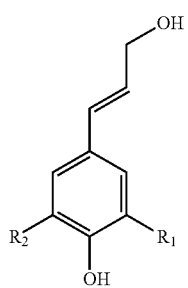

3

$R_1$=H, OH, $OCH_3$ $R_2$=H, OH, $OCH_3$ wherein $R_1$ and $R_2$ are independently chosen from H, OH, or $OCH_3$.

8. The nanostructure of claim 7, wherein the synthetic lignin monomers are chosen from: coniferyl alcohol, coniferaldehyde, ferulic acid, p-coumaric acid or combinations thereof.

9. The nanostructure of claim 2, wherein the nanotube comprises at least one layer of natural lignin and at least one layer of synthetic lignin.

10. The nanostructure of claim 7, wherein the synthetic lignin comprises a combination of ferulic acid and p-coumaric acid.

11. The nanostructure of claim 1, wherein the nanotube is about 200 to about 100,000 nm in length.

12. The nanostructure of claim 1, wherein the diameter of the nanotube is from about 50 to about 500 nm.

13. The nanostructure of claim 1, wherein the nanostructure has a natural fluorescence detectable by irradiation with UV light.

14. A nanotube consisting essentially of lignin.

15. A method of making a lignin nanostructure comprising:
providing a porous template comprising a sacrificial material;
depositing at least one layer of lignin on an inside surface of the pores of the template to produce a lignin nanostructure, wherein the lignin nanostructure is chosen from a lignin nanotube having a hollow interior or a lignin nanowire; and
releasing the lignin nanostructure from the template.

16. The method of claim 15, wherein releasing the lignin nanostructure from the template comprises dissolving the sacrificial material.

17. The method of claim 15, wherein the template is made of alumina.

18. The method of claim 17, wherein releasing the lignin nanotube from the alumina template comprises dissolving the template in a solution of phosphoric acid and a surfactant.

19. The method of claim 15, further comprising activating the surface of the pores of the template prior to depositing lignin on the inside surface of the template pores.

20. The method of claim 19, further comprising activating the pores with (3-aminopropyl)-triethoxysilane (APTES).

21. The method of claim 15, wherein the at least one layer of lignin comprises natural lignin.

22. The method of claim 21, further comprising depositing at least one layer of synthetic lignin onto the layer of natural lignin.

23. The method of claim 22, wherein the synthetic lignin comprises a dehydrogenation polymer (DHP) formed from monomers or a combination of monomers chosen from hydroxycinnamic acids (1), hydroxycinnamylaldehydes (2), and hydroxycinnamyl alcohols (3) as represented by the following structures:

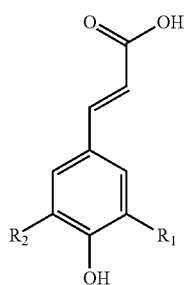

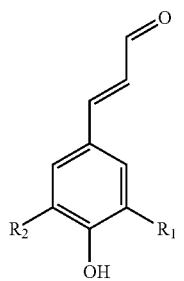

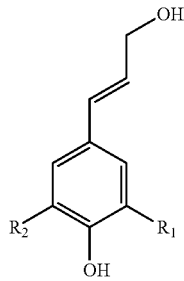

$R_1$=H, OH, OCH$_3$
$R_2$=H, OH, OCH$_3$
wherein $R_1$ and $R_2$ are independently chosen from H, OH, or OCH$_3$.

24. The method of claim 23, wherein the synthetic lignin monomers are chosen from: coniferyl alcohol, coniferaldehyde, ferulic acid, p-coumaric acid or combinations thereof.

25. The method of claim 15, wherein the template has about $10^9$ pores cm$^{-2}$.

* * * * *

SEQUENCE LISTING

```
<160> NUMBER OF SEQ ID NOS: 2

<210> SEQ ID NO 1
<211> LENGTH: 23
<212> TYPE: DNA
<213> ORGANISM: Artificial Sequence
<220> FEATURE:
<223> OTHER INFORMATION: Chemically synthesized forward primer sequence

<400> SEQUENCE: 1
gaacaacact caaccctatc tcg                                              23

<210> SEQ ID NO 2
<211> LENGTH: 23
<212> TYPE: DNA
<213> ORGANISM: Artificial Sequence
<220> FEATURE:
<223> OTHER INFORMATION: Chemically synthesized reverse primer sequence

<400> SEQUENCE: 2
taccgtaaat actccaccca ttg                                              23
```